US009866097B2

(12) United States Patent
Guina et al.

(10) Patent No.: US 9,866,097 B2
(45) Date of Patent: Jan. 9, 2018

(54) HIGH SPEED TURBINE

(75) Inventors: Ante Guina, Surfers Paradise (AU); John Kells, Surfers Paradise (AU); Kurt Labes, Surfers Paradise (AU); Stuart Galt, Surfers Paradise (AU); Johannes S. De Beer, Surfers Paradise (AU); David B. T. Sercombe, Surfers Paradise (AU); Rene Fuger, Surfers Paradise (AU)

(73) Assignee: HERON ENERGY PTE LTD, Singapore (SG)

(*) Notice: Subject to any disclaimer, the term of this patent is extended or adjusted under 35 U.S.C. 154(b) by 793 days.

(21) Appl. No.: 14/365,981

(22) PCT Filed: Apr. 5, 2012

(86) PCT No.: PCT/AU2012/000345
§ 371 (c)(1),
(2), (4) Date: Dec. 22, 2014

(87) PCT Pub. No.: WO2013/086558
PCT Pub. Date: Jun. 20, 2013

(65) Prior Publication Data
US 2015/0111752 A1    Apr. 23, 2015

(30) Foreign Application Priority Data

Dec. 16, 2011  (AU) ................ 2011905265
Feb. 17, 2012  (AU) ................ 2012900593
Feb. 17, 2012  (AU) ................ 2012900595

(51) Int. Cl.
*H02K 55/00*   (2006.01)
*H02K 31/00*   (2006.01)
*H02K 16/00*   (2006.01)

(52) U.S. Cl.
CPC ............. *H02K 55/00* (2013.01); *H02K 31/00* (2013.01); *H02K 16/00* (2013.01)

(58) Field of Classification Search
CPC ......... H02K 55/00; H02K 31/00; H02K 16/00
See application file for complete search history.

(56) References Cited

U.S. PATENT DOCUMENTS 3,513,340 A * 5/1970 Appleton ............... H02K 31/02
                                                    310/113
3,646,394 A * 2/1972 Swartz .................. H02K 31/02
                                                    310/126

(Continued)

FOREIGN PATENT DOCUMENTS

CN    101532472 A    9/2009
DE    2335135 A1     1/1975

(Continued)

OTHER PUBLICATIONS

Appleton, A. D., "Motors, Generators, and Flux Pumps", Cryogenics, Jun. 1969, pp. 147-157.

(Continued)

*Primary Examiner* — Colleen P Dunn
(74) *Attorney, Agent, or Firm* — Morrison & Foerster LLP

(57) ABSTRACT

A number of configurations of a high speed electromagnetic turbine (1300) are discussed. The turbine (1300) includes a housing (1301) includes at least superconducting coil (1307) for the generation of a magnetic field, the coil being retained within a cryogenic envelope of a cryogenic body (1306). The turbine (1300) includes also includes rotor assembly including one or more rotors (13091), (13092), (13093), (13094), (13095) and (13096) positioned on shaft (1310). The rotor being received within the bore (1308) formed between the interior walls of the body (1306) such that it is immersed in the magnetic field. As the current is passed (Continued)

through the rotor assembly the induced force due to the interaction of the current with the magnetic is translated into a torque on the shaft (1310).

15 Claims, 73 Drawing Sheets

(56) References Cited

U.S. PATENT DOCUMENTS

| | | | | |
|---|---|---|---|---|
| 3,898,490 | A * | 8/1975 | Wedman | H02K 55/00 310/114 |
| 3,944,865 | A * | 3/1976 | Jewitt | H02K 31/02 310/114 |
| 4,024,422 | A | 5/1977 | Gill | |
| 4,171,496 | A * | 10/1979 | Eriksson | H01R 39/646 310/114 |
| 6,639,337 | B1 * | 10/2003 | Nakano | H02K 11/048 310/113 |
| 2010/0025911 | A1 * | 2/2010 | Sakamoto | G07D 11/00 271/3.01 |
| 2010/0259117 | A1 | 10/2010 | Goodzeit et al. | |
| 2014/0030656 | A1 * | 1/2014 | Usa | G03F 7/203 430/296 |

FOREIGN PATENT DOCUMENTS

| | | |
|---|---|---|
| EP | 0748033 A2 | 12/1996 |
| FR | 2245115 A1 | 4/1975 |
| GB | 1185724 A | 3/1970 |
| GB | 1560803 A | 2/1980 |
| JP | 50-38015 A | 4/1975 |
| JP | 55-122469 A | 9/1980 |
| JP | 1-16059 Y2 | 5/1989 |
| JP | 2-107278 U | 8/1990 |
| JP | 7-15936 A | 1/1995 |
| JP | 11-31614 A | 2/1999 |
| JP | 5038015 B2 | 10/2012 |
| WO | 2012/155175 A1 | 11/2012 |

OTHER PUBLICATIONS

Appleton, Derek Anthony, "Development of Superconducting DC Machines at International Research & Development Co. Ltd.", Proceedings of the IEEE, vol. 61, No. 1, Jan. 1973, pp. 106-111.
Arkkio at al., "A 50 KW Homopolar Motor with Superconducting Field Windings", IEEE Transactions on Magnetics, IEEE Service Center, vol. MAG-17, No. 1, Jan. 1981, pp. 900-903.
Bassham, Bobby A., "An Evaluation of Electric Motors for Ship Propulsion", Thesis, Jun. 2003, 118 pages.
Bogner et al., "Electrical Machines with Superconductors. Part 1. Fundamentals and Possible Applications", Siemens Forschungs—Und Ectwiclungs, vol. 4, No. 5, 1975, pp. 305-309.
Extended European Search Report (includes Supplementary European Search Report and Search Opinion) received for European Patent Application No. 12857413.4, dated Mar. 4, 2016, 15 pages.
Hadlow et al., "Superconductivity and its Applications to Power Engineering", Proceedings of the Institution of Electrical Engineers, vol. 119, No. 8R, Aug. 1972, pp. 1003-1032.
Office Action received for Australian Patent Application No. 2012350392, dated Nov. 11, 2016, 5 pages.
Office Action received for Australian Patent Application No. 2012350392, dated Nov. 14, 2016, 5 pages.
Office Action received for Chinese Patent Application No. 201280069828.1, dated Jun. 2, 2016, 12 pp. (7 pages of English Translation and 5 pages of Official Copy).
Office Action received for Japanese Patent Application No. 2014-546239, dated Apr. 5, 2016, 22 pp. (12 pages of English Translation and 10 Official Copy).
Office Action received for Russian Patent Application No. 2014128759/07(046501), dated Apr. 15, 2016, 3 pages (English Translation Only).
Partial European Search Report received for European Patent Application No. 12857413.4, dated Oct. 12, 2015, 6 pages.
Shehata, Mourad A., "Anwendung der Supraleitung Bei Elektrischen Maschinen", Elektrotechnische Zeitschrift, vol. 102, No. 4, Feb. 1, 1981, pp. 180-185. (See Communication under 37 CFR § 1.98(a) (3)).
International Search Report and Written Opinion received for PCT Patent Application No. PCT/AU2012/000345, dated Jul. 4, 2012, 13 pages.
International Preliminary Report on Patentability received for PCT Patent Application No. PCT/AU2012/000345, dated Mar. 25, 2014, 7 pages.
Written Opinion received for PCT Patent Application No. PCT/AU2012/000345, dated Aug. 9, 2013, 6 Pages.
Office Action received for Japanese Patent Application No. 2014-546239, dated Dec. 20, 2016, 6 pages (English Translation only).
Office Action received for Chinese Patent Application No. 201280069828.1, dated Mar. 1, 2017, 18 pages (11 pages of English Translation and 7 pages of Official Copy).

* cited by examiner

Cross sectional view of the inside of a turbine body.

Cross sectional view of the inside of a turbine body.

Cross sectional view of the inside of a turbine body.

Cross sectional view of the inside of a turbine body.

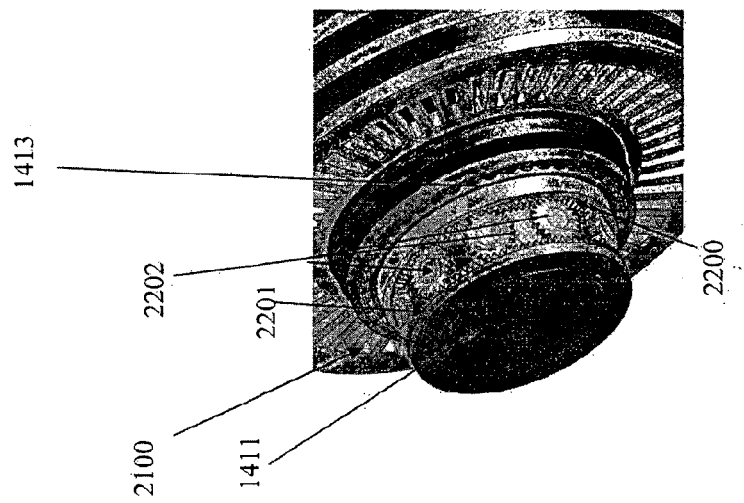
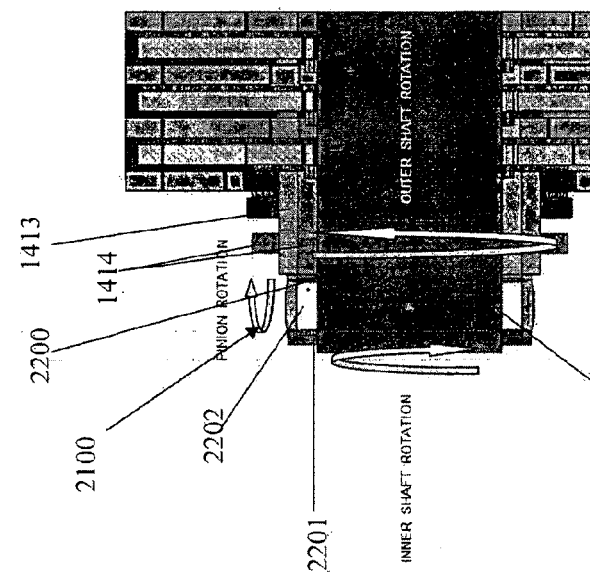
Fig.73A
Fig.73B

HIGH SPEED TURBINE

CROSS REFERENCE TO RELATED APPLICATIONS

This application is a National Phase of PCT/AU2012/000345 filed Apr. 5, 2012, which claims priority to Australian Application No. 2011905265, filed Dec. 16, 2011, Australian Application No. 2012900593, filed Feb. 17, 2012, and Australian Application No. 2012900595, filed Feb. 17, 2012, the contents of all of which are hereby incorporated by reference in the present disclosure in their entireties.

BACKGROUND OF THE INVENTION

Field of the Invention

The present invention relates in general to an apparatus for the generation of electro-mechanical work. In particular although not exclusively the present invention relates to high speed electromagnetic turbines.

Discussion of the Background Art

One of the fundamental principles of physics is the relationship between electricity and magnetism. This relationship was first observed in mid 1800s when it was noted that current passing through a simple bar conductor, placed in an external magnetic field perpendicular to the current flow induces torque. This as each of the moving charges, which comprises the current, experiences a force as a result of the induced magnetic field. The force exerted on each of the moving charges generates torque on the conductor proportional to the magnetic field.

The above discussed basic interactions between electric and magnetic fields are the basic scientific principles which underpin electric motors and generators. One of the simplest forms of electric generator was first exemplified by Michael Faraday, with his use of a device now know as the Faraday disc. Faraday's device consisted of a copper disk rotated between the poles of a permanent magnet. This generates a current proportional to the rate of rotation and strength of the magnetic field. The Faraday disc was in essence the first homopolar generator. Faraday's generator however was exceedingly inefficient due to counter flows of current which limited the power output to the pickup wires, and the effects of parasitic heating on the copper disc.

Despite various advances in design and materials since Faraday's original demonstration, homopolar generators have generally long been regarded as being extremely inefficient. Nonetheless homopolar generators have some unique physical properties that make them desirable for certain applications. Firstly homopolar generators are the only generators that produce a true DC output. Most multi-pole generators are required to commutate or selectively switch into AC windings to get a DC output. In addition to this homopolar generators typically produce low voltages and high currents.

Similarly homopolar motors allow high power levels to be achieved from the motor via the application of a comparatively low voltage power supply. It is this fact that has seen much interest in homopolar motors in a number applications, for example electric vehicles. One example of such a motor under development at the University of Texas utilises a four-pass armature and operates at a peak current of 5,000 A from a 48V battery pack. Full power efficiency is currently at 87% with the majority of losses coming from the brushes. In fact one of the major limitations in homopolar motor design is the losses associated through power transfer via conventional brushes. Brush wear is also a factor, particularly in high speed applications where the brushes have a greater frequency of contact with the armature.

Another factor affecting the efficiency of homopolar motors is the production of drag by eddy currents created within the rotors. Eddy currents occur where there is a temporal variation in the magnetic field, a change in the magnetic field through a conductor or change due to the relative motion of a source of magnetic field and a conducting material. Eddy currents become a particular concern in applications where high speed rotors and large magnetic fields are utilised.

Typical homopolar motors require relatively large magnets or plurality of magnets fields to produce the required field, the size and number of magnets again adds to the overall size and weight of the system. Both size and weight of the motor are critical design considerations in applications such as electric propulsion systems.

Given the benefits of homopolar systems (i.e. a system which utilises a single unidirectional field) it would be advantageous to provide a homopolar system which ameliorates at least some of the aforementioned deficiencies of the prior art.

SUMMARY OF THE INVENTION

Disclosure of the Invention

Throughout the specification it is to be understood that the term turbine is used to refer to a structure which includes one or more rotors which produce mechanical work responsive to exposure to a substantially uniform field.

Accordingly in one aspect of the present invention there is provided a turbine, said turbine including:
  at least one superconducting coil for generation of a magnetic field;
  at least one rotor mounted to a shaft positioned within the superconducting coil;
  whereon application of current through the turbine causes shaft and rotor to produce mechanical work.

In another aspect of the present invention there is provided a turbine, said turbine including:
  a body including plurality of superconducting coils for generation of a magnetic field;
  a first shaft positioned within the body, said first shaft having mounted thereto at least one rotor;
  a second shaft positioned adjacent to the plurality superconducting coils and electrically coupled to the at least one rotor to form a series circuit through said turbine;
  wherein the magnetic field produced by the superconducting coils is substantially constrained within the body and directed and axially thereto whereon application of current through the series circuit causes the first shaft and rotor to produce mechanical work.

In yet a further aspect of the present invention there is provided a turbine, said turbine including:
  a first set of superconducting coils for generating a first magnetic field;
  a first shaft positioned within the set of superconducting coils, said first shaft having mounted thereto a first set of rotors;
  a second set of superconducting coils for generating a second magnetic field said second set of coils positioned adjacent the first set of coils;
  a second shaft positioned within the set of superconducting coils, said second shaft having mounted thereto a second set of rotors electrically coupled to the first set of rotors to provide a series circuit through said turbine;

whereon application of current through the series circuit causes the shafts and their respective rotor sets to produce mechanical work.

In yet another aspect of the present invention there is provided a turbine, said turbine including:
a first set of superconducting coils for generating a magnetic field;
a first shaft positioned within the first set of coils, said first shaft having mounted thereto a first set of rotors;
a second shaft positioned within the set of superconducting coils, said second shaft having mounted thereto a second set of rotors electrically coupled to the first set of rotors, to provide a series circuit through said turbine;
whereon application of current through the series circuit causes the shafts and their respective rotor sets to produce mechanical work.

In yet another aspect of the present invention there is provided a motor the motor including:
a housing;
a drive assembly mounted within the housing the drive assembly including:
a cryogenic body having a cryogenic envelope disposed therein;
a rotor assembly positioned within the cryogenic body and external to the cryogenic envelope the rotor assembly including one or more rotors disposed on a drive shaft the one or more rotors are arranged to form a series circuit through the rotor assembly;
a superconducting coil for the production of a magnetic field the superconducting coil retained within said cryogenic envelope; and
whereon application of current through the series circuit causes the one or more rotors and the shaft to produce mechanical work.

Suitably each rotor includes a hub connected to a rim via a set of arms spaced radially about the hub. In one embodiment of the present invention the rotors may be formed from copper which is then electroplated with nickel, silver or other highly conductive metals. Alternatively the rotor could be formed from titanium, fibre composites or other highly resistive or non conductive materials.

Preferably the electrical coupling of the rotors to the second shaft or rotors in an adjacent set of rotors is via the use of a conductive strip formed on the outer periphery of the rim which mates with a conductive ring disposed on the second shaft or an adjacent rotor as the case may be. The conductive strip may be in the form of single continuous strip formed from a continuous metal fibre brush. Alternatively the conductive strip could be formed from a plurality of overlapping leaves formed from continuous metal fibre brushes.

In the case where the turbine includes a secondary shaft and/or a secondary set of rotors, each rotor disposed on the first shaft may be mechanically coupled to the second shaft or an adjacent rotor disposed on the second shaft. In such instances the rotors may include a gear which cooperates with a gear disposed on the second shaft or adjacent rotor. In instances where the rotors are formed from copper or other such conductors the gear may also act as a conductive structure and to electrically couple the rotor to the second shaft or adjacent rotor. Where the rotor is formed from titanium, fibre composites or other highly resistive or non conductive materials a superconductive material could be applied to the outer surface of the rotor to assist in electrically coupling the rotor to the second shaft or adjacent rotor. The superconductive material could be a high temperature super conductor tape applied to the outer surface of the rotor, alternatively the superconductive material could be superconductive coating bonded to the outer surface of the rotor.

Preferably the series circuit is formed by interconnecting alternate rotors on the first and second shafts via a series of busbars and brushes. In the case of the where the second shaft does not carry rotors the conductive strip and/or gearing arrangement may be linked back to the next rotor in the set of rotors on the first shaft by a set of busbars and brushes.

Suitably the coils are composed of 12 mm wide HTS tape with 100 turns and a 150 mm internal radius. Alternatively 3 stacks of 4 mm wide tape can be used. The coils may be a linked to form a long solenoid. The solenoid may have a unitary body or may include a series of discontinuities. The discontinuities may be in the form of one or more gaps between adjacent coils forming the body of the solenoid.

The coils may produce a magnetic field of between 1 T to 2 T for a supply current of between 160 A to 175 A. Suitably the coils may produce a magnetic field of between 2 t to 5.1 T for a supply current of between 180 A to 500 A depending on the configuration of the coils. Preferably the coils produce a peak field of between 1.3 T to 5.1 T. The coils may produce a magnetic field of between 3 T to 5 T with a supply current of 300 A to 500 A. Suitably the coils are constructed in a manner that causes substantially all the magnetic field produced by the coils to be contained within the interior radius of the coil.

Suitably the series connection between the rotors of the motor is facilitated by a series of current transfer mechanisms disposed between adjacent rotors. Preferably the current transfer mechanisms are in the form of stationary discs positioned between each rotor, each disc including a first set and second set of conductive brushes which are arranged in pairs and wherein the first set of brushes contact the rotor's hub and a second set of brushes contact the adjacent rotor's rim.

The brushes may be metal fibre brushes having a cross section of 23 mm×35 mm and a current rating of 330 A per brush. Suitably the number of brush pairs utilised is determined by the desired total current rating of the motor for example seven brush pairs would provide a current rating of 2310 A. Preferably the current transfer mechanism and brushes are arranged such that current is directed from the outer radius (rim) of the preceding rotor to the inner radius (hub) of the next rotor. To compensate for progressive wear the brushes may be mounted on shunts coupled to springs to allow axial movement of the brushes. The shunts of brush pairings may be interconnected by a flexible wire retained within the frame of the current transfer mechanism.

The current transfer mechanisms may be fixed in position relative to the drive shaft. Suitably the current transfer mechanisms are held in position by a series of non-conductive struts positioned between a pair of end plates positioned at opposing ends of the dive shaft. The struts may include a profiled edge which includes a number of raised sections which engage recesses on the outer periphery of the current transfer mechanisms. The end plates may include bearings for rotateably mounting the drive shaft. Preferably the bearings are ceramic bearings.

The drive shaft may include at least one non-conductive section coupled between conductive sections of the shaft. Suitably the rotors and current transfer mechanisms are positioned on a non-conductive section of the drive shaft, such that they interconnect the conductive sections of the drive shaft in series. Preferably at least one rotor and at least one current transfer mechanism are directly coupled to a conductive section of the drive shaft. Current may be applied to the conductive sections of the drive shaft via a set of conductive brushes.

Suitably the non-conductive section of the drive shaft is formed from a series of non-conductive interlocking elements each carrying a rotor and a current transfer mechanism. The drive shaft may be hollow for receipt of a reinforcing rod.

The cryogenic body may be of a generally cylindrical construction and includes a bore for receipt of the rotor assembly. Preferably the cryogenic envelope is formed between the exterior and interior walls of the body with the bore formed between the interior walls of the body. Suitably the cryogenic envelope is coupled to a cryo-cooler mounted on the housing. The cryo-cooler may be a Pulse Tube cryo-cooler sized to allow an operating temperature of the coil assembly of about 20K. The cryo-cooler may be attached to the copper fingers disposed within the cryogenic envelope, the copper fingers forming a conductive heat distribution path for the super conducting coil.

The housing may be provided with end caps to encapsulate the rotor assembly and cryogenic body therein. The end caps may include a plurality of steel plates which act as flux guides. The plates may be selectively removed/added to vary the dimensions of the flux guides. The end caps may include passageways to allow for the shaft to extend beyond the bore and the housing into secondary housings, which may be provided on opposing ends of the housing. The secondary housings may encapsulate input and output brush assemblies for provision of the drive current through the series circuit formed within the rotor assembly. The secondary housings may be generally funnel shaped assemblies. The secondary housings may include cooling arrays for directing air flow though the passageways and bore. The cooling arrays may be in the form of one or more cooling fans arranged in a push pull configuration i.e. opposing arrays configured force air in and draw air from the housing.

In some embodiments of the turbine open ended operation of the solenoid is possible without the need for the necking down of the steel flux guides. In such cases the arms of the rotors could also be bevelled or shaped to produce airflow in the central bore.

The drive shaft may be coupled to various torque transfer arrangements including gearing assemblies, sprocket drives or the like or directly to the drive component such as wheel, prop, track etc. Suitably the torque transfer arrangements are electrically isolated/insulated from the shaft. The isolation/insulation of the torque transfer arrangements could be done by putting an insulating coating of the shaft or on the torque transfer or drive mechanisms etc. The torque transfer arrangements may be housed within the secondary housings or may be mounted externally thereto. Where the torque transfer arrangements are mounted externally the shaft may extend beyond the secondary housings.

BRIEF DETAILS OF THE DRAWINGS

In order that this invention may be more readily understood and put into practical effect, reference will now be made to the accompanying drawings, which illustrate preferred embodiments of the invention, and wherein:

FIG. 73A is a cross-sectional view of a torque transfer arrangement for the turbine of FIG. 72;

FIG. 73B is a schematic diagram depicting the torque transfer arrangement for the turbine of FIG. 72.

DESCRIPTION OF EMBODIMENTS OF THE INVENTION

Figure 1:
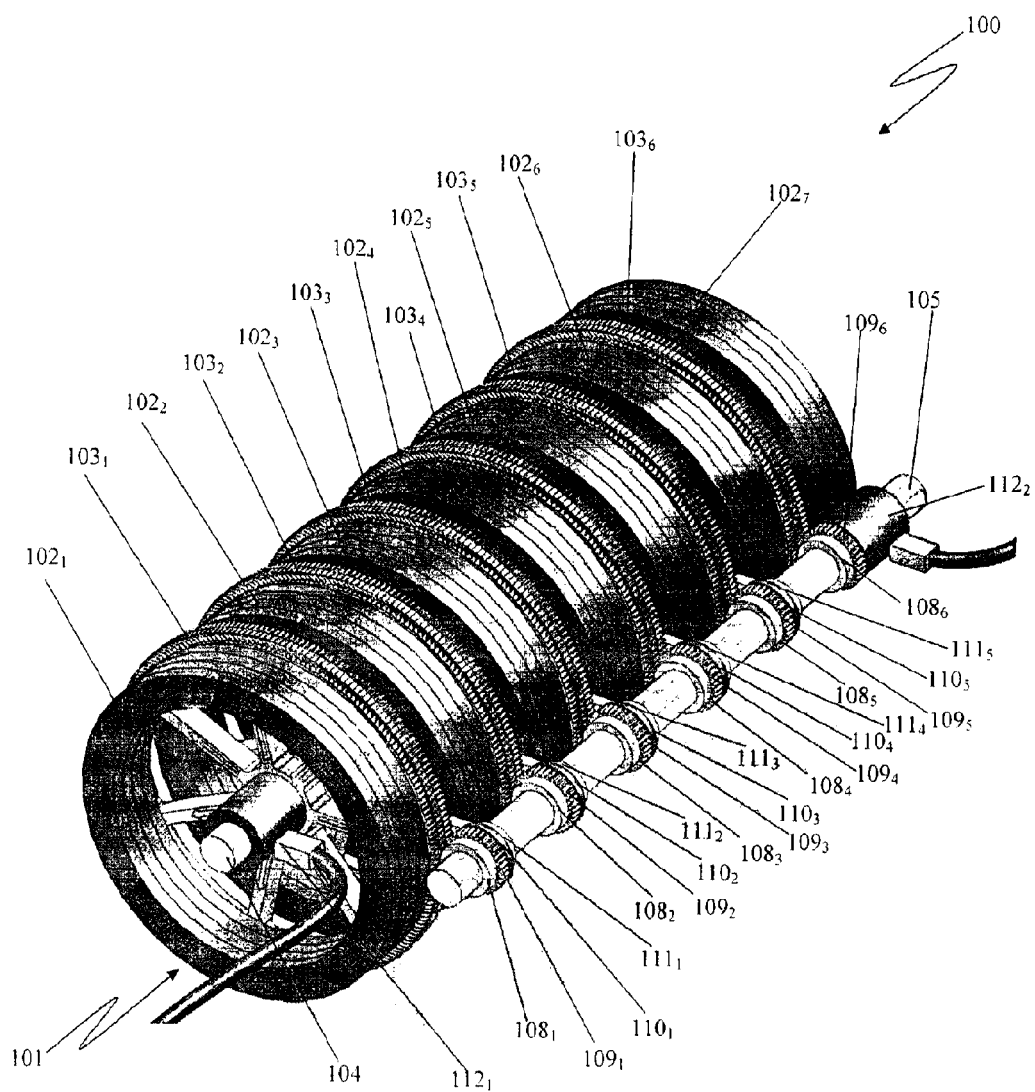
FIG. 1 is a schematic diagram depicting the construction of a turbine according to one embodiment of the invention.

With reference to FIG. 1 there is illustrated one embodiment of a high speed electromagnetic turbine 100 according to one embodiment of the present invention. As shown the turbine 100 includes a body 101 formed from a series of conductive coils $102_1$, $102_2$, $102_3$, $102_4$, $102_5$, $102_6$, $102_7$ and series of rotors $103_1$, $103_2$, $103_3$, $103_4$, $103_5$, $103_6$. It will of course be appreciated by those of skill in the art that while the high speed electromagnetic turbine of the type shown in FIG. 1 may be constructed from at least one coil and rotor or any number of rotors and coils (i.e. number of coils and rotors can range from 1 to n depending on the desired size of the turbine 100). The coils $102_1$, $102_2$, $102_3$, $102_4$, $102_5$, $102_6$, $102_7$ are connected in series to produce a long solenoid for the generation of the necessary magnetic field to cause rotation of the rotors within the turbine 100 on the application of a drive current through the turbine 100.

The rotors $103_1$, $103_2$, $103_3$, $103_4$, $103_5$, and $103_6$ as shown are mounted on shaft 104. The shaft 104 being positioned co-axially with respect to central axis of the coils $102_1$, $102_2$, $102_3$, $102_4$, $102_5$, $102_6$, $102_7$. In this particular example the rotors $103_1$, $103_2$, $103_3$, $103_4$, $103_5$, and $103_6$ are fixed to the shaft 104 which is free to rotate. It will of course be appreciated by those of skill in the art that the shaft could be fixed while the rotors $103_1$, $103_2$, $103_3$, $103_4$, $103_5$, $103_6$ are free to rotate about the shaft 104. In such a configuration the rotors $103_1$, $103_2$, $103_3$, $103_4$, $103_5$, $103_6$ could be mounted on the shaft via bearings allowing each rotor to rotate independently of the shaft 104.

Each rotor $103_1$, $103_2$, $103_3$, $103_4$, $103_5$, $103_6$ is coupled to a secondary shaft 105 to allow for current transfer to occur between the rotors. In this instance each rotor is electrically and mechanically coupled to the secondary shaft 105 via a conductive strip 106 and gear 107 (see FIG. 3) disposed on the outer periphery of each rotor $103_1$, $103_2$, $103_3$, $103_4$, $103_5$, $103_6$. Each of the conductive strips $106_1$, $106_2$, $106_3$, $106_4$, $106_5$, $106_6$ and gears $107_1$, $107_2$, $107_3$, $107_4$, $107_5$, $107_6$ co-operate with drive and current transfer assemblies spaced along the length of the secondary shaft 105.

Each of the drive and current transfer assemblies on the second shaft in this instance includes a conductive ring 108 coupled to a gear 109 which is connected to an electric brush 110 coupled to one end of a busbar 111. The opposing end of the busbar 111 is connected to the primary shaft 104 to provide the return current path to the next rotor within the series rotors mounted on the primary shaft. As current is applied to rotor $103_1$ via brush $112_1$ it is transferred through the radial arms of the rotor 103 to the conductive strip 106. Current is then transferred to the conductive ring 108 via contact with the conductive strip 106 and through gear 109 and brush 110 to the busbar 111 (a more detailed explanation of the transfer of current within and between the rotors is discussed in relation to FIGS. 2 and 3 below). Gear 109 in this case allows for the torque generated on rotor $103_1$, due to the drive current, to be translated to the secondary shaft 105 such that it rotates in unison with the rotors $103_1$, $103_2$, $103_3$, $103_4$, $103_5$, $103_6$ and the primary shaft 104. By rotating the secondary shaft in this manner wear on the conductive components namely the conductive strips $106_1$, $106_2$, $106_3$, $106_4$, $106_5$, $106_6$ and rings $108_1$, $108_2$, $108_3$, $108_4$, $108_5$, $108_6$ can be reduced.

Figure 2:
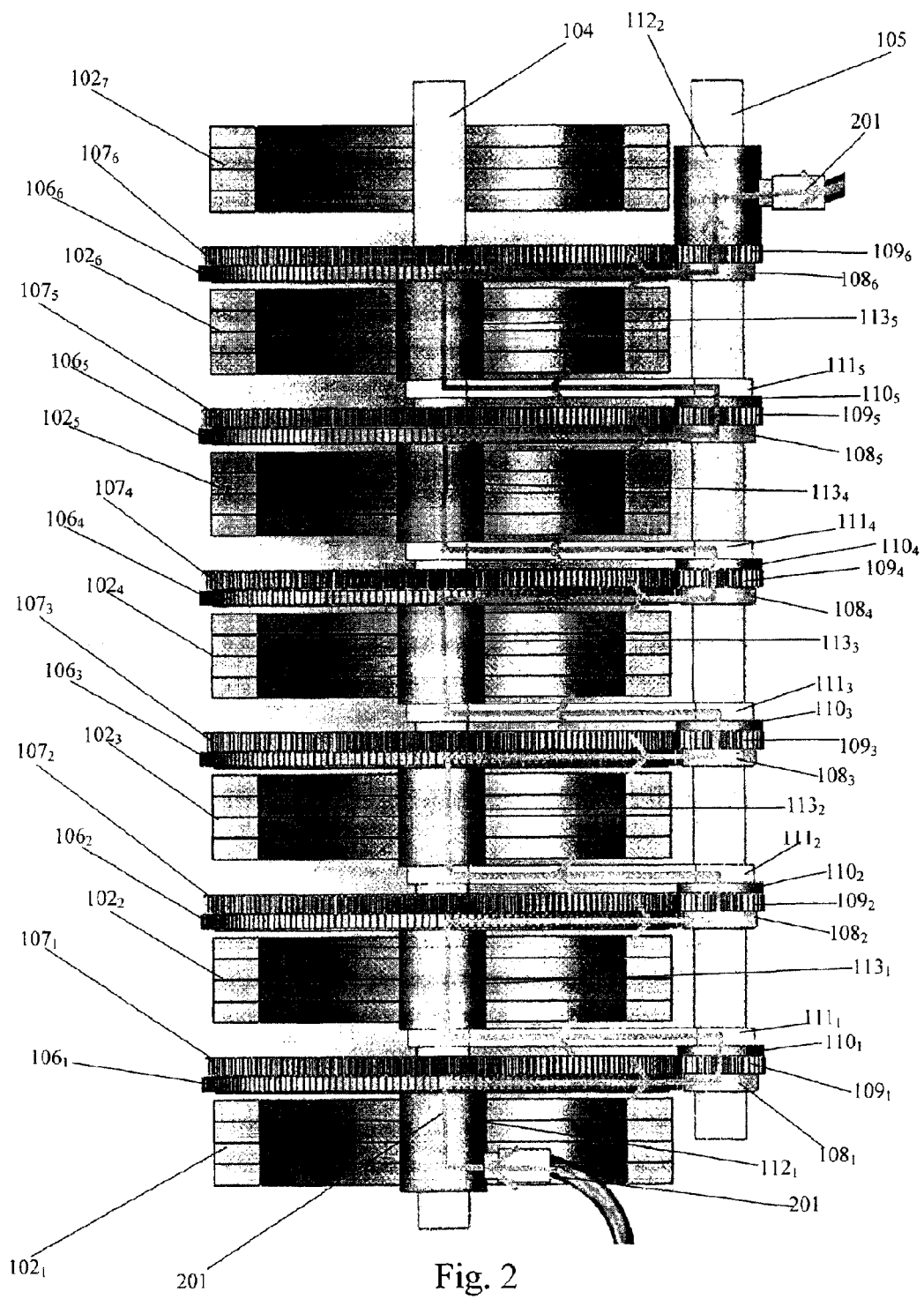
FIG. 2 is a top plan sectional view of the turbine of FIG. 1 depicting current transfer along the turbine.

FIG. 2 is a partial section top plan view of the turbine of FIG. 1 depicting the transmission path 201 (shown in red) for the drive current through the turbine. As current is applied to rotor $103_1$ via brush $112_1$ it is transferred to the conductive strip $106_1$. The current is then transferred to the conductive ring $108_1$ via contact with the conductive strip $106_1$, the ring $108_1$ in turn communicates the current through gear $109_1$ to brush $110_1$. The brush $110_1$ transfers current to busbar $111_1$ which acts a bridge transferring current back to a brush $113_1$ disposed on the primary shaft 104 which feeds current to the second rotor $103_2$ within the series of rotors $103_1$, $103_2$, $103_3$, $103_4$, $103_5$, $103_6$.

Current from the second rotor $103_2$ is then transferred to ring $108_2$ secondary shaft 105 via conductive strip $106_2$. Current is then transferred to busbar $111_2$ through gear $109_2$ and brush $110_2$ and to brush $113_2$ into the third rotor $103_3$. Current is then transferred through to the remaining rotors $103_4$, $103_5$ and $103_6$ by the series interconnection of brushes $113_3$, $113_4$ and $113_5$ via the relevant combination of conductive strips $106_3$, $106_4$ and $106_5$, rings $108_3$, $108_4$ and $108_5$, gears $109_3$, $109_4$ and $109_5$ brushes $110_3$, $110_4$ and $110_5$ and busbars $111_3$, $111_4$ and $111_5$. As rotor $103_6$ in this instance, is the last rotor in the series, it provides the linkage for the drive current from the turbine to the return current path completing the series circuit. In this case the conductive strip of $106_6$ of rotor $103_6$ transfers current to ring $108_6$ which in turn transfers the current to brush $112_2$ which is connected to an electrical cable completing the series circuit through the turbine.

As can be seen from the above discussion the various components disposed on primary 104 and secondary 105 shafts rotate in unison with their respective shafts with the exception of the busbars. In order to provide the necessary conductive link between the shafts 104, 105 the busbars $111_1$, $111_2$, $111_3$, $111_4$, $111_5$ must remain stationary with respect to the relative motion of the shafts 104, 105 and their respective components. Accordingly each of the busbars $111_1$, $111_2$, $111_3$, $111_4$, $111_5$ is mounted to the shafts via a set of bearings which allows the shafts 104, 105 to rotate independently of the busbars $111_1$, $111_2$, $111_3$, $111_4$, $111_5$. It will also be appreciated that by those of skill in the art that insulation between the current carrying components and the shafts 104, 105 is also provided to reduce the potential for current flow along the length of the each shaft (i.e. maximum current is applied through each rotor via the current transfer mechanisms discussed above).

Figure 3:
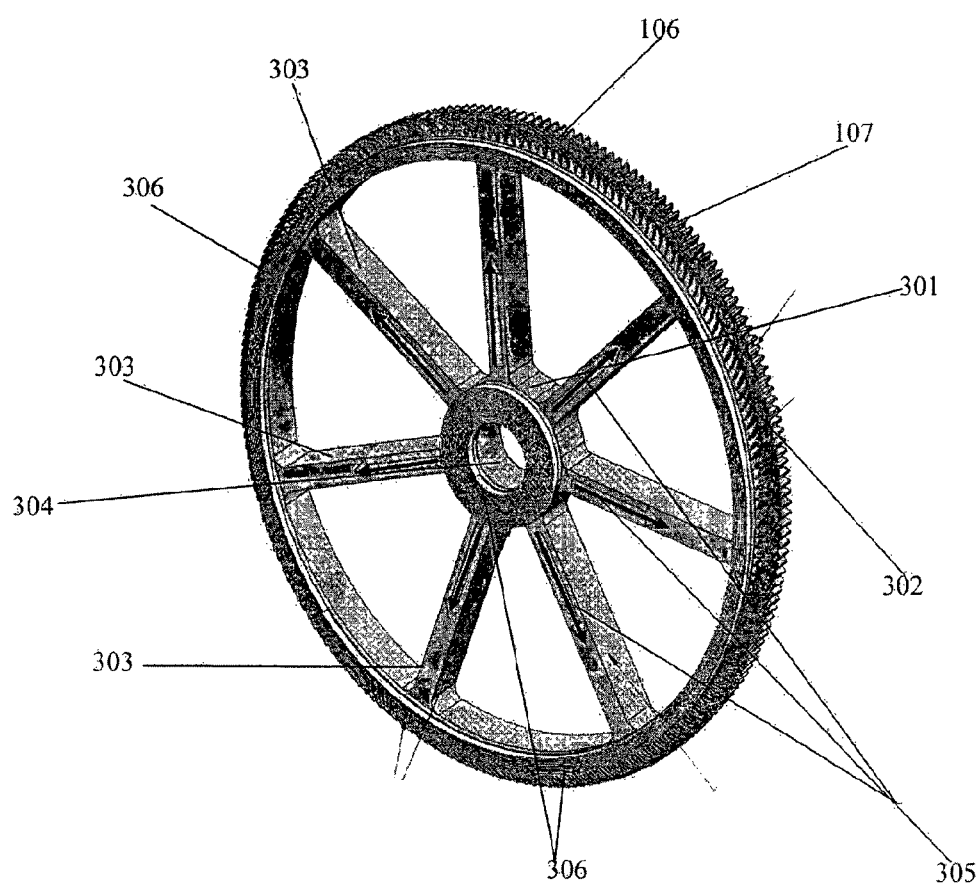
FIG. 3 is a detailed view of the construction of a rotor for use in the construction of a turbine according to one embodiment of the invention.

FIG. 3 depicts one possible construction of a rotor 103 according to one embodiment of the present invention. As shown the rotor 103 includes a hub 301 connected to a rim 302 via a set of arms 303 spaced radially about the hub 301. Disposed around the outer periphery of rim 302 are conductive strip 106 and gear 107. As shown hub 301 includes bore 304 to permit mounting of the rotor 103 on shaft 104. In use current is passed from brush to the hub 301, and from here the current radiates outwardly from the hub 301 along each of the arms 303 as denoted by arrows 305 to the rim 302 and conductive strip 106. Also shown in FIG. 3 are a number of electro-dynamic elements 306 for eddy current suppression (discussed in greater detail below).

In one embodiment of the present invention the rotors are formed from copper which is then electroplated with nickel, silver or other highly conductive metals, with gear 107 being formed integral with the rim 302. In such cases the gear 107 also acts as a conductive structure and acts to transfer current to gear 109 disposed on shaft 105. Alternatively the rotor could be formed from titanium, fibre composites or other highly resistive or non conductive materials. In such instance current transfer to the conductive strip 106 could be accomplished by disposing a superconductive material on the outer surface of the hub and arms such as a high temperature superconductor (e.g. HTS tape). Alternatively the superconductive material could be bonded to the outer surface of the rotor to provide the necessary current transfer mechanism. The conductive strip 106 may be in the form of single continuous strip formed from a continuous metal fibre brush. Alternatively the conductive strip could be formed from a plurality of over lapping leaves formed from a continuous metal fibre brush. The continuous metal fibre brushes may be of the type disclosed in U.S. Pat. No. 6,245,440 or other such suitable conductive fibre brush.

Figure 4:
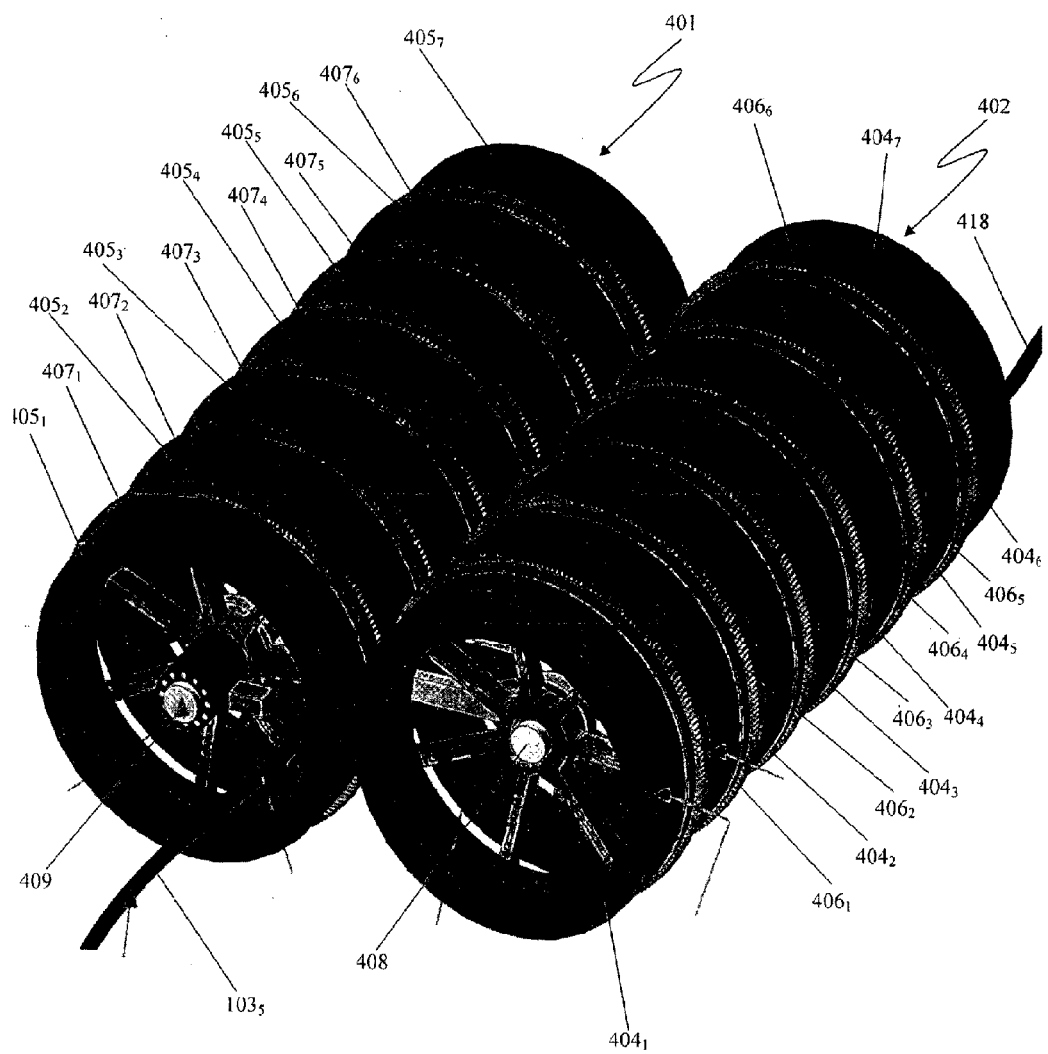
FIG. 4 is a is a schematic diagram depicting the construction of a turbine according to one embodiment of the invention.

An alternate arrangement for the high speed turbine according to the present invention is depicted in FIG. 4. The turbine 400 in this example is constructed from a pair of turbines 401, 402 arranged in parallel and which are mechanically and electrically connected.

In this case turbine 401 is of similar construction to that discussed above in relation to FIG. 1, and includes a body formed from a series of conductive coils $405_1$, $405_2$, $405_3$, $405_4$, $405_5$, $405_6$, $405_7$ providing a substantially uniform magnetic field and series of rotors $407_1$, $407_2$, $407_3$, $407_4$, $407_5$, $407_6$ (primary rotors) attached to a rotatable shaft 409. Each rotor includes a conductive brush $411_1$, $411_2$, $411_3$, $411_4$, $411_5$, $411_6$ and a gear $413_1$, $413_2$, $413_3$, $413_4$, $413_5$, $413_6$ which co-operate with adjacent rotors of turbine 402 (discussed in greater detail below).

Turbine 402 includes a body formed from a series of conductive coils $404_1$, $404_2$, $404_3$, $404_4$, $404_5$, $404_6$, $404_7$ providing a uniform magnetic field and series of rotors $406_1$, $406_2$, $406_3$, $406_4$, $406_5$, $406_6$ (secondary rotors) attached to a rotatable shaft 408. Each rotor includes a conductive strip $412_1$, $412_2$, $412_3$, $412_4$, $412_5$, $412_6$ which contact brushes $411_1$, $411_2$, $411_3$, $411_4$, $411_5$, $411_6$ of the adjacent rotor of turbine 401. Each of the rotors $406_1$, $406_2$, $406_3$, $406_4$, $406_5$, $406_6$ also includes a gear $414_1$, $414_2$, $414_3$, $414_4$, $414_5$, $414_6$ which co-operates with gears $413_1$, $413_2$, $413_3$, $413_4$, $413_5$, $413_6$ of the adjacent rotors of turbine 401. A series of brushes $410_1$, $410_2$, $410_3$, $410_4$, $410_5$ electrically couple rotors $406_1$, $406_2$, $406_3$, $406_4$, $406_5$ to one end of bus bars $415_1$, $415_2$, $415_3$, $415_4$, $415_5$ the opposing end of bus bars $415_1$, $415_2$, $415_3$, $415_4$, $415_5$ being electrically coupled to rotors $407_2$, $407_3$, $407_4$, $407_5$, $407_6$ via a series of brushes $417_1$, $417_2$, $417_3$, $417_4$, $417_5$.

Figure 5:
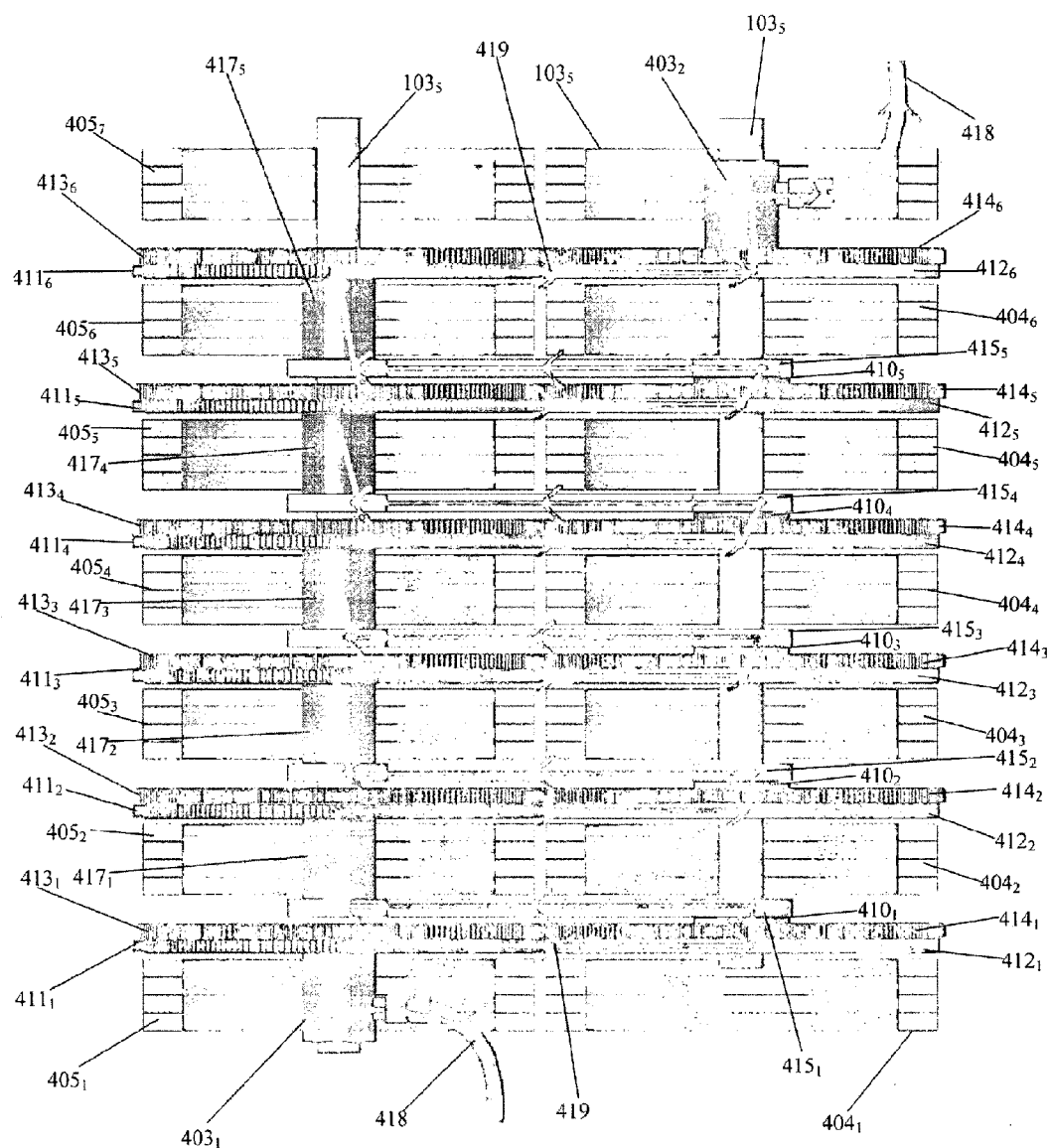
FIG. 5 is a top plan sectional view of the turbine of FIG. 4 depicting current transfer along the turbine.

As noted above the turbines 401 and 402 are interconnected by a series of busbars $415_1$, $415_2$, $415_3$, $415_4$, $415_5$. As with the case of turbine of FIG. 1 the busbars $415_1$, $415_2$, $415_3$, $415_4$, $415_5$ act as return current bridges between the shafts 409, 408. As shown in FIG. 5 the drive current (as denoted by arrows 419) is applied through the shaft 409 of the first turbine via cable 418 to brush $403_1$ which in turn is transferred to rotor $407_1$, both current and torque from the rotor $407_1$ are subsequently transferred to rotor $406_1$ via contact of brush $411_1$ with conductive ring $412_1$ and mating of gears $413_1$ and $414_1$. Current from rotor $406_1$ is then transferred to one end of busbar $415_1$ via brush $410_1$ back to turbine 401 and to rotor $407_2$ through the interaction of brush $417_1$ with busbar $415_1$. A similar process of current and torque transfer occurs for the remaining rotors $407_2$, $407_3$, $407_4$, $407_5$, $407_6$ of turbine 401 and rotors $406_2$, $406_3$, $406_4$, $406_5$, $406_6$ of turbine 402.

Thus current is transferred back and forth between the turbines via a series circuit formed from the interaction of the brushes $411_2$, $411_3$, $411_4$, $411_5$, $411_6$ with the relevant conductive strips $412_2$, $412_3$, $412_4$, $412_5$, $412_6$ permitting current to be transferred through brushes $414_2$, $414_3$, $414_4$, $414_5$ to its corresponding busbar $415_2$, $415_3$, $415_4$, $415_5$ and consequently the next rotor $407_2$, $407_3$, $407_4$, $407_5$, $407_6$ within turbine 401. As shown the current is continuously transferred between the turbines 410, 402 until it exits rotor $406_6$ through brush $403_2$ to cable 418 completing the series circuit.

Figure 6A:
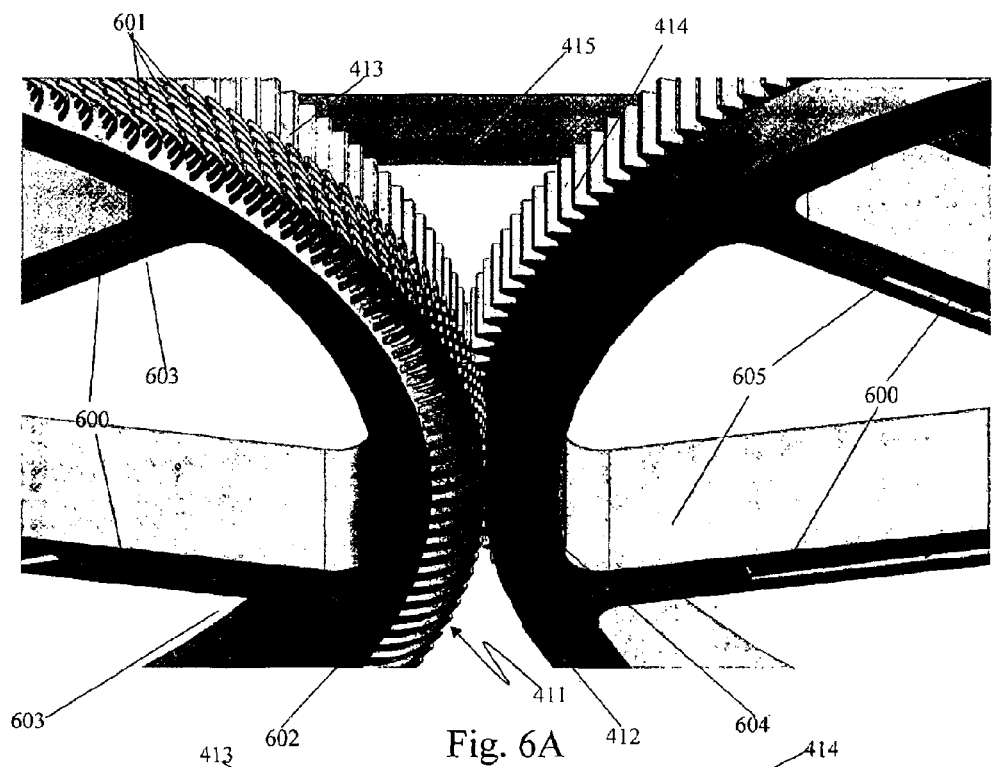
FIGS. 6A and 6B are schematic diagrams depicting the construction of an inter rotor current transfer mechanism according to one embodiment of the invention.
Figure 6B:
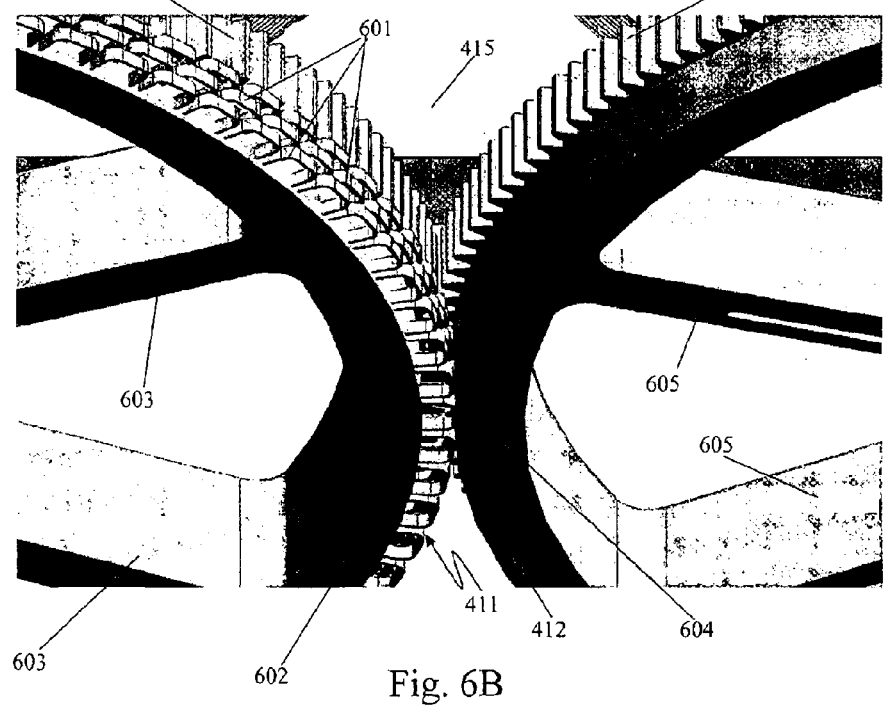

A detail view of the interaction of a primary rotor 407 of turbine 401 with a secondary rotor 406 of turbine 402 to facilitate current and torque transfer between the two are shown in FIGS. 6A and 6B. FIG. 6A depicts a current transfer arrangement wherein the brush 411 is composed of a plurality of conductive leaves 601 extending outwardly from rim 602 of the primary rotor 407. The free end of the leaves 601 in this instance are folded back towards the rim 602 such that a portion of each leaf is substantially tangential to the rim 602. Forming the leaves 601 in this manner is designed to reduce wear on each leaf when they are brought into contact with the conductive strip 412 disposed on the outer periphery of the rim 604 of the secondary rotor 406. As the substantially tangential portions of each leaf contacts the conductive strip it flexes inwardly toward the rim 602 thereby reducing the amount friction between the leaves and the surface of the conductive strip 412 while having an increased contact surface area for current transmission.

FIG. 6B depicts an alternate arrangement for the leaves 601 forming brush 411. As shown the leaves in this instance are in the form of conductive loops disposed on the outer periphery of the rim 602. As each leaf makes contact with the conductive strip 412 it compresses toward rim 602 the compression of the loops in this manner again reduces the friction between the strip 412 and the surface of the leaf while maintaining good contact to facilitate low loss current transmission. Additionally this design of the leaves 601 is best suited to situations where either forward or reverse operation of the turbines is required.

In the case of both FIGS. 6A and 6B current transfer is from the primary rotor 407 to the secondary rotor 406 i.e. the turbines being driven in the forward direction. As shown current is transferred (as denoted by arrows 600) from the hub of primary rotor 407 along each arm 603 to the rim 602 and subsequently the leaves 601 of the brush 411. Current flows through the leaves 601 to the conductive strip 412 at the point of contact between the two. The current then passes from the strip 412 to rim 604 through radial arms 605 to the hub of the secondary rotor 406 (not shown) where it is then transferred through to the busbar 415 via brush 414 (not shown).

Figure 6C:
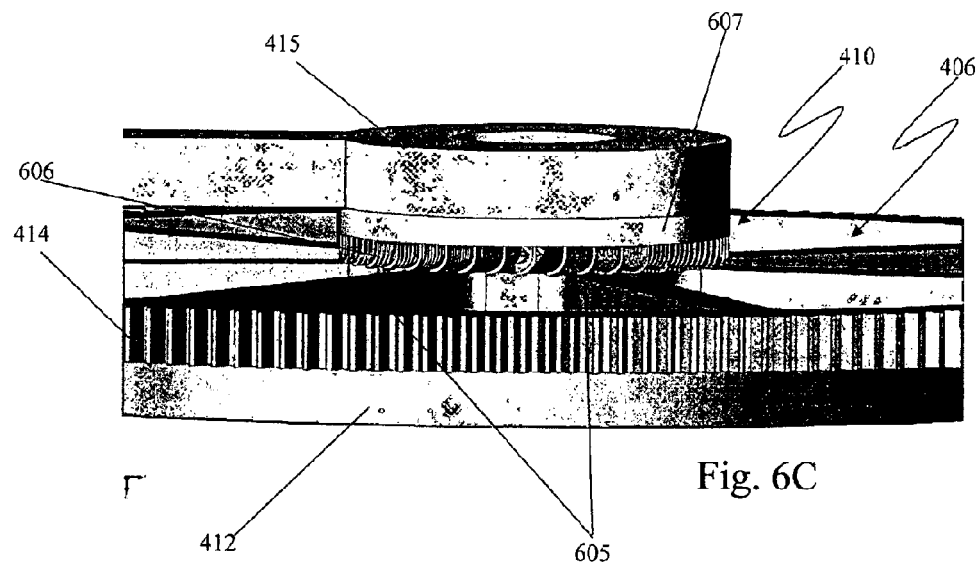
FIGS. 6C and 6D are enlarged views of the interchange between the current transfer mechanism between the rotors and the busbars according to one embodiment of the invention.

FIG. 6C depicts the current transfer arrangement between a secondary rotor 406 and busbar 415 in greater detail. As noted above the current is transferred from rotor 406 to the busbar via brush 410 positioned therebetween. In this example the brush 410 includes a plurality of leaves 606 attached to a conductive backing material 607 which contacts busbar 415. As can be seen in this example the majority of the leaves 606 are in contact with the hub of the rotor 406 with a number of leaves 606 contacting the radial arms 605 of the rotor 406. In this example the brush 410 is mounted so as to spin in unison with the shaft (not shown) of the secondary turbine. While this form of direct brush connection will be subject to wear the degree of wear is significantly less than that to which brushes on the primary rotors 407. Since the brushes disposed on the outer periphery of the primary rotors are subject to higher angular velocities than that experience by the brushes mounted to the shafts of the turbines by a factor proportional to the radial difference between the inner and, outer brushes.

Figure 6D:
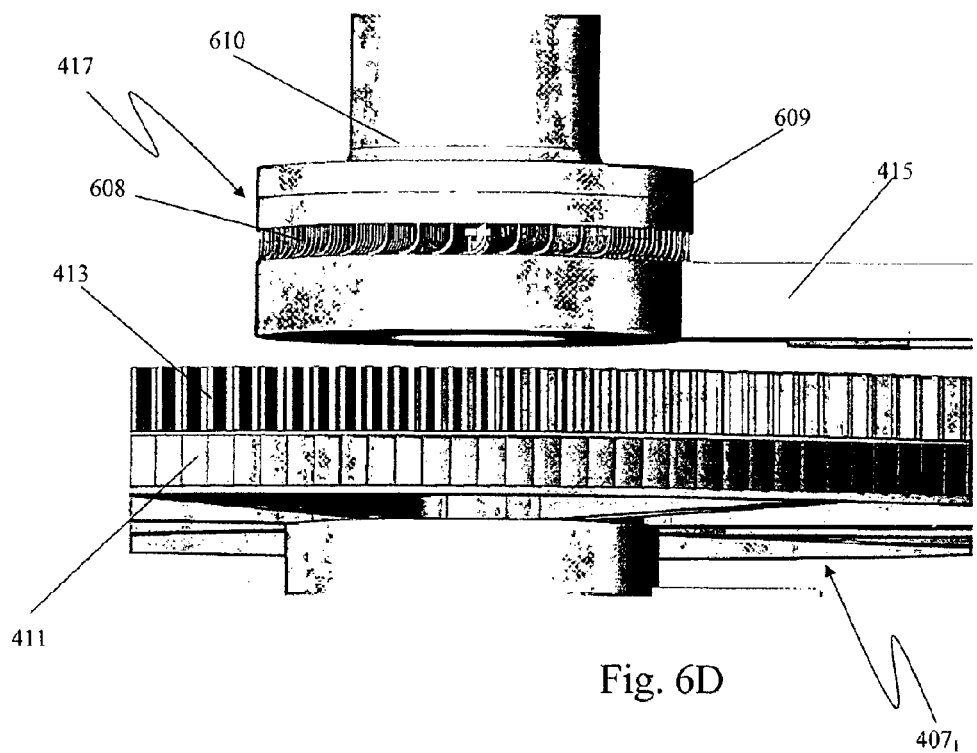

The current transfer mechanism from busbar 415 to the next rotor 407 in the series of primary rotors is shown in FIG. 6D. As previously discussed the transfer of current from busbar 415 to the next rotor in the series of primary rotors is affected via contact of brush 417 with the busbar 415. As with the brush 410, brush 417 is composed of a plurality of conductive leaves 608 attached to a conducive backing 609 which mates with a conductive sleeve 610 coupled to the next rotor in the series of primary rotors. As shown leaves 608 are in full contact with the rear surface of the end of the busbar 415. Again there will be some wear on the brush 417 against the rear surface of the busbar as it rotates with the sleeve 610 and shaft (not shown). However the wear associated with brush is significantly less than that if disposed on the outer periphery of the primary rotors.

Figure 7A:
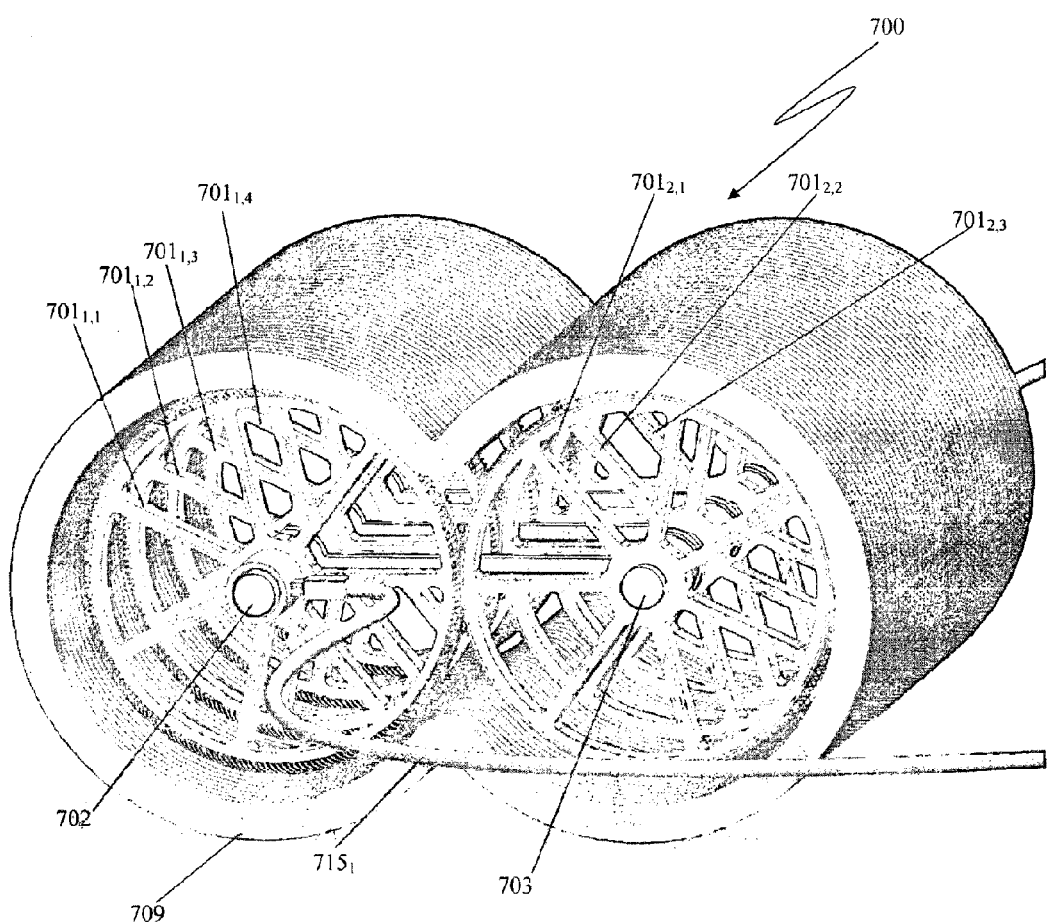
FIG. 7A is a schematic diagram depicting the construction of a turbine according to one embodiment of the invention.
Figure 7B:
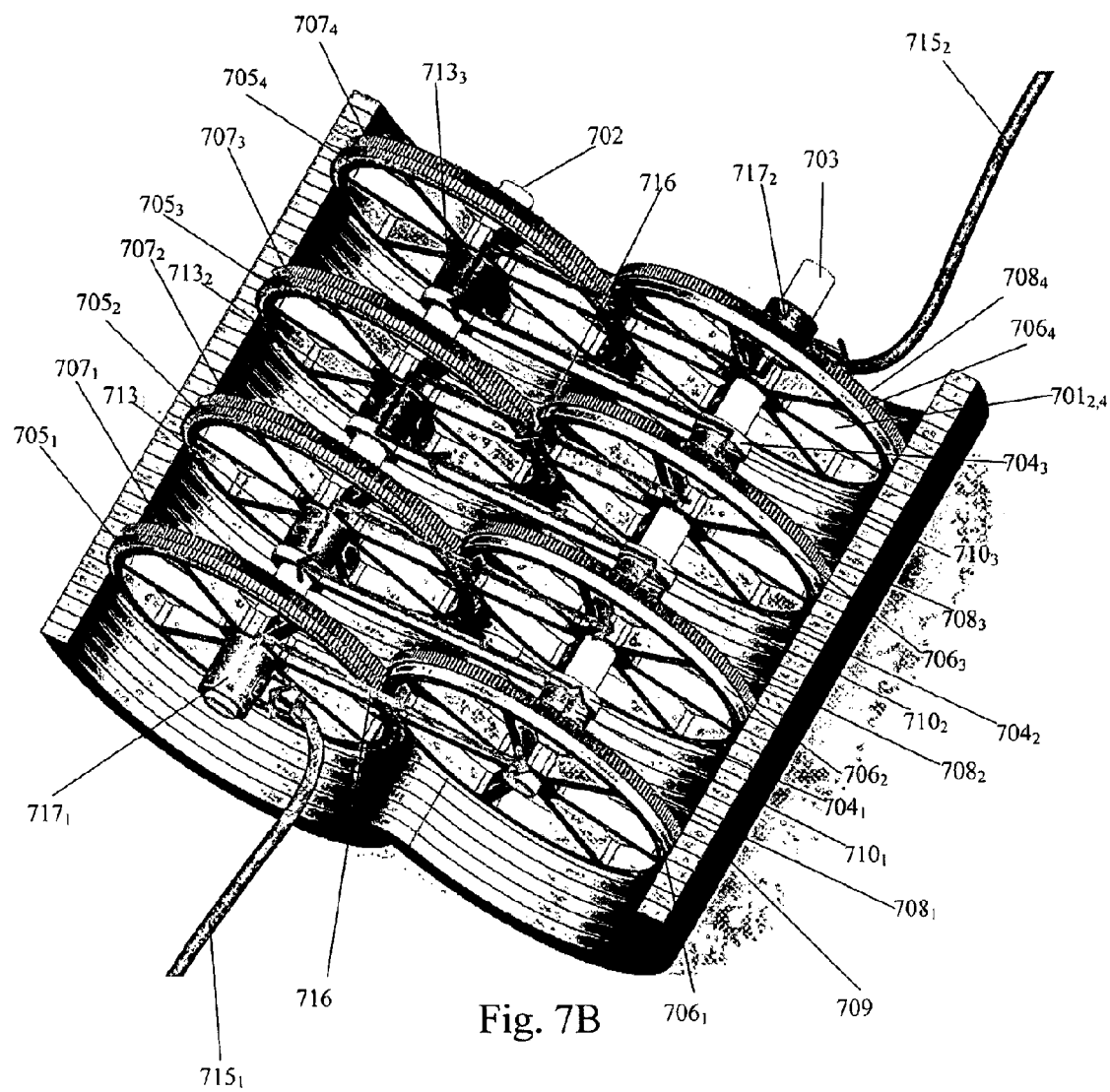
FIG. 7B is a sectional view of the turbine of FIG. 7A depicting current transfer along the turbine.

With reference to FIGS. 7A and 7B there is illustrated an arrangement for a high speed turbine according to one embodiment of the present invention. In this particular example the turbine 700 includes a plurality of rotors arranged in a primary bank $701_{1,1}, 701_{1,2}, 701_{1,3}, 701_{1,4}$ and a secondary bank $701_{2,1}, 701_{2,2}, 701_{2,3}, 701_{2,4}$ of rotors housed within a series of coils 709 providing a substantially uniform magnetic field. The mounting of the primary and secondary bank of rotors within the body of the turbine is similar to that utilised for the twin body turbine discussed above in relation to FIGS. 4 and 5. As shown the rotors from the primary bank $701_{1,1}, 701_{1,2}, 701_{1,3}, 701_{1,4}$ are mounted to the primary drive shaft 702 of the turbine 700, while the secondary bank $701_{2,1}, 701_{2,2}, 701_{2,3}, 701_{2,4}$ of rotors are secured to the secondary drive shaft 703. Each rotor in the primary bank includes a brush $705_1, 705_2, 705_3, 705_4$ and a gear $707_1, 707_2, 707_3, 707_4$, which co-operate with an adjacent rotor within the secondary bank $701_{2,1}, 701_{2,2}, 701_{2,3}, 701_{2,4}$ of rotors.

As shown in FIG. 7B the rotors of the primary bank $701_{1,1}, 701_{1,2}, 701_{1,3}, 701_{1,4}$ and the second bank $701_{2,1}, 701_{2,2}, 701_{2,3}, 701_{2,4}$ are electrically and mechanically coupled together with busbars $704_1, 704_2, 704_3$ providing an additional physical link between the primary 702 and secondary 703 shafts. Busbars $704_1, 704_2, 704_3$ also serve as current bridges between alternate rotors within the primary $701_{1,1}, 701_{1,2}, 701_{1,3}, 701_{1,4}$ and secondary $701_{2,1}, 701_{2,2}, 701_{2,3}, 701_{2,4}$ rotor banks. When the drive current as denoted by arrows 716 is applied via input cable $715_1$ though brush $717_1$ to the primary drive shaft 702 the current 716 is transferred to rotor $701_{1,1}$ and passed to rotor $701_{2,1}$ through the electrical interconnection formed by contact of brush $705_1$ with a corresponding conductive strip $706_1$, disposed on the outer periphery of the rotor $701_{2,1}$. The torque imparted on rotor $701_{1,1}$ due to rotation of the primary shaft 702 is translated to rotor $701_{2,1}$ by co-operation of gear $707_1$ with corresponding gear $708_1$ disposed on the outer periphery of rotor $701_{2,1}$. The current provided through the conductive strip $706_1$ is translated through rotor $701_{2,1}$ to brush $710_1$ which is coupled to busbar $704_1$ which transfers the current back to rotor $701_{1,2}$ via brush $713_1$. This continuous transfer of current is repeated through rotors $701_{1,2}, 701_{1,3}, 701_{1,4}$ and $701_{2,2}, 701_{2,3}$ of the primary and secondary rotor banks by the series circuit formed by the interaction of brushes $705_2, 705_3$ and $705_4$ with the relevant conductive strips $708_2, 708_3, 708_4$, permitting current to be transferred through relevant combination of brushes $710_2, 710_3, 713_2, 713_3$ busbars $704_2, 704_3$ before exiting via brush $717_2$ which couples rotor $701_{2,4}$ to the return current cable $715_2$ to complete the series circuit.

As can be seen in FIGS. 7A and 7B this particular arrangement of the rotors allows the coils 709 to be connected to form a solid body i.e. no physical gap is required between the coils to accommodate the torque and current transfer arrangement. As such this arrangement allows for a greater utilisation of the internally generated field and thus produces larger torque. In addition to this the shape of the body of the turbine is also aimed at increasing the utilisation of the magnetic field more specifically the coils are crimped in the region where contact is made between the primary $701_{1,1}, 701_{1,2}, 701_{1,3}, 701_{1,4}$ and secondary rotor $701_{2,1}, 701_{2,2}, 701_{2,3}, 701_{2,4}$ banks. The resultant shape of the coils resembles something akin to a pair of binoculars and hence the applicant has termed the arrangement shown in FIGS. 7A and 7B a Binocular Turbine. While one advantage of the binocular turbine is its increased field utilisation another is that as no gap is required between the coils 709 forming the solenoid the overall size as compared with the single and twin turbine examples discussed above of similar power is reduced.

Figure 7C:
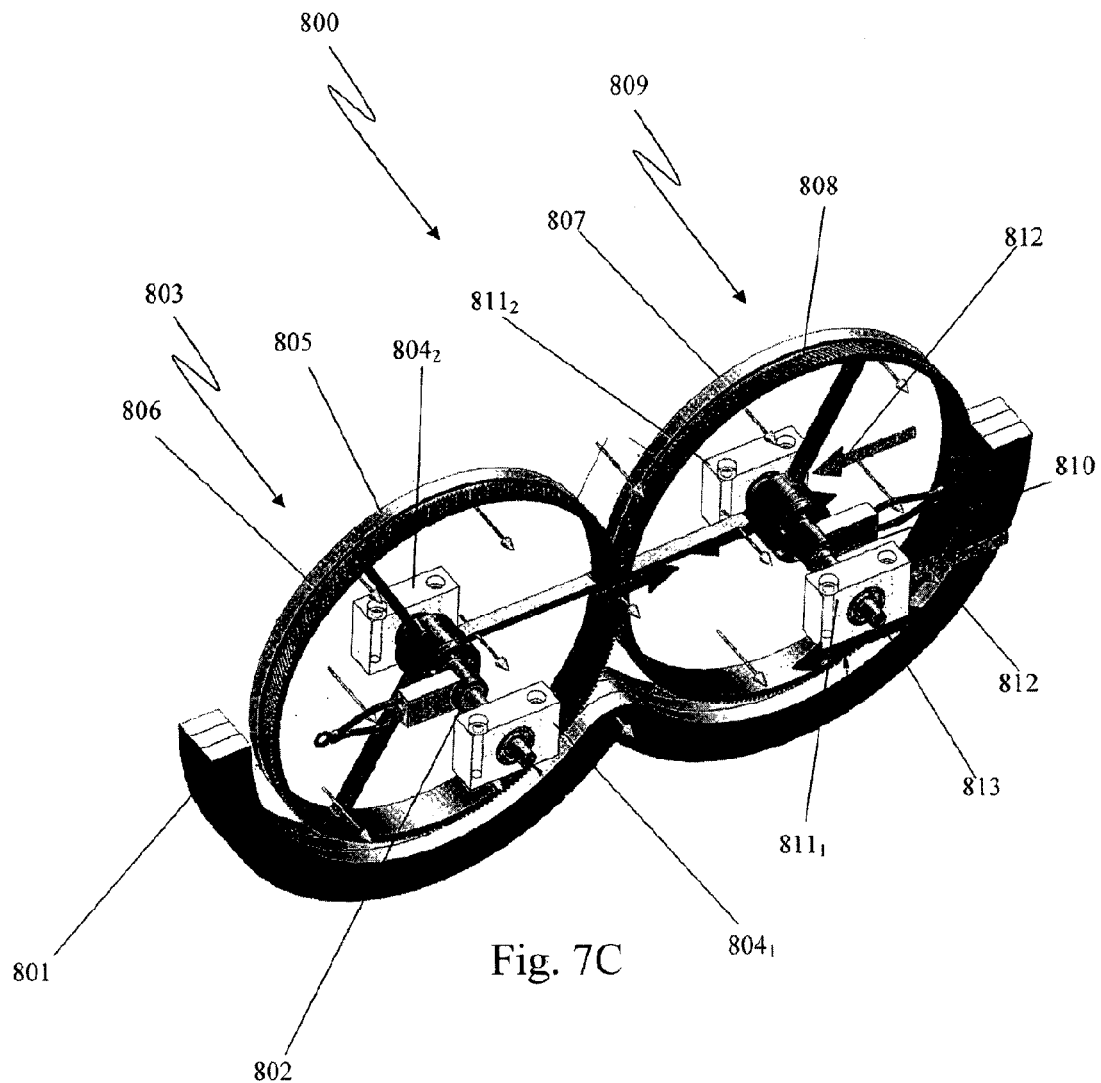
FIG. 7C is a schematic diagram depicting the construction of a turbine providing lateral variation between the rotors according to one embodiment of the invention.

It will be appreciated by those of skill in the art that as all the above discussed examples utilise metallic gearing arrangements to transfer torque between the primary and secondary shafts, that there is the potential for arcing to occur between the teeth of each gear as they mesh. To reduce the potential for arcing the distance between adjacent gears can be adjusted to vary the amount of surface contact occurring between the meshed surfaces of the gears. One example of how such variation could be provided is shown in FIG. 7C which depicts a twin rotor turbine 800 arranged in a Binocular configuration.

The turbine 800 in this example includes coil 801 having mounted therein primary shaft 802 and primary rotor 803. The primary shaft in this instance is mounted between two fixed bearings $804_1$, $804_2$. As with the above discussed examples the primary rotor 803 is coupled both electrically and mechanically via conductive ring 805 and gear 806 to conductive strip 807 and gear 808 of the secondary rotor 809 mounted on secondary shaft 810. To permit variation in the level of contact between the gears 806 and 808 the secondary shaft is mounted on slidable spring loaded bearing mount $811_1$, $811_2$ the force exerted by the springs due to the level of tension placed on them is directed toward the primary shaft as shown by arrows 812. By adjusting the tension on the springs within the mounts rotor 809 and shaft 810 can be moved laterally as shown by arrow 813 toward or away from primary rotor 803 thereby varying the level of contact between the gears 806, 808.

In the case where a series of rotors is utilised as per the above discussed examples of turbine it may also be desirable to change the distance between the rotors. This can be achieved by sliding the rotor discs along the shaft and fixing them on the shaft through the use of pins, grub screws, keyed groove, etc. In such instances a flexible electric cable can be used in place of the busbars to direct the current flow between the rotors to maintain the series current path.

With the above discussed examples the shafts are rotatably mounted with the rotors being fixed to the shaft. Accordingly the mechanical work generated by the shafts can be readily harnessed by coupling the shafts to a drive shaft etc by a planetary gearing system, magnetic clutch or other such suitable transfer arrangements.

As will also be appreciated by those of skill in the art the amount of torque generated is proportional to the strength of the magnetic field. In the above examples all the turbines produce a magnetic field via a solenoid formed from the connection of a number of conductive coils. While it is possible to produce such coils from a standard conductor it is less than ideal. A standard wire coil has very high resistive losses and low current density which results in a much larger space being occupied by the wire. In addition to spatial concerns resistive heating is also a concern indeed given the size of a standard wire coil. The resistive heating produced could result in the wire melting given enough current and time. The applicant has found that large fields can be generated more efficiently from coils constructed from a high temperature superconductor (HTS) material. These coils can then be stacked and connected in series to form a long solenoid. Increasing the number of coil stacks increases the internal generated field as well as forming field lines parallel to the length of the turbine body.

As the solenoid is essentially a large inductor it needs only be charged just prior to operation and does not have to be charged and discharged continually in order to maintain the field. Additionally a simple low voltage DC power input is all that is required to maintain the uniform field. More over forming the solenoid also has the advantage that all generated field is contained within the coil and very little field escapes outside of the windings. This means that the entire generated field can be used to react with the rotor blades to produce useful work.

FIGS. 8 to 17 are field distribution profiles generated from Vector Fields Opera 3d depicting the directionality and intensity of magnetic field produced within coils of varying dimensions. In these examples which follow each coil is composed of 12 mm wide HTS tape with 100 turns and an internal radius of 150 mm.

Figure 8:
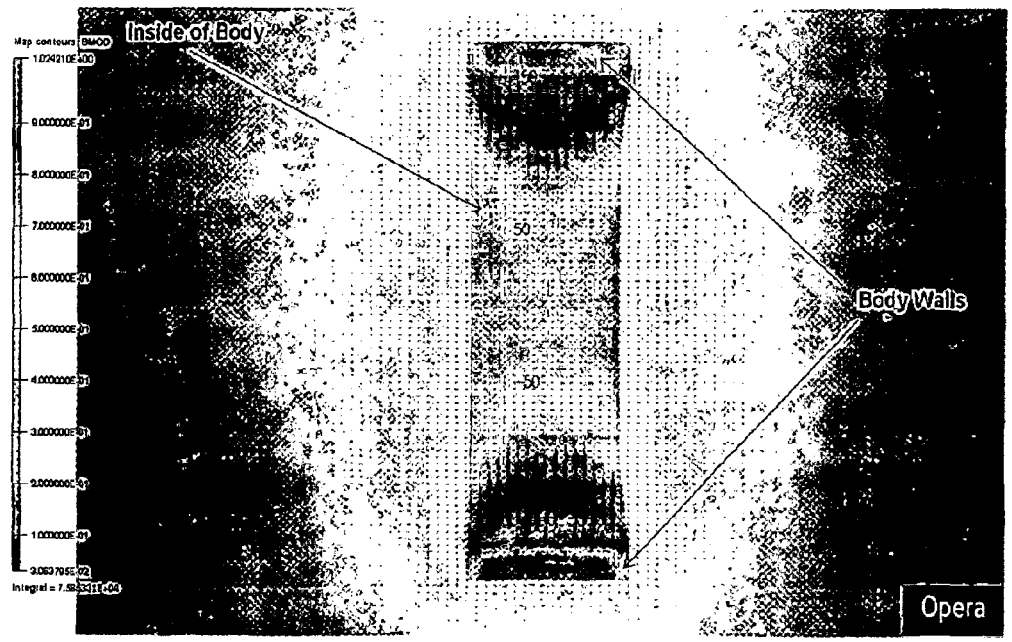
FIG. 8 is a model of the field profile for a solenoid for use in the construction of a turbine according to one embodiment of the invention.
Figure 9:
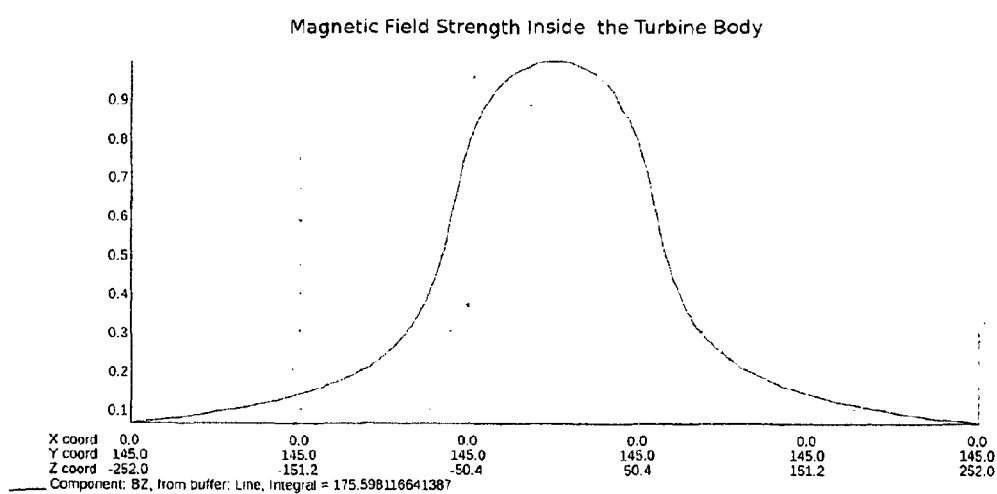
FIG. 9 is a plot of the field intensity along the inner wall of the of the solenoid of FIG. 8.

FIG. 8 is a cross-sectional view depicting the magnetic field produced by 160 A current applied to a solenoid composed of stack of 10 HTS coils. As shown the magnetic field (represented by the plurality of small red arrow heads) generated by the solenoid is parallel to the solenoid's longitudinal axis. It can also be seen from this image that the majority of the magnetic field is contained within the body of the solenoid. FIG. 9 is a plot of the field intensity occurring along the interior wall of the solenoid as shown the peak field occurs approximately half way along the wall and is approximately 1 T in strength.

Figure 10:
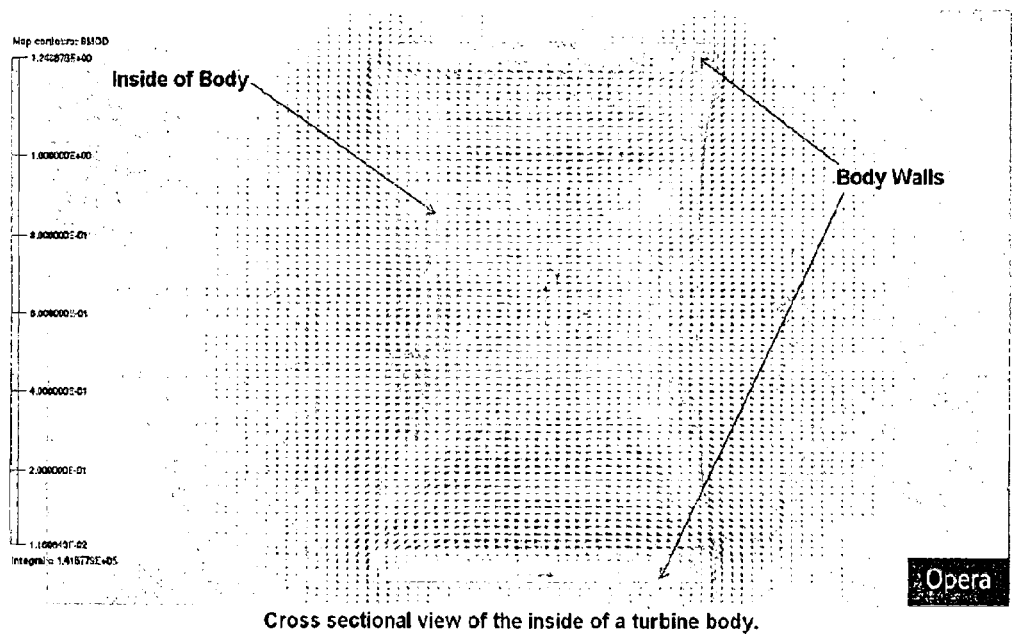
FIG. 10 is a model of the field profile for a solenoid for use in the construction of a turbine according to one embodiment of the invention.
Figure 11:
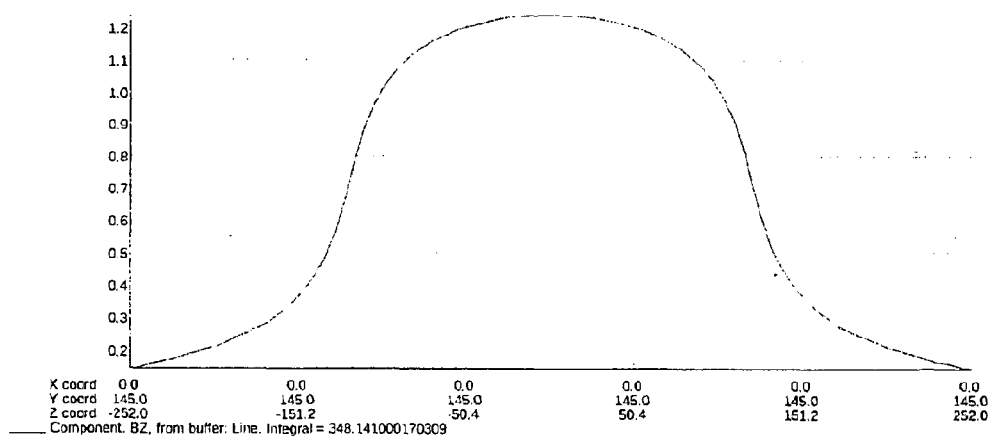
FIG. 11 is a plot of the field intensity along the inner wall of the of the solenoid of FIG. 10.

FIG. 10 depicts a cross-sectional view showing the magnetic field produced by 160 A current applied to a solenoid composed of a stack of 20 HTS coils. Once again the magnetic field (represented by the plurality of small arrow heads) generated by the solenoid is parallel to the solenoid's longitudinal axis. In addition to this it is apparent that the field generated by the 20 coil solenoid covers a significant larger area than that produced with the 10 coil version. As shown in FIG. 11 the 20 coil solenoid produces a field having a larger area than that of the 10 coil version. However the peak field in this case is 1.25 T which is only a marginal increase.

Figure 12:
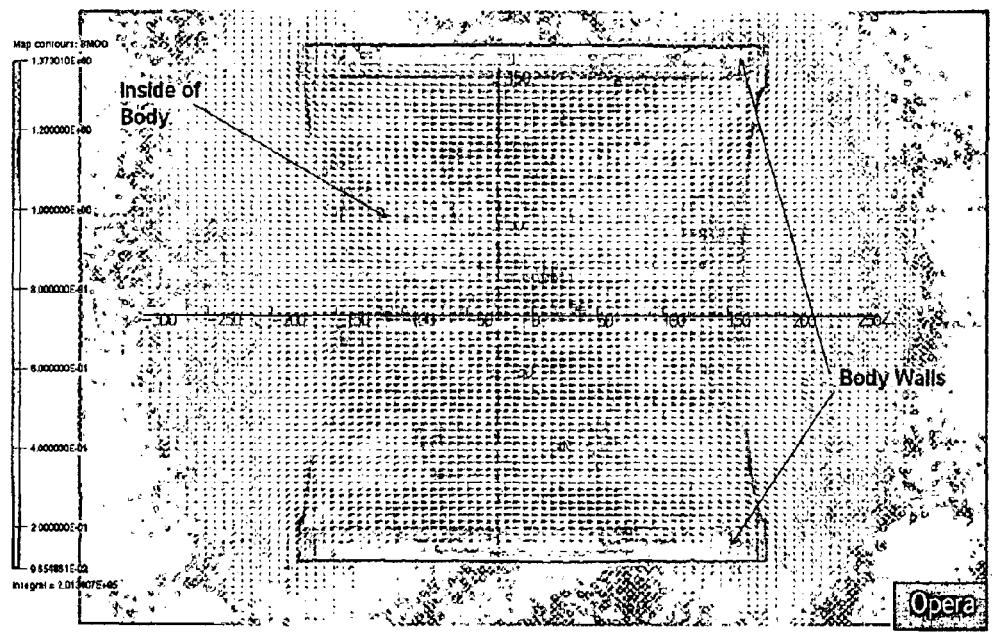
FIG. 12 is a model of the field profile for a solenoid for use in the construction of a turbine according to one embodiment of the invention.
Figure 13:
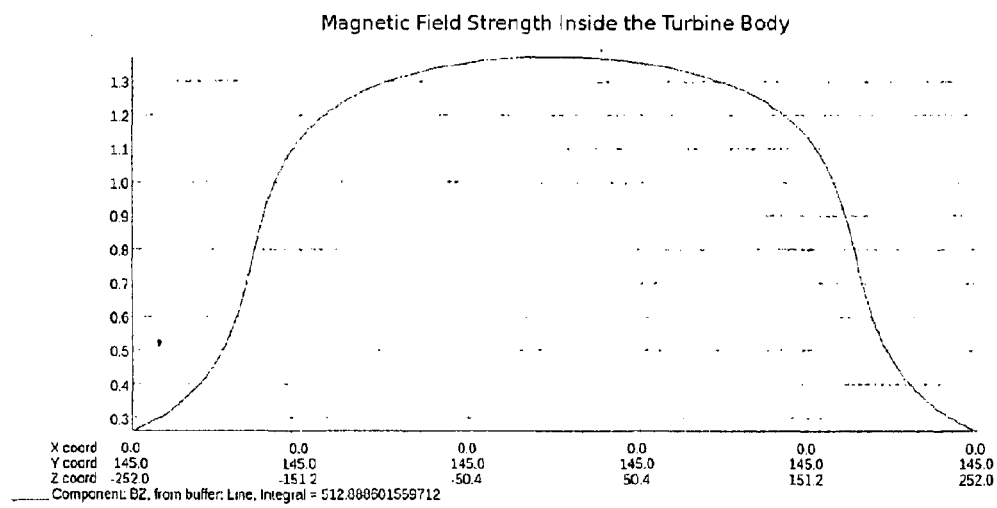
FIG. 13 is a plot of the field intensity along the inner wall of the of the solenoid of FIG. 12.

The magnetic field produced by 160 A current applied to a solenoid composed of stack of 30 coils is shown in FIG. 12. Again it can be seen that by increasing the number of coils the intensity of the resultant magnetic field is increased. As shown in FIG. 13 the field occupies a greater area than that of 10 and 20 coil versions and produces a peak field of approximately 1.4 T.

Figure 14:
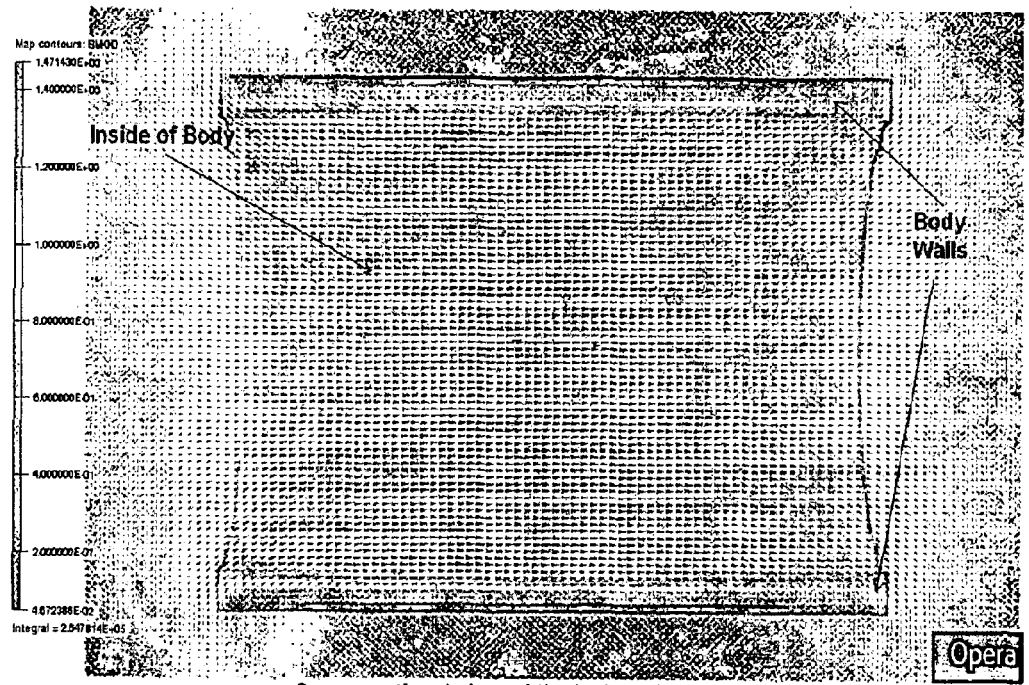
FIG. 14 is a model of the field profile for a solenoid for use in the construction of a turbine according to one embodiment of the invention.
Figure 15:
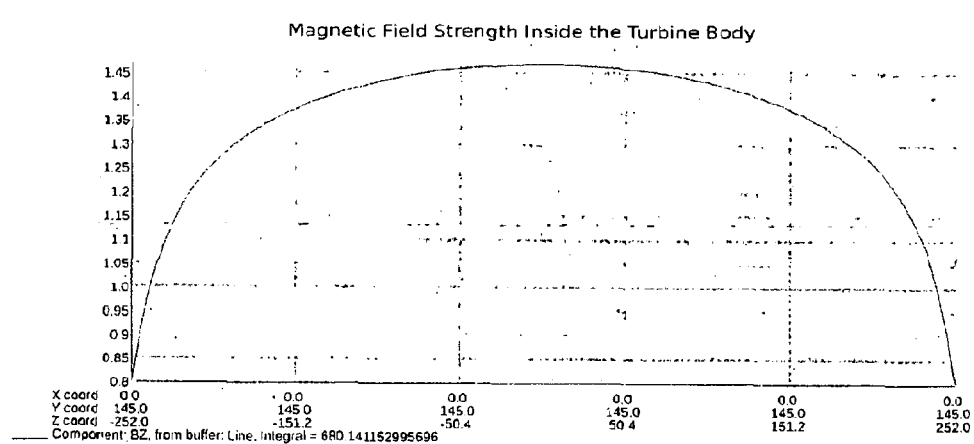
FIG. 15 is a plot of the field intensity along the inner wall of the of the solenoid of FIG. 14.

FIG. 14 depicts the magnetic field produced by a solenoid constructed from a stack of 42 coils with a 160 A of applied current. As with the previous examples the resultant magnetic field is contained within the solenoid and is orientated parallel to the solenoid's longitudinal axis. As can be seen from FIG. 15 the 42 coil version produces a stronger field over a larger area than that produced in the earlier examples with a peak intensity of approximately 1.45 T.

Figure 16:
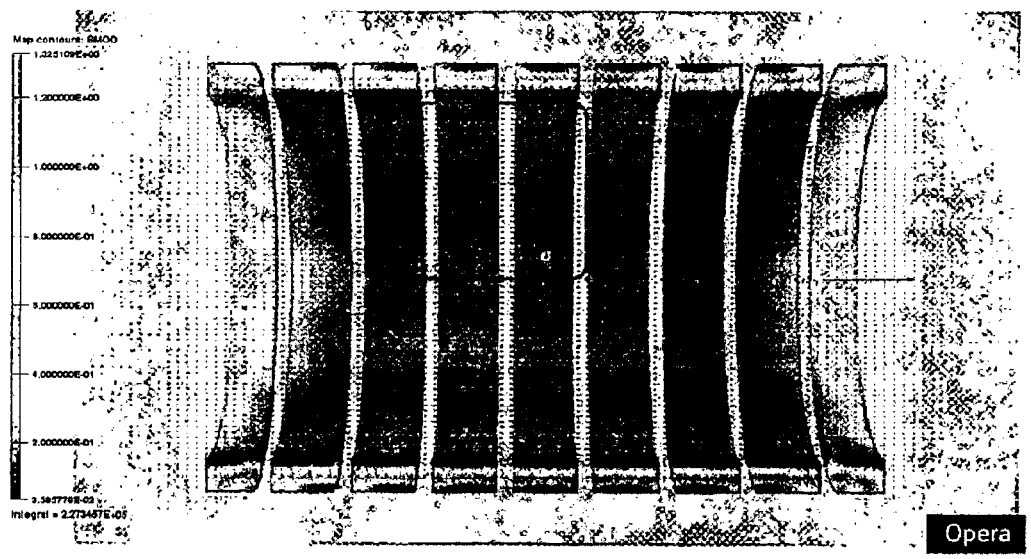
FIG. 16 is a model of the field profile for a solenoid for use in the construction of a turbine according to one embodiment of the invention.
Figure 17:
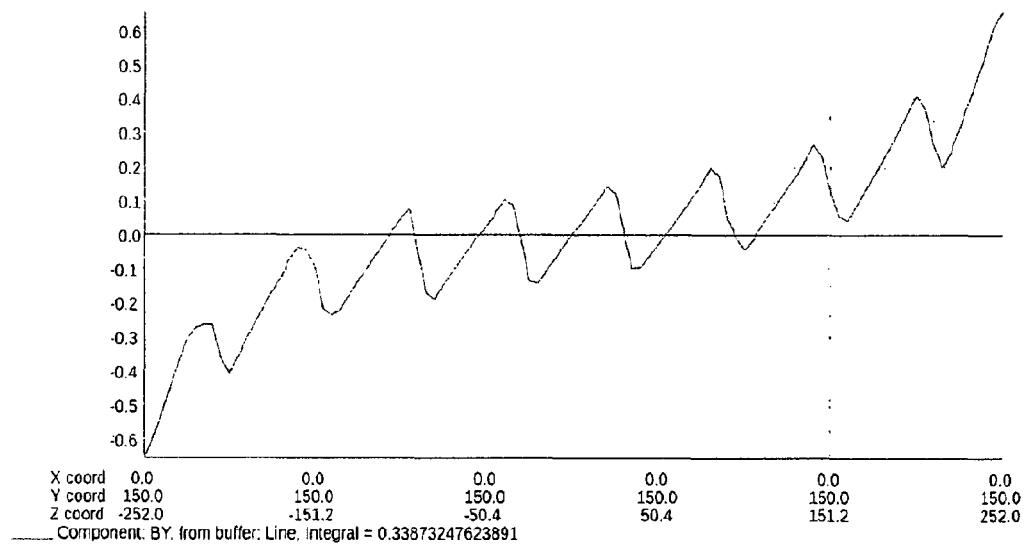
FIG. 17 is a plot of the field intensity along the inner wall of the of the solenoid of FIG. 16.

FIG. 16 illustrates the magnetic field distribution profile for a solenoid constructed from a series of spaced coil stacks composed of coils with a current of 160 A applied. As can be see from FIG. 16 the intensity of the field contained with in the solenoid does weaken in the regions where the gaps are provided however a sufficient large field is still produced with the solenoid. FIG. 17 depicts the field intensity along the interior wall of the solenoid. As can be seen from the field intensity varies by 0.6 T due to the field induced perpendicular to the wall of the solenoid at each of the gaps due to the return flux path. The field however produced within the solenoid remains within an acceptable level.

The models and plots shown in FIGS. 8 through 17 clearly demonstrate that increasing the number of coils results in a larger field over the length of the solenoid. Another factor affecting the field strength is the amount of current applied to the coils. In terms of the current it will be appreciated by one of skill in the art that both temperature and external fields affect the maximum current which can be supplied to a super conductor before it normalizes and becomes a normal conductor. HTS tapes are best used with an external field parallel to the tape since the tape is much less likely to normalize. The behaviour can be seen from FIG. 18 which is a plot produced by American Superconductor for their Generation 1 tape.

Figure 18:
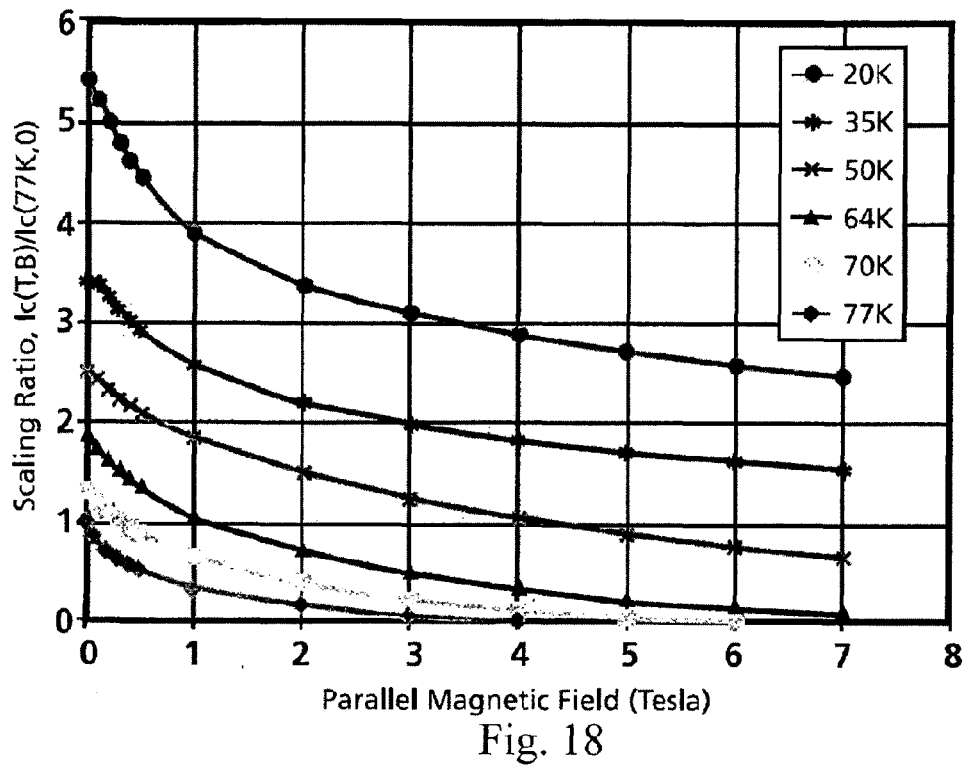
FIG. 18 is a plot of different scaling ratios at different temperature for HTS tape exposed to different parallel magnetic fields.

The plot of FIG. 18 shows the different scaling ratios at different temperature for tape exposed to different self and external fields that are parallel to the tape surface. The scaling ratio is the ratio of the critical current of the wire when exposed to a known self or external field divided by the critical current for a single straight piece of 4 mm wide wire at 77 Kelvin and no external field. The critical current for a straight piece of wire with no external field and at 77 Kelvin is usually between 90-145 amps, depending on the batch, substrates used, etc.

Figure 19:
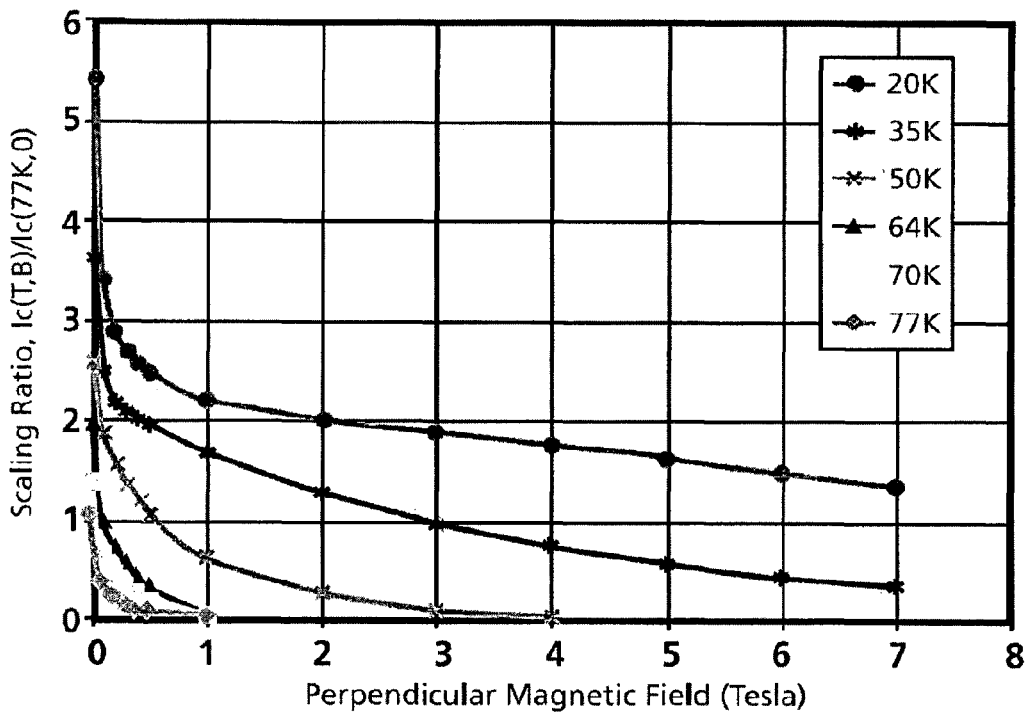
FIG. 19 is a plot of different scaling ratios at different temperature for HTS tape exposed to different perpendicular magnetic fields.

To determine the Ic of 12 mm wide tape at 64K when it is exposed to a parallel self field of 1.4 Tesla, the plot can be used as follows. Firstly we assume Ic at 0 Tesla external field and 77K of 100 amps. The 1.4 Tesla field at 64K gives a Scaling ratio on the Y axis of approximately 0.9 (i.e. 0.9×100=90 amps). This is for 4 mm wide tape, so for 12 mm wide tape the critical current, Ic will be 3 times greater, which gives a 270 Amps Ic. This indicates that the solenoid forming the turbine body can be supplied with up to 270 amps of current to produce a field far above 1.4 Tesla. For a 42 stack turbine body at 160 amps the peak field was just above 1.45 Tesla Unfortunately HTS tapes do not have the same performance when exposed to perpendicular fields, as can be seen from FIG. 19. When the external or self induced field is perpendicular at 64 Kelvin a scaling ratio of 0.9 will limit the allowable self or external field to approximately 0.2 Tesla, or 0.6 Tesla for a 12 mm wide tape.

While the examples shown in FIGS. 8 to 17 show that although the magnetic field is parallel to the turbine body, exception to this is near the ends or gaps in the case of FIGS. 16 and 17 of the turbine where the field direction changes as it begins a return path from North to South. Thus at the ends of the solenoid the induced magnetic field is perpendicular to the tape surface. The effect of this reversal is that the amount of current that can be pumped into the coil at a given temperature is effectively limited by the strength of this field reversal. One way of overcoming this limitation is through the use of ferrite based flux guides that effectively 'steer' the flux reversal out and away from the end of the body. In an alternating field the use of such guides presents another loss factor due to magnetic hysteresis but as the field generated by external coils remains in a steady state, the use of ferritic flux guides to obtain a higher level of coil performance seems warranted.

The ferrite of choice for the investigations into the effectiveness of different shaped flux guides was a typical Low Carbon Cold-Rolled Steel and was primarily selected due to factors of availability and its relatively high saturation point (around 2 T). While there are other materials with higher permeability curves, they generally present problems such as a lower Saturation Point, availability, workability or difficulties in obtaining convergent non-linear solutions in high-permeability materials at or near saturation when attempting to develop computational models.

In essence, a variety of flux guide geometries were modelled and examined. The best performing examples generally consisting of large rectangular toroidal shaped flux guide. Of these, lower perpendicular field values were obtained where the toroid was adjacent to the end of the body, with an inner radius 50 mm smaller that the inner radius of the body, an outer radius 10 mm smaller than that of the body and a depth or around 60 mm. Incursions into the inner region of the body resulted in a earlier reversal of flux, proving counter-productive.

Figure 20:
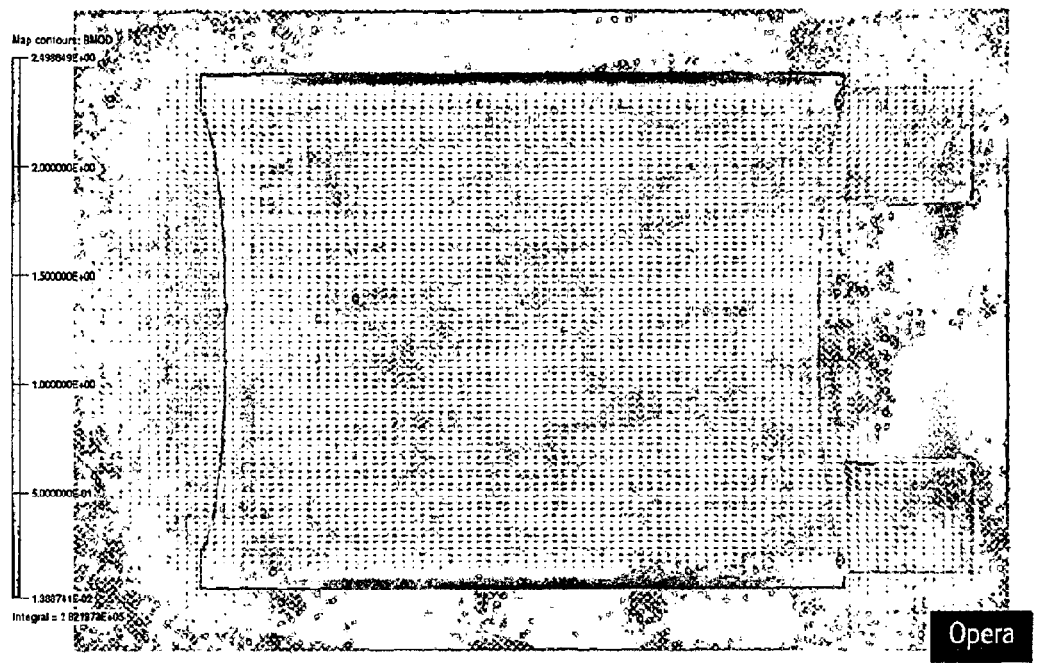
FIG. 20 is a model of the field profile for a solenoid fitted with a flux guide for use in the construction of a turbine according to one embodiment of the invention.
Figure 22:
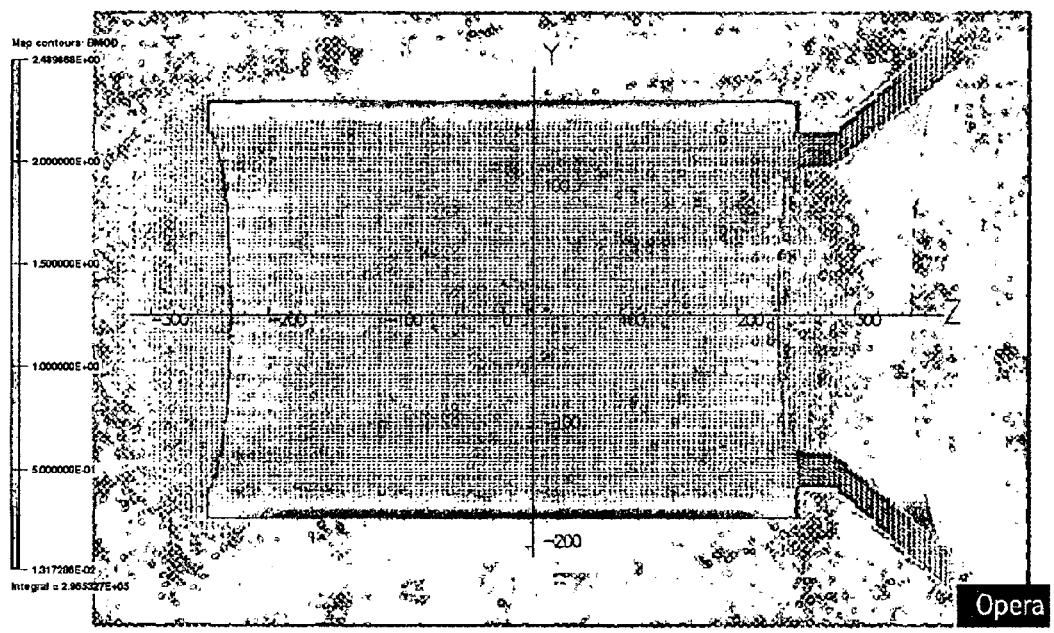
FIG. 22 is a model of the field profile for a solenoid fitted with a flux guide for use in the construction of a turbine according to one embodiment of the invention.

For the purposes of clarity and ease of description a single flux guide is shown in FIGS. 20 and 22. Moreover depicting only a single flux guide clearly illustrates the effect such guides have on the field at the ends of the coil. It will of course be appreciated by those of skill in the art that in a practical application flux guides will be fitted to both ends of the coil (see FIG. 24) to reduce the effects of perpendicular fields occurring in these regions.

Figure 21:
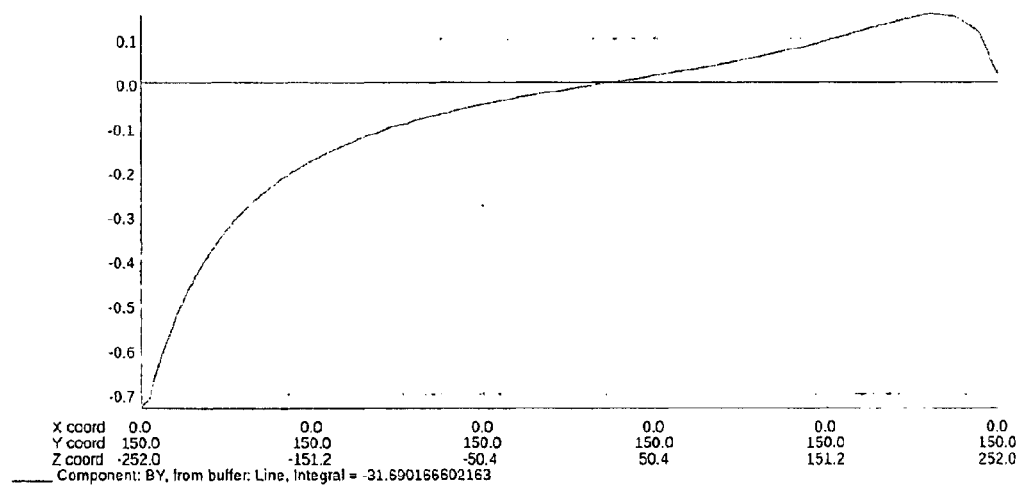
FIG. 21 is a plot of the effects of the flux guide on the field intensity within the solenoid of FIG. 20.

One example of the use of such a guide and its effects on the field at the ends of the solenoid is shown in FIG. 20. With reference to the Jc/Jc0 data provided earlier, it is reasonable to expect to be able to run 160 A through these coils as they are subjected to a parallel field of 1.5 T and a perpendicular field of less than 0.2 T at around 64-70K. Fitting the flux guide to the end we see a reshaping of the field as it exits the solenoid more specifically the peak field near the inner ends drops as shown in FIG. 21. In the case of the guide of FIG. 20 the field near the inner edge of the solenoid shows a perpendicular field of around 0.15 T within the target range.

Figure 23:
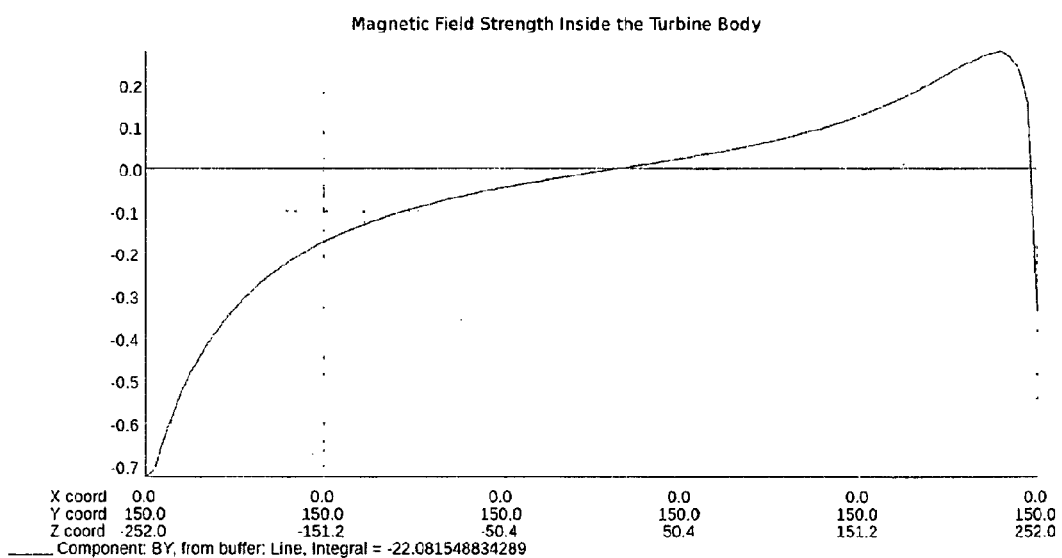
FIG. 23 is a plot of the effects of the flux guide on the field intensity within the solenoid of FIG. 22.

FIG. 22 depicts an alternate arrangement of a flux guide for use with the turbine of the present invention. In this particular example the guide has a conical shape and directs the field out and away from the end of the solenoid. As can be seen from the perpendicular field plot of FIG. 23 the conical flux guide reduces the perpendicular field to near optimum levels with a peak value of around 0.25 T opposed to the 0.6 T variation in the case shown in FIGS. 16 and 17.

Figure 24:
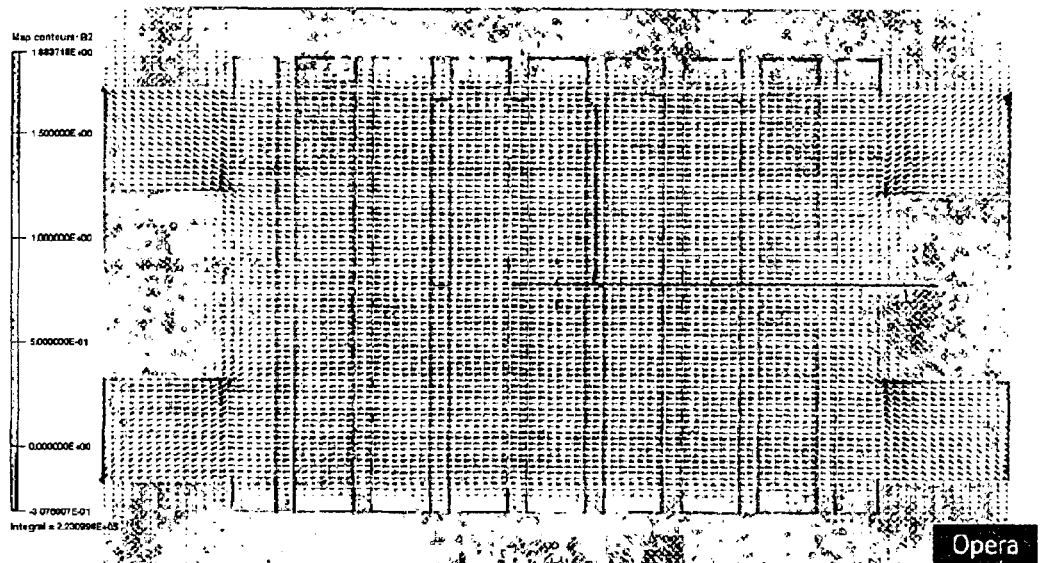
FIG. 24 is a model of the field profile for a solenoid fitted with a flux guide for use in the construction of a turbine according to one embodiment of the invention.
Figure 25:
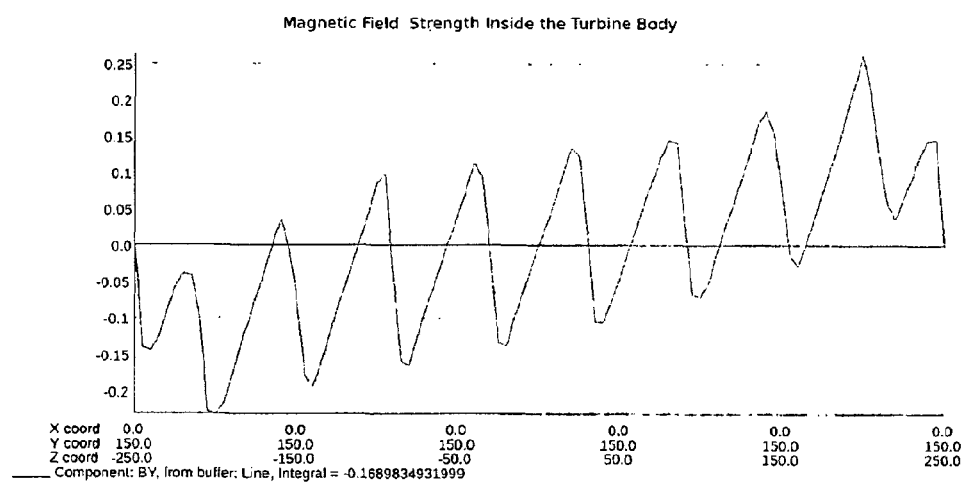
FIG. 25 is a plot of the effects of the flux guide on the field intensity within the solenoid of FIG. 24.

In the case of the single and twin turbine models discussed above the solenoid includes a series of gaps to permit the transmission of torque and current between the primary and secondary shafts. As a result of these gaps significant perpendicular field variation can occur along the length of the solenoid. FIG. 24 shows a model of the gapped solenoid with ferritic flux guides disposed at either, end. In FIG. 25 it can be seen that the field variation remains under 0.23-0.25 T, hence the use of external flux guides would seem sufficient to achieve near the target field specification.

It will be appreciated by those of skill in the art the performance of the HTS tapes and thus the turbines improved markedly with a decrease in temperature with the ideal temperature range for the HIS tape being between 65-70K. As will be appreciated by those of skill in the art still further improvement in performance of the HIS tape can be achieved if the temperature can be dropped to as low as 15K. As the optimum range are in the sub liquid nitrogen range the applicant envisages that the turbines will include cryogenic cooling systems such as a Stirling cycle cryocooler to encase the turbine in a cryogenic envelope with a temperature range between 15-70K.

As briefly mentioned above one area of loss that is of concern is that of the generation of eddy currents in parts of the turbine assembly and in particular the turbine rotors. In the case where the rotors are formed from a conductive material the primary regions of concern are the rim/gear interface and to a lesser extent the inner drum and brush contact. The power loss (P) caused by eddy current for the case of a simple thin wire can be calculated by:

$$P = \frac{\pi^2 B_p^2 d^2 f^2}{12\rho D}$$

where D is the penetration depth:

$$D = \frac{1}{\sqrt{\pi f \mu \sigma}}$$

The parameters for the above equations include Bp—peak flux density (T), d—thickness of the sheet or diameter of the wire (m), ρ—resistivity (ωm), σ—electrical conductivity, μ—magnetic permeability and f—frequency.

By taking the higher order terms of these equations into account it is possible to see the types of properties that have a large influence on the generation of eddy currents. For normal conducting elements of the turbine assembly factors that influence and minimise the generation of eddy current include using lower magnetic field strengths or slowing the frequency of change (both of which impact torque and power output and are thus counter-productive). Using thinner sections or laminating the materials reduces the d component reducing the path width that the eddies can circulate about. Additionally, sections that do not normally carry current can be made from material that have a higher resistivity, which opposes the generation of circulating current through additional resistance.

For superconducting elements the issue of eddy currents is governed by another effect. An interesting property of superconductors is the fact that they exhibit diamagnetism. That is, when cooled to below the critical temperature field that was previously able to pass through the material, in its normal conducting state, is expelled from within the material. The fact that the field cannot pass through the conductor is responsible for the levitating behaviour seen in a superconducting sample. It also means that eddy currents cannot form within the superconducting material. This field expulsion is called the Meissner effect. Accordingly the applicant has devised a number of methods for counteracting any eddy current generation.

The first is through a process similar to the idea of electro-dynamic suspension used in levitating trains. As superconductors have properties of diamagnetism they naturally expel field from within themselves. This property is exploited in levitating trains where the generation of a magnetic field within the coils that counters the eddy currents induced upon the coils is used to prevent additional drag on the drive mechanism of the train due to eddy creation. In the case of the engine any eddy currents are effectively shielded or countered by winding a closed loop of HTS wire to cover the side walls of both the inner and outer drum elements as shown in FIG. 3.

The second method also involves winding HTS wire around the outer rim/gear interface and the drum and brush contact, however in this method the wound coils are not a closed loop but they are connected to a power source in series. This will allow for current to be passed through the windings to generate a strong magnetic field which would expel most or all external field, hence reducing the eddy currents through the material. There are numerous ways to accomplish the current delivery path, but one possible method is to have a conductor cable running inside the insulated shaft on which all rotor discs are rotating about. The current can then be supplied to the coil located on the inner drum and from there to the coil on the outer drum/gear interface. From here it can then be passed to the inner drum of the next rotor disc, back to the outer rim/gear interface, and so forth.

The third method uses permanent magnets to expel the external field and to reduce eddy currents. The magnets are similarly placed at the outer drum/gear interface and they inner drum and brush contact. The permanent magnets can be made to the required size and field strength. The field strength, although fixed, can be determined through selecting the appropriate grade. Neodymium rare earth magnets tend to be the most stable and offer the strongest fields.

The fourth method is to omit the use of a coil or permanent magnet to expel the external fields and to minimize the eddy currents through material selection. It is recommended that Titanium is used to construct the turbine drum, that is, the blade frame, the hub, and gears are all constructed out of Titanium. Titanium having superior mechanical properties allows for similar turbine drum mechanical strength to be achieved with less material compared to other materials. By decreasing material thicknesses along eddy current prone areas the generation of eddy currents will be further impeded. Titanium has 25 times more electrical resistance than copper (Titanium has 420 nω/m versus Copper with 16.78 nω/m). This higher resistance will make the free flow of eddy currents more difficult and hence smaller eddy currents will be generated within the surface of the turbine drum. The ideal solution still involves using super conducting material for the path between the inner hub and the outer rim since the superconducting material possesses diamagnetic properties which expel eddy currents. The Titanium components would be coated or plated with a conducting surface such as copper or silver specifically to aid conduction between gear interfaces or other electro-mechanical interfaces. Aside from Titanium or any other material that has suitable mechanical properties and low electrical conductivity can be used.

From the above discussion it is apparent that the fundamental design issue which affects the performance of the turbine is the design of the magnetic field within solenoid. To maximise the efficiency of the turbine a high strength axial field is required. In the following examples the field is limited to approximately 1.4-1.5 Tesla to due to the limitation of the super conducting tape at 65 Kelvin. The current in the outer coils, twin turbine or binocular, required to generate this field is around 160-170 Amps. If additional cooling allowed for a higher current limit, say of around 300 A, then fields of greater than 3 Tesla could be achieved. Applicant envisages that as HTS tapes and cryogenic technology develop a field of 3 to 4 Tesla could be achieved using the exemplified arrangements of the coils.

Figure 26:
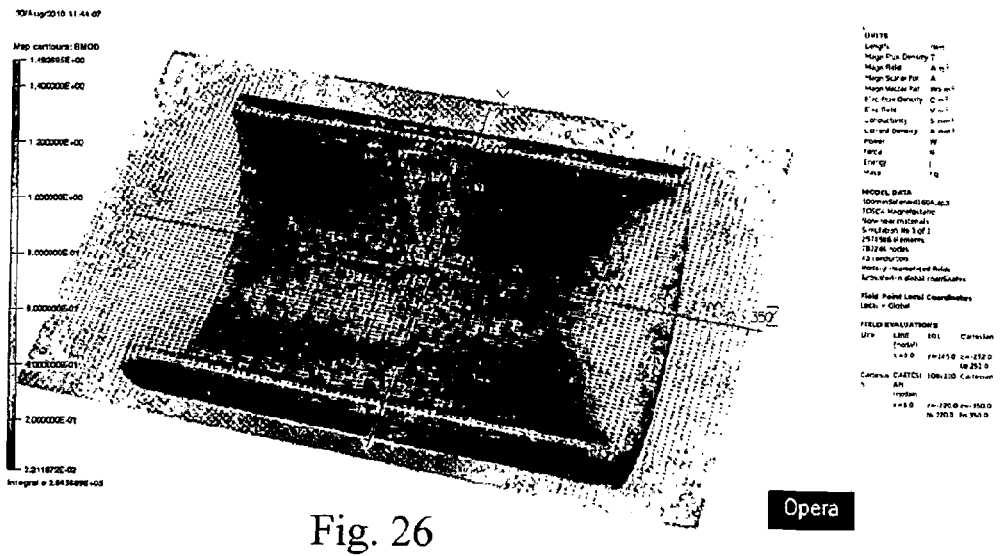
FIG. 26 is a model of the field profile for a solenoid for use in the construction of a turbine according to one embodiment of the invention.
Figure 27:
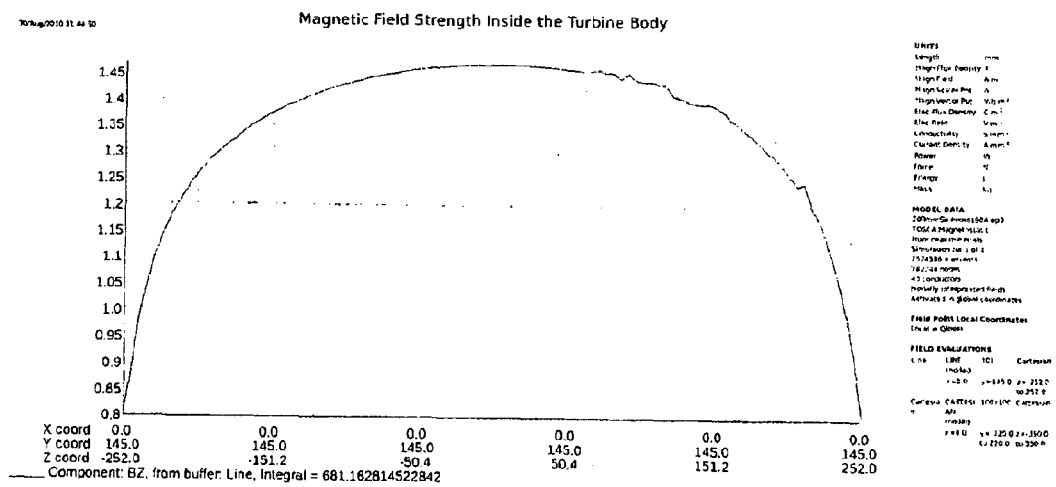
FIG. 27 is a is a plot of the field intensity along the inner wall of the of the solenoid of FIG. 26.

FIG. 26 there is illustrated field distribution profile of solenoid (as shown in section) formed form a stack of 42 HTS coils for use in the construction of a single and/or twin turbine according to one embodiment of the present invention. As shown the field strength within the solenoid (as with the examples shown in FIGS. 8 to 17) tends to taper off in the centre of the turbine bodies, near to each end. The amount of length where the axial field strength remains within an acceptable range (i.e. within a specified tolerance from the peak field value of 1.4-1.5 T) within the solenoid is known as the working distance. In order to maximise efficiency of the turbine the rotors should be positioned within this working distance i.e. the rotors are positioned within the region having the highest uniform magnetic field. Also positioning the rotors within this region acts to minimises the generation of back emf due to stray field variations when the turbine is in operation. FIG. 27 depicts the field strength along the turbines longitudinal axis. In the present examples the applicant has defined the working distance of the solenoid as is the region where no more than a 10% to 15% drop off from the peak field is experienced. In the case of FIGS. 26 and 27 the working distance is approx 200 mm i.e. region of the curve in FIG. 27 where a 0.15 T drop from the field occurs.

Figure 28:
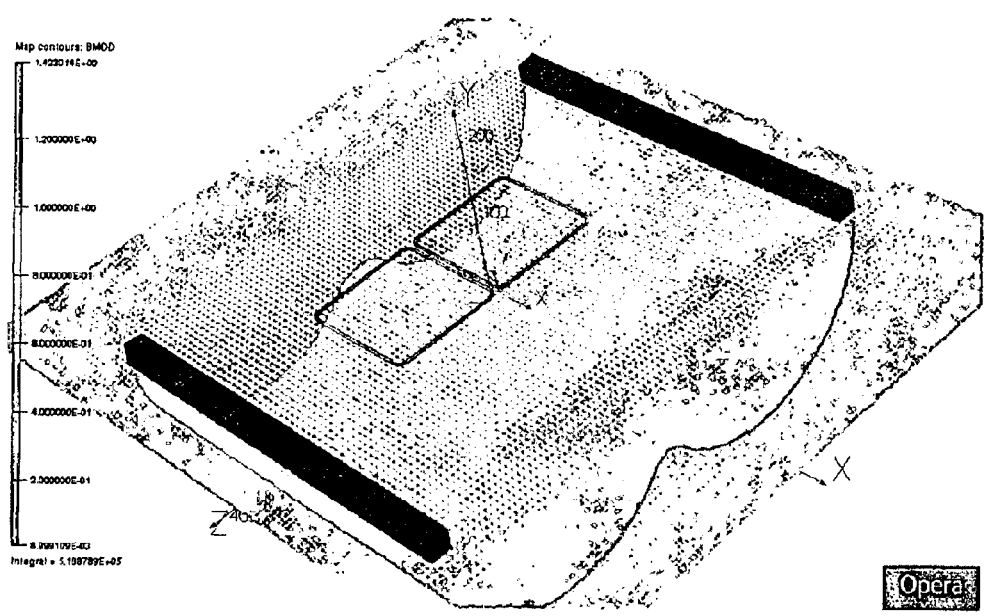
FIG. 28 is a model of the field profile for a solenoid for use in the construction of a turbine according to one embodiment of the invention.
Figure 29:
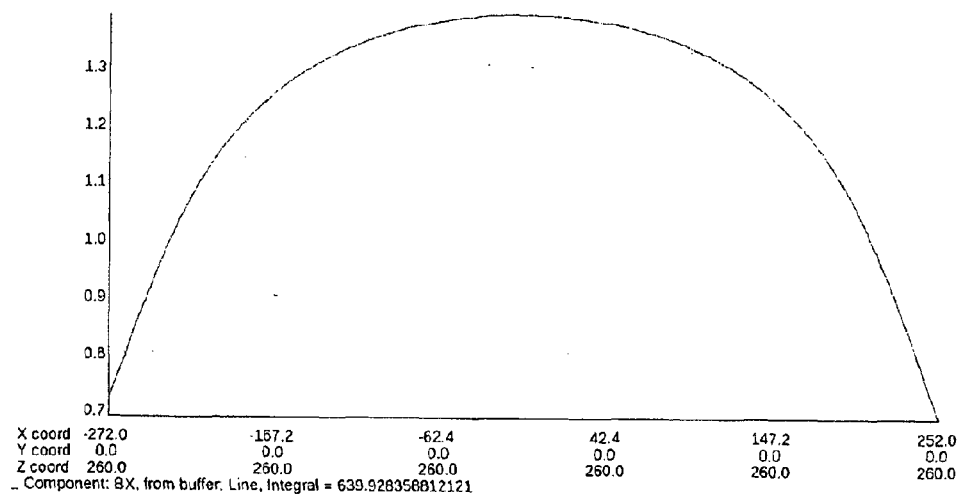
FIG. 29 is a is a plot of the field intensity along the inner wall of the of the solenoid of FIG. 28.
Figure 30A:
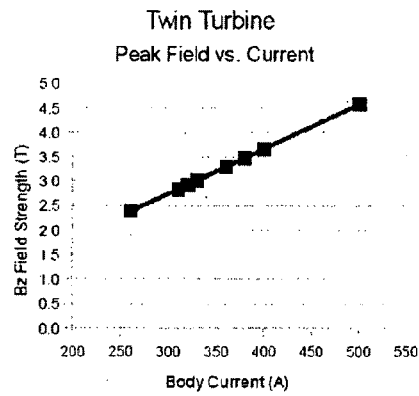
FIGS. 30A to 30D are plots depicting the peak field and torque versus drive current for various turbine configurations.
Figure 30B:
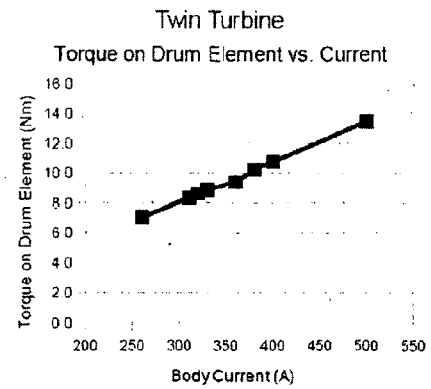
Figure 30C:
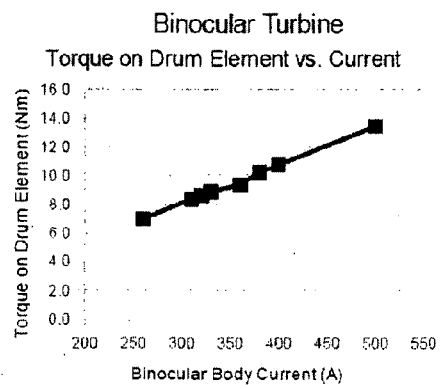
Figure 30D:
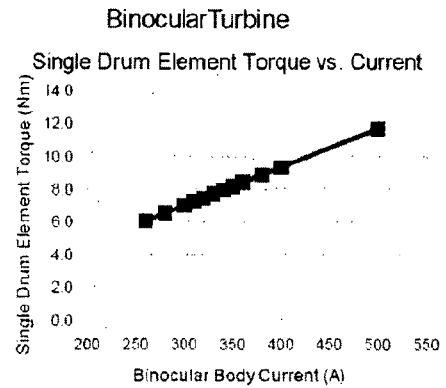
Figure 31A:
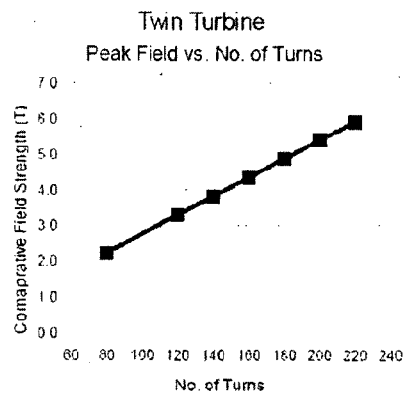
FIGS. 31A to 31D are plots depicting the output torque versus the number of turns forming the coils for various turbine configurations.
Figure 31B:
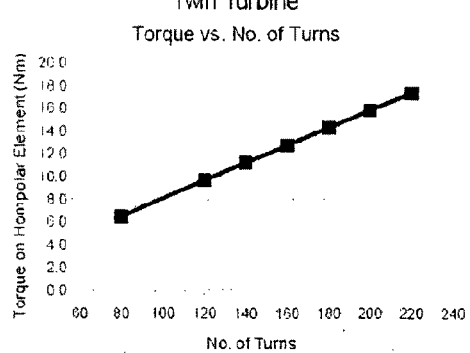
Figure 31C:
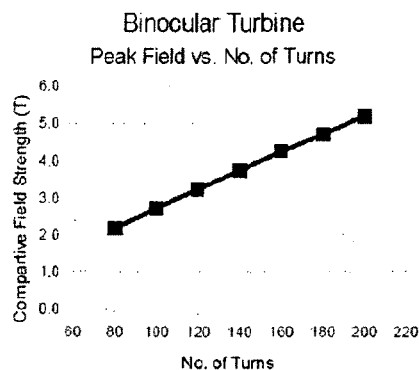
Figure 31D:
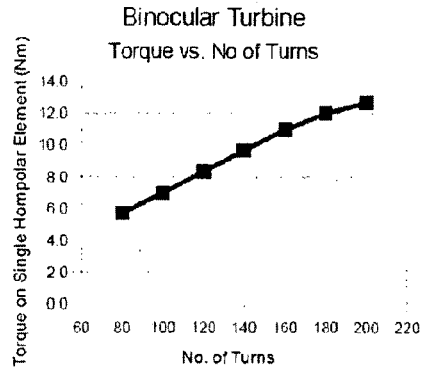

FIG. 28 is a partial sectional view binocular solenoid composed of 42 HTS coils showing the field distribution profile. As can be seen from FIG. 28 there is the potential for the field to drop off in the middle of the turn around, where the radii described by the turbine blades intersect. In an ideal case the gap distance between the two return arcs of the outer binocular coils would be minimised to develop the maximum field strength. In practice, limitations on bending radius in the outer HTS layers and the need for clearance between the various stationary and rotating elements limit how pinched in the binoculars can be made. FIG. 29 is a plot of the field strength along the internal edge of the solenoid of FIG. 28. Note the comparative uniformity of the central 200 mm of the coil (i.e. working distance of 200 mm). The increase in field drop off can be attributed to the need for additional clearance between the two halves of the binocular coil.

FIGS. 30A to 30D are a series of plots that demonstrate changes in peak field (B axial) and the corresponding output torque are proportional to the current in the winding of the solenoid for both the Twin and the Binocular Turbine discussed above. While the range of current is slightly higher than is initially specified, the proportionality observed holds for the lower current cases.

The series of plots illustrated in FIGS. 31A to 31D demonstrate the fact that the peak field and output torque again vary proportionally to the number of windings in the coils that make up the solenoid forming the turbine bodies. The Binocular case sees a slight tapering off of the output torque. This is attributed to the need to modify the gap distance and the return radius of the binoculars in order to accommodate the physical size of the increased number of windings. Again the baseline current for the above variations was 300 A—higher than the intended range of operation of 160-170 A but the results will scale with the current.

Figure 32A:
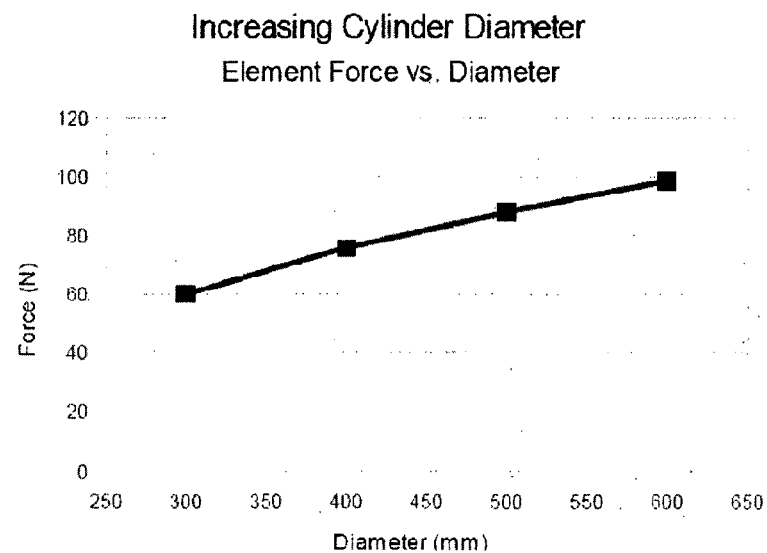
FIGS. 32A and 32B are plots depicting the force and torque versus the diameter of the solenoid.
Figure 32B:
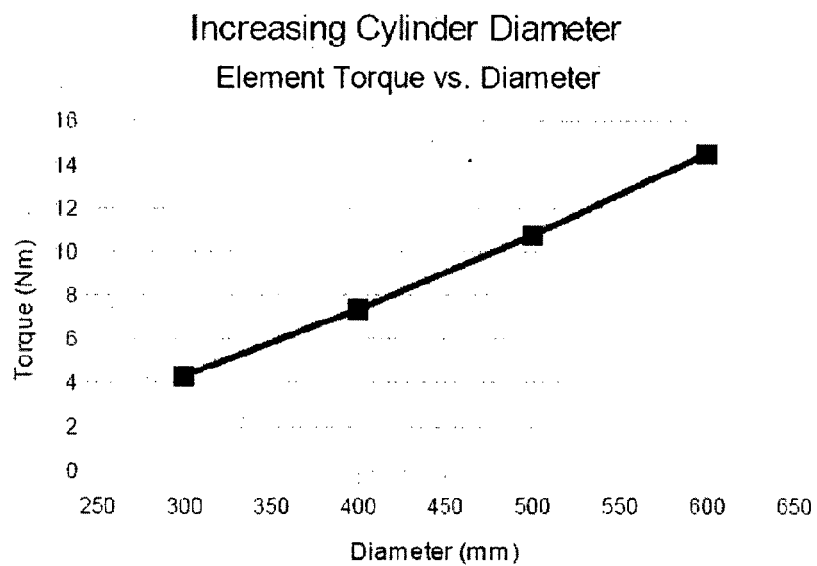

FIGS. 32A and 32B depict the effect of increasing the size of the body. As the torque values obtained from both twin turbine and binocular cases were of similar value only the twin turbine case was considered. The trends observed can be reasonably expected to apply to the binocular case as well. Interestingly the force on the individual drum element appears to scale proportionally to an increase in the body radius whereas the torque obtained appears to vary with the square of the radial increase. This would indicate that larger body sizes are likely to obtain better performance characteristics. Increasing the overall scale of the device does become impractical for experimentation but these results do show an important line of potential research.

Figure 33:
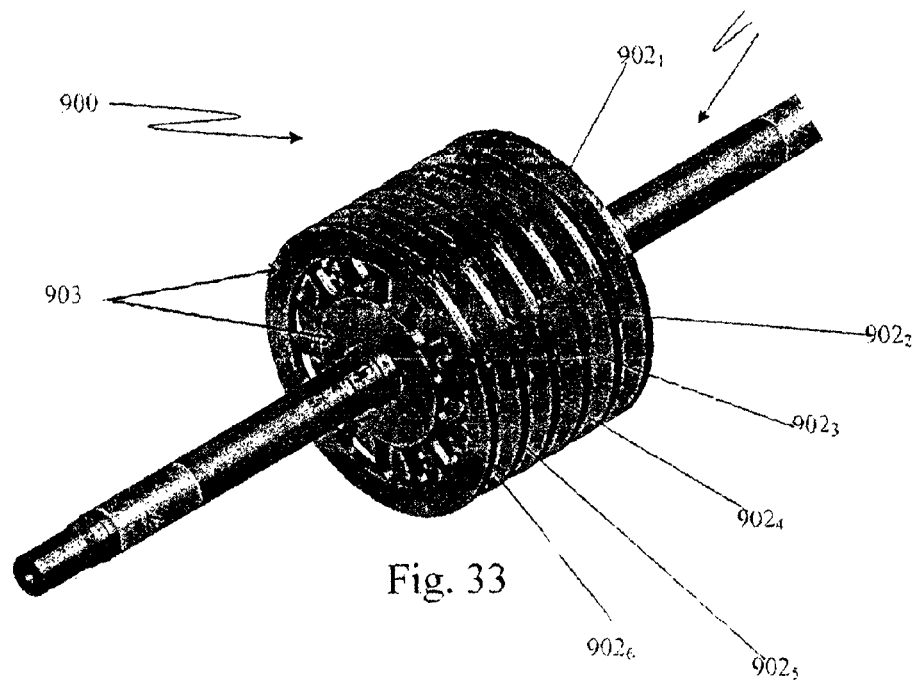
FIG. 33 is a schematic diagram depicting the construction of a rotor assembly for use in a turbine according to one embodiment of the invention.

With reference to FIG. 33 there is illustrated one embodiment of a rotor assembly 900 for a motor which utilises the aforementioned principles of the high speed turbines discussed above. As shown the rotor assembly 900 includes a series of rotors $902_1$, $902_2$, $902_3$, $902_4$, $902_5$, $902_6$ mounted on shaft 901. The shaft 901 being positioned co-axially with respect to central axis of the rotors $902_1$, $902_2$, $902_3$, $902_4$, $902_5$, $902_6$. In this particular example the rotors $902_1$, $902_2$, $902_3$, $902_4$, $902_5$, $902_6$ are fixed to the shaft 901 which is free to rotate. It will of course be appreciated by those of skill in the art that the shaft could be fixed while the rotors $902_1$, $902_2$, $902_3$, $902_4$, $902_5$, $902_6$ are free to rotate about the shaft 901. In such a configuration the rotors $902_1$, $902_2$, $902_3$, $902_4$, $902_5$, $902_6$ could be mounted on the shaft 901 via bearings allowing each rotor to rotate independently of the shaft 901.

In the present example the rotors are of similar construction to that of the rotors discussed in relation to FIG. 3 above and include a rim which is coupled to a hub via a plurality of arms. The rotors $902_1$, $902_2$, $902_3$, $902_4$, $902_5$, $902_6$ in this case include contact regions $903_1$, $903_2$ disposed adjacent the rim and hub. The contact regions are provided for contact with brush assemblies mounted on current transfer mechanisms (stator frames) positioned between each rotor. The construction of the current transfer mechanisms is discussed in further detail below.

The shaft 901 as in the above examples is utilised to supply the current/voltage through the assembly to enable the production of a series circuit through the rotors $902_1$, $902_2$, $902_3$, $902_4$, $902_5$, $902_6$. The rotor assembly in this instance is designed for operation at current of approximately 2000 A. To ensure maximum current transfer the shaft and the rotors may have their contacting surfaces i.e. the surfaces in direct contact with the brush assemblies affecting the transfer of the drive current, gold plated.

Figure 34:
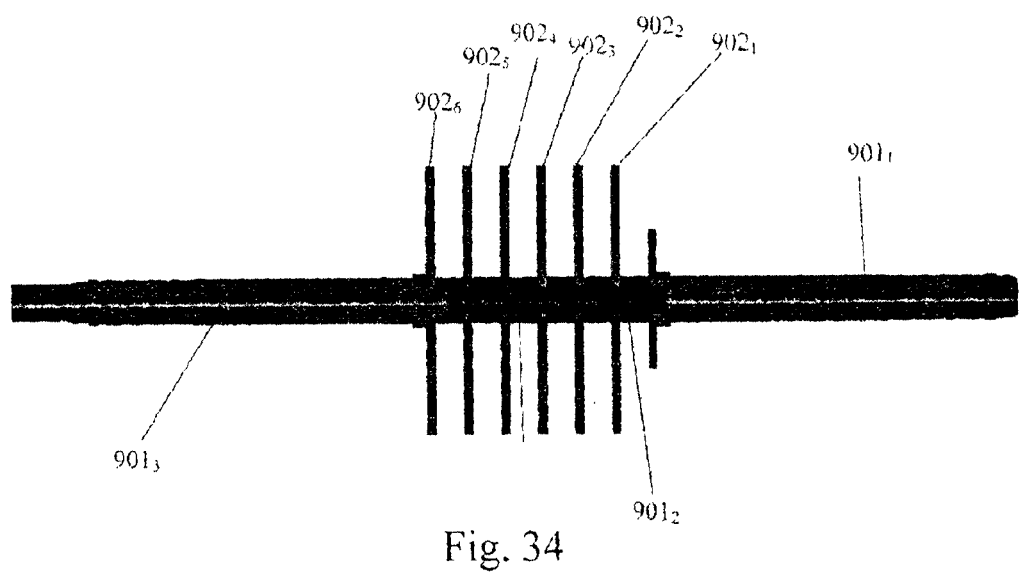
FIG. 34 is a cross-sectional view of the rotor assembly of FIG. 33.

FIG. 34 shows the arrangement of the rotor assembly 900 in further detail. As shown the shaft 901 in this instance is composed of 3 sections an input section $901_1$, mid section $901_2$ and output section $901_3$ coupled together to form the shaft. The input and output sections of the shaft are constructed from a conductive material while the mid section is constructed from insulating/isolating material. The entire shaft 901 in this example is provided with a passage for receipt of a rod 905 (Not shown). The rod in this case provides additional reinforcing for the shaft, the rod may also be coated in an insulating material enabling the shaft to be safely coupled to gearing assemblies etc (i.e. external gears etc electrically isolated from the shaft and not enlivened).

As shown the majority of the rotors $902_1$, $902_2$, $902_3$, $902_4$, $902_5$ are positioned on the mid section $901_2$ at discrete intervals. The mid section $901_2$ is in the form of a series of interlocking, self locating elements each element supporting a rotor $902_1$, $902_2$, $902_3$, $902_4$, $902_5$. The rotors are spaced apart and do not contact the conductive sections of the shaft 901 with the exception of rotor $902_6$, which in this example is positioned on the output section $901_3$ of the shaft 901. To provide the required series circuit through the rotors, current transfer mechanisms in the form of stator frames are positioned between the rotors. Contact between the rotors and stator frames is by means of brushes disposed on the stator frames. The brushes are positioned such that they engage the contact surfaces of the relevant rotors. The construction of stator frame and arrangement of the brushes is discussed in further detail below.

The elements comprising mid section $901_2$ of the shaft must be constructed from a material that is strong enough to transmit the torque produced by the motor and which also is capable of electrically insulating/isolating the input side $901_1$ of the shaft from the and output $901_3$ side in order to prevent shorting of the motor. That is the material must be a suitably insulating material with suitable mechanical properties. One material that may be suitable for the construction of the elements of mid section $901_2$ is anodised Aluminium. The anodised layer on the surface of the aluminium forms an electrical insulating/isolation layer between the copper and aluminium surfaces. The quality of the insulation/isolation (i.e. the voltage that can be applied across it before breakdown) is a function of the depth of the anodised layer. In this application an anodising depth of 40 μm on the surface of the aluminium components will be sufficient since only low voltage will be used (i.e. less than 10V). It will of course be appreciated by those of skill in the art that other materials could be utilised such as any suitable metal provided it is electrically insulated from the conductive components or suitable fibre composites etc.

Figure 35:
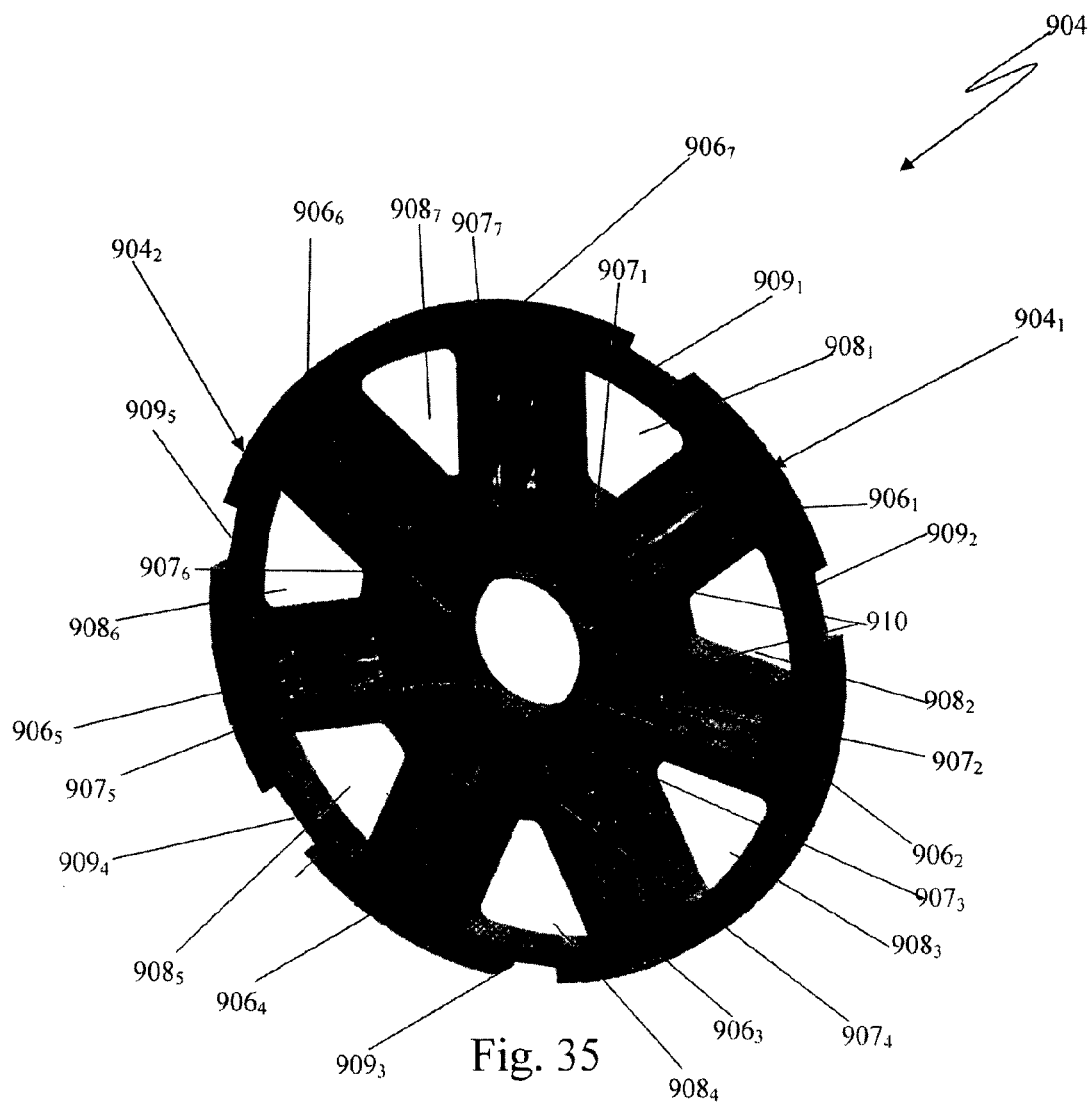
FIG. 35 is a schematic diagram depicting the construction of a stator for use in the rotor assembly according to one embodiment of the present invention.

FIG. 35 shows the construction of the current transfer mechanism (stator frame) 904 in greater detail. As shown the stator 904 in this instance is composed of two sections $904_1$, $904_2$ which are then fused together to form the stator. The stator 904 in this case supports Metal Fibre Brush (MFB) assemblies $906_1$, $906_2$, $906_3$, $906_4$, $906_5$, $906_6$, $906_7$ disposed adjacent the rim and $907_1$, $907_2$, $907_3$, $907_4$, $907_5$, $907_6$, $907_7$ adjacent the hub.

The stator frame 904 in this particular example is made of aluminium or titanium to reduce the overall weight, to further reduce the stators overall weight it may be relieved of material in areas $908_1$, $908_2$, $908_3$, $908_4$, $908_5$, $908_6$, $908_7$ of minimal load. In addition to reducing the overall weight of the stator the cut outs $908_1$, $908_2$, $908_3$, $908_4$, $908_5$, $908_6$, and $908_7$ also allow for more effective forced cooling of the rotor assembly. Although in this particular example the stator frame is electrically conductive, the electrical resistance is higher than that of the brushes, and as such current favours passing through the brushes, a more detailed discussion of the current path through each brush assembly and stator is provided below. While in the present example a conductive material is utilised, it will of course be appreciated by those of skill in the art that a non-conductive material or conductive material with an insulative coating could be utilised to construct the stator frame.

As can bee seen in this instance the stator frame 904 includes a series of notches $909_1$, $909_2$, $909_3$, $909_4$ and $909_5$. The notches $909_1$, $909_2$, $909_3$, $909_4$ and $909_5$ provide anchorage points for the stator frame 904 enabling it to be fixed in position relative to the shaft 901. By locking the stator frame in position the effects of any torque on the stator as current is passed between the brush assemblies is negated.

Figure 36:
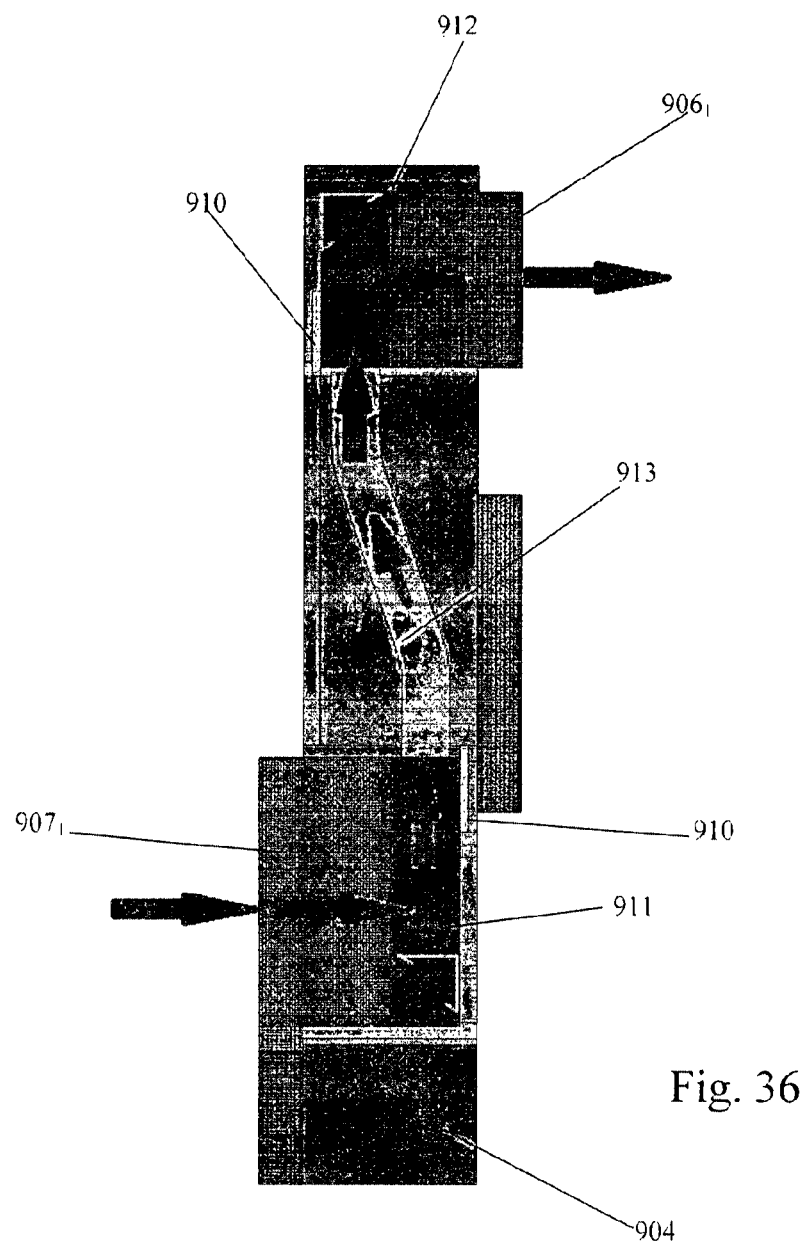
FIG. 36 is a cross-sectional view of the stator depicting current flow across the rotor of FIG. 35.

The depicted stator frame in this example has a total of seven brush pairs, which in turn means seven parallel current paths. The metal fibre brushes selected have cross section of 23 mm×35 mm and a current rating of 330 A per brush. This in turn means that the total current rating of the seven parallel paths is 2310 A. The arrangement of the brushes and the current path through each stator is shown in FIG. 36. In this case a cross section of one of the stator arms is shown (i.e. arm carrying brushes $906_1$ and $907_1$). As shown the stator 904 is arranged such that current is directed from the outer radius of the preceding rotor to the inner radius of the next rotor. To compensate for progressive brush wear flat springs 910 are provided to allow axial movement of the brush assemblies. In addition the springs 910 provide a light pressure on the brush to ensure continuous engagement between the MFB and the adjacent rotor.

The brush assemblies in this case include shunts 911 and 912 which are interconnected in this instance by a flexible wire, 913. The wire completes the current return path from the inner to the outer brush. As the stator (and hence, the wire) is immersed in a 2.5 T axial driving field, the wire return path experiences a force that is tangential to the radius and producing a corresponding torque about the axis of the stator. As the stator is fixed the resultant torque is negated, but the force on the flexible wire, if not constrained, has the potential to load the brushes and negate the spring force used to keep them in contact with the rotating surface. By embedding the wire into the stator frame the movement of the wire in the direction of the field is constrained.

As noted above the circuit through the stator is orientated such that the current is passed from the hub to the rim. Since the metal fibre brushes have different wear rates depending on the direction of current flow through them. A brush connected to a positive terminal has a higher wear rate and a brush connected to the negative terminal has a lower wear rate due to differences in oxidation. As such the physical orientation of the brushes with respect to the current flow direction also factors into the amount of brush wear. In this case the brushes at the rim experience greater rotational wear than those disposed adjacent the hub. Consequently the brushes located around the hub are orientated to have higher wear due to current flow direction (i.e. the brush disposed at the hub are in effect positive terminal brushes and the Rim brushes are effectively negative terminal brushes).

Figure 37:
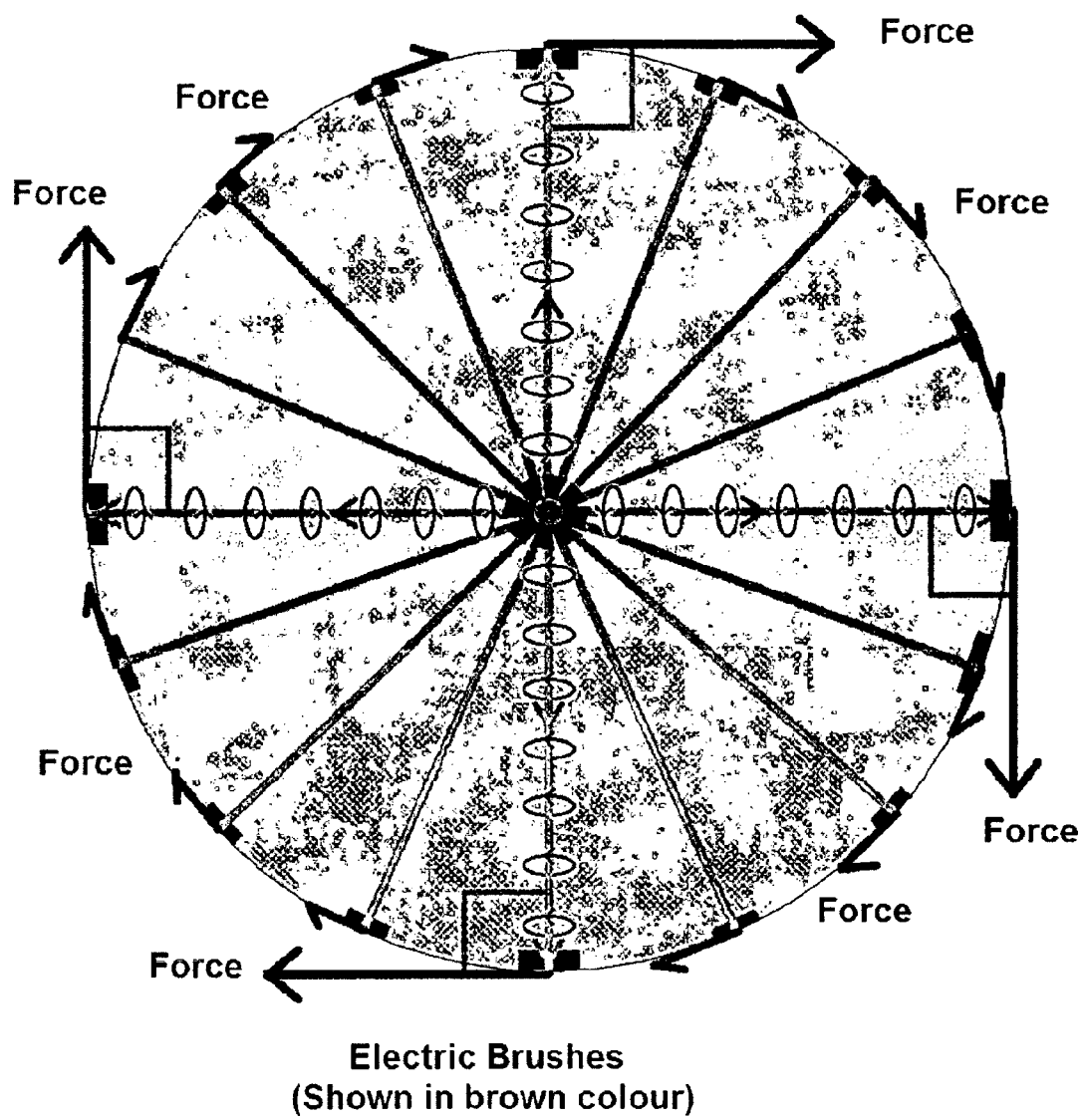
FIG. 37 is a schematic diagram depicting the distribution of torque within the rotor of FIGS. 33 and 34.

FIG. 37 illustrates that the relationship between the current flow and the induced force on a rotor. As shown the current flows from the hub to the rim with the resulting force at 90° to the rotor. By positioning the brushes symmetrically about the rotor the forces on the rotor are balanced (i.e. forces at opposing symmetrical ends of the rotor are equal and opposite) resulting in smooth rotation. This smooth force distribution reduces vibration making the motor ideal for applications requiring quiet and low vibration producing motors, such as ships, submarines, and heavy machinery. It will of course be appreciated by those of skill in the art that by adding more current paths a more uniform force distribution over the rotor can be achieved resulting in a more powerful torque.

Figure 38:
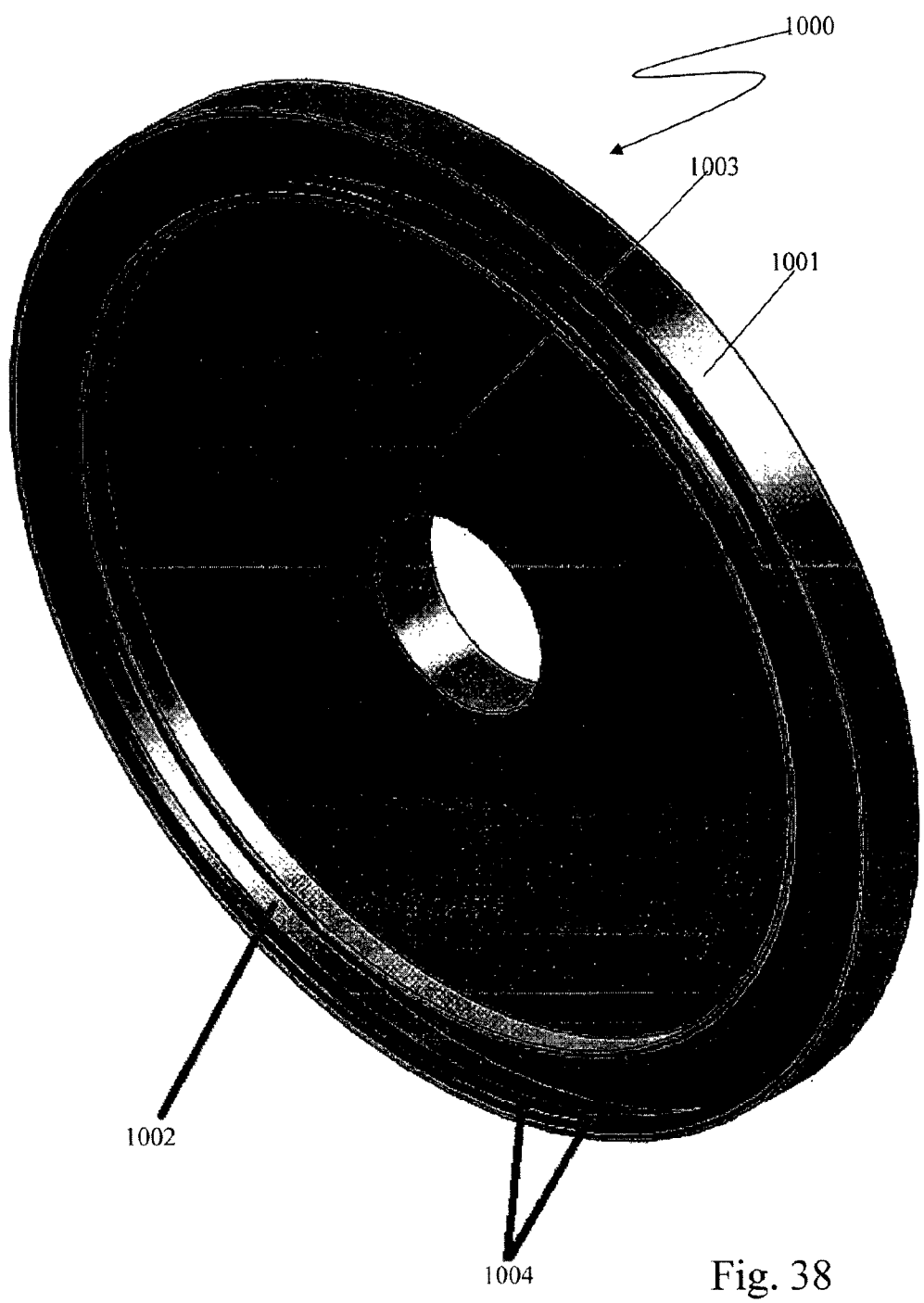
FIG. 38 is a schematic diagram depicting the construction of an inter rotor current transfer mechanism for use in the rotor assembly according to one embodiment of the present invention.
Figure 39:
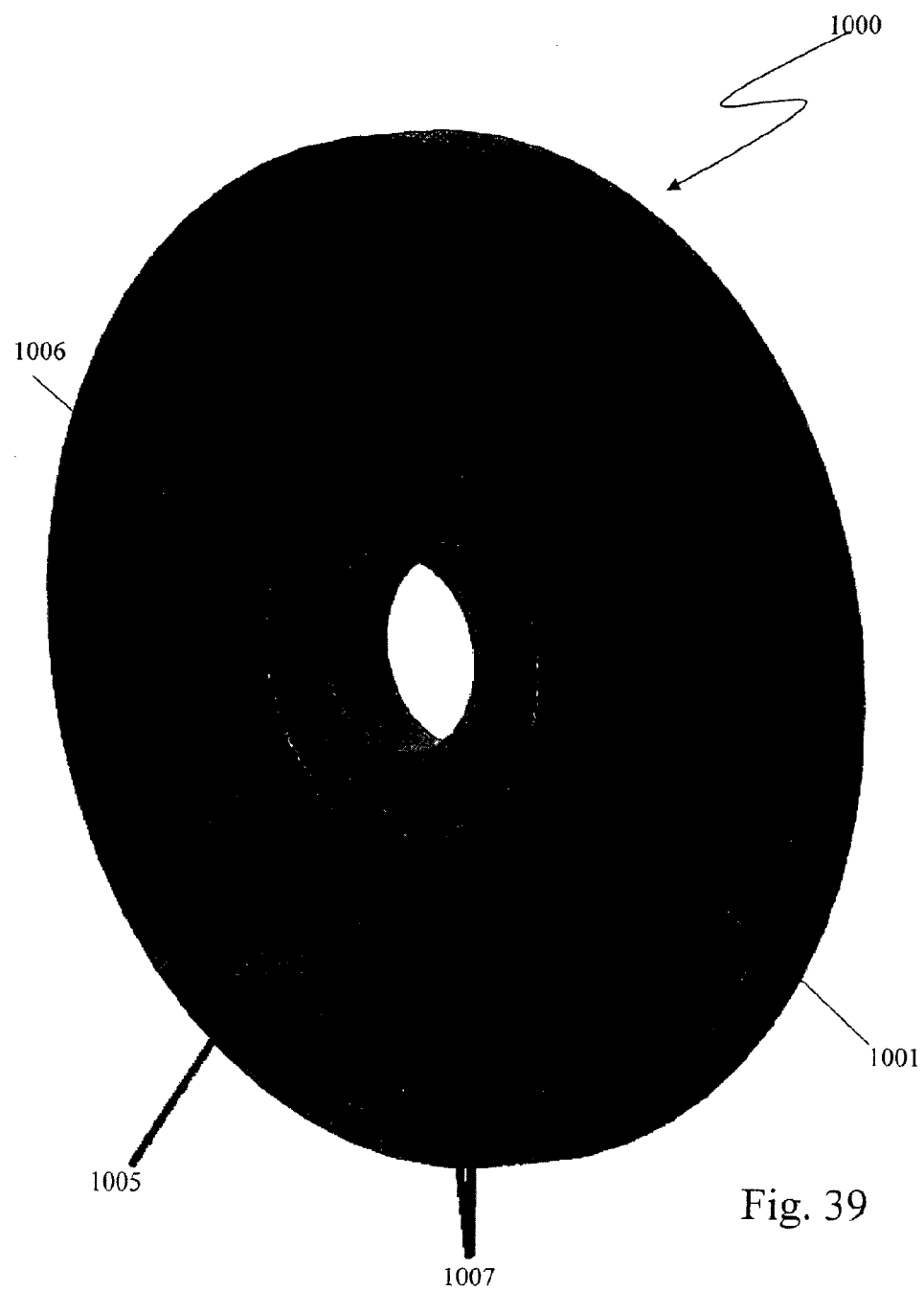
FIG. 39 is a schematic diagram depicting the reverse side of the inter rotor current transfer mechanism of FIG. 38.

An alternative mechanism for transferring the current between the serially stacked rotors is shown in FIGS. 38 and 39. In this example a conductive fluid is utilised to affect the current transfer. The use of a fluid transfer mechanism has a number of advantages over a solid brush, such as reduced frictional losses, reduced wear, reduced maintenance, current capacity can be increased by increasing the contact area and volume, and simplified design not requiring intricate brush mounting components.

FIG. 38 depicts one side of a fluid based stator assembly 1000 according to one embodiment of the invention. As shown the stator assembly 1000 is in the form of a composite disc which includes outer 1001 and inner 1003 discs. The discs 1001 and 1003 are spaced apart to form a fluid channel 1002 therebetween. Seals 1004 are provided on the outer periphery of the inner disc 1003 and the interior of the peripheral wall of outer disc 1001.

As can be seen from FIG. 39 the outer disc 1001 is provided with an opening 1005 onto fluid channel 1002 adjacent the hub 1006 of the inner disc 1003. Seals 1007 are provided about the hub 1006 and about the periphery of the opening 1005. As will be appreciated by those of skill in the art the seals are required to prevent fluid leakage once the contacting portion of the adjacent rotors engage the fluid channel.

Figure 40:
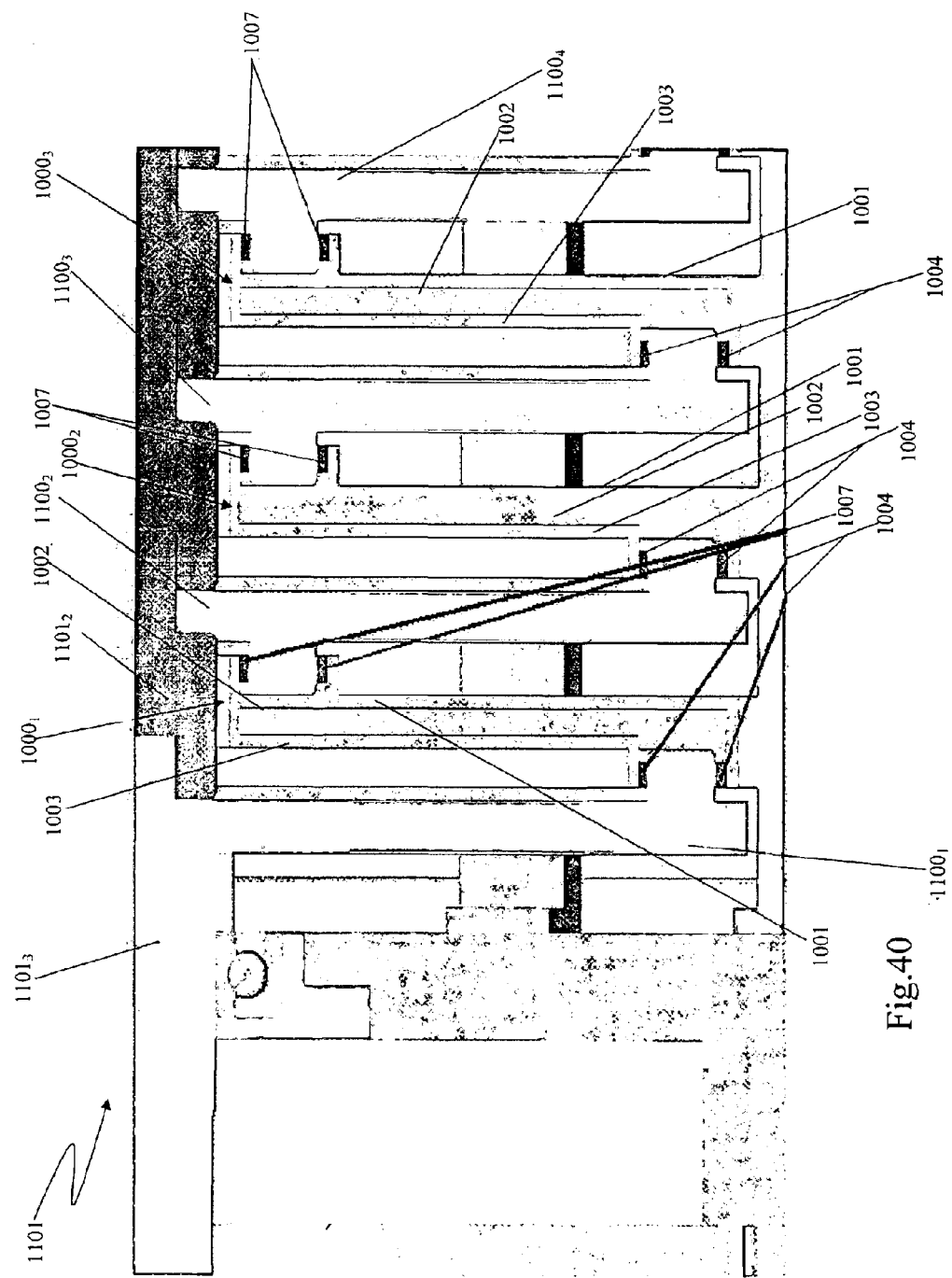
FIG. 40 is a detailed diagram depicting the interconnection of the rotors an current transfer mechanism of FIGS. 38 and 39.

FIG. 40 depicts the arrangement of the fluid based stator assembly 1000 and rotors $1100_1$, $1100_2$, $1100_3$, $1100_4$. As shown the rotors $1100_2$, $1100_3$, $1100_4$ are mounted on the mid section of the shaft $1101_2$, with rotor $1100_1$ mounted on the output section $1101_3$ of the shaft 1101. As in the above example the mid section $1101_2$ is constructed from insulating/isolating material to prevent shorting between the rotors and conductive sections of the shaft. Between each of the rotors $1100_1$, $1100_2$, $1100_3$, $1100_4$ is positioned a stator assembly $1000_1$, $1000_2$, $1000_3$ the stator assemblies in this case are positioned to transfer current from the outer radius of the preceding rotor to the inner radius of the next rotor.

As shown each stator assembly is mounted such that the shaft 1101 passes through each hub 1006 of the stator assemblies $1000_1$, $1000_2$, $1000_3$ such that the contacting surfaces of the adjacent rotors are retained within openings 1005 of each stator assembly $1000_1$, $1000_2$, $1000_3$ and in communication with the fluid channel 1002. Seals 1007 grasp a section of the contacting surfaces of the rotor to form a fluid tight seal between the current transfer mechanism and the rotor. Similarly the contact surface on the rim of each rotor $1100_1$, $1100_2$, $1100_3$, $1100_4$ is engaged within the fluid channel 1002 with seals 1004 forming a fluid tight barrier therebetween.

In the present example the current transfer mechanism are stationary with seals 1004 and 1007 being rotary seals to accommodate the motion of the rotors $1100_1$, $1100_2$, $1100_3$, $1100_4$ to which they are coupled. The transfer mechanisms can accommodate some lateral motion from the rotors due to the natural compressibility of the fluid and as such a sliding seal is not required. It will also be appreciated by those of skill in the art that given the construction of the current transfer mechanism of FIGS. 38 to 40 that the fluid may be introduced into the fluid channel 1002 once the contacting surfaces of the rotors are position within seals 1004, 1007. In such instances the outer disc 1001 may include a sealable fluid port to allow for the injection of fluid into the fluid channel 1002. It will also be appreciated by those of skill in the art that the conductive fluid may be any suitably stable conductive fluid such as sulphuric acid, hydrochloric acid or other suitable acids, sodium hydroxide, sodium chloride, sliver nitrate, potassium hydroxide or other suitable ionic or electrolytic fluids. In some instances the fluid may be a metal in liquid phase such a mercury, Wood's metal, Rose's metal, Field's metal, Bi—Pb—Sn—Cd—In—Tl, gallium etc.

As discussed in relation to the above examples the rotors are designed for emersion into a strong magnetic field to induce the desired torque. The above discussed examples utilise a solenoid constructed from HTS material and more specifically HTS tape such as BSCCO HTS tape. An alternative to using HTS tape is to use MgB2 HTS wire. MgB2 wire has recently become more readily commercially available in a range of sections and lengths. There are a number of advantages in using MgB2 wire, over that of HTS tape firstly it has a much lower cost per meter (MgB2 is, at present, around $3-4 USD/m compared with BSCCO tape at around $25 USD/m). The Jc|Jco behaviour for perpendicular external field is the same as for the parallel external field. Consequently the need for a passive flux guide is reduced or eliminated due to the perpendicular Jc|Jco behaviour being closer to the Jc|Jco behaviour for a parallel external field The beneficial Jc|Jco characteristics of MgB2 in perpendicular and parallel external fields enables the construction of a drive coil assembly with reduced weight as there is no need for the passive flux guides (i.e. the steel flux guides). While the use of a smaller steel field return path has some benefits in terms of the homogeneity of the drive field, both axially and radially. In this manner design decisions can balance the need for field homogeneity verses weight reduction dependant upon the final intended application of the engine.

Figure 41:
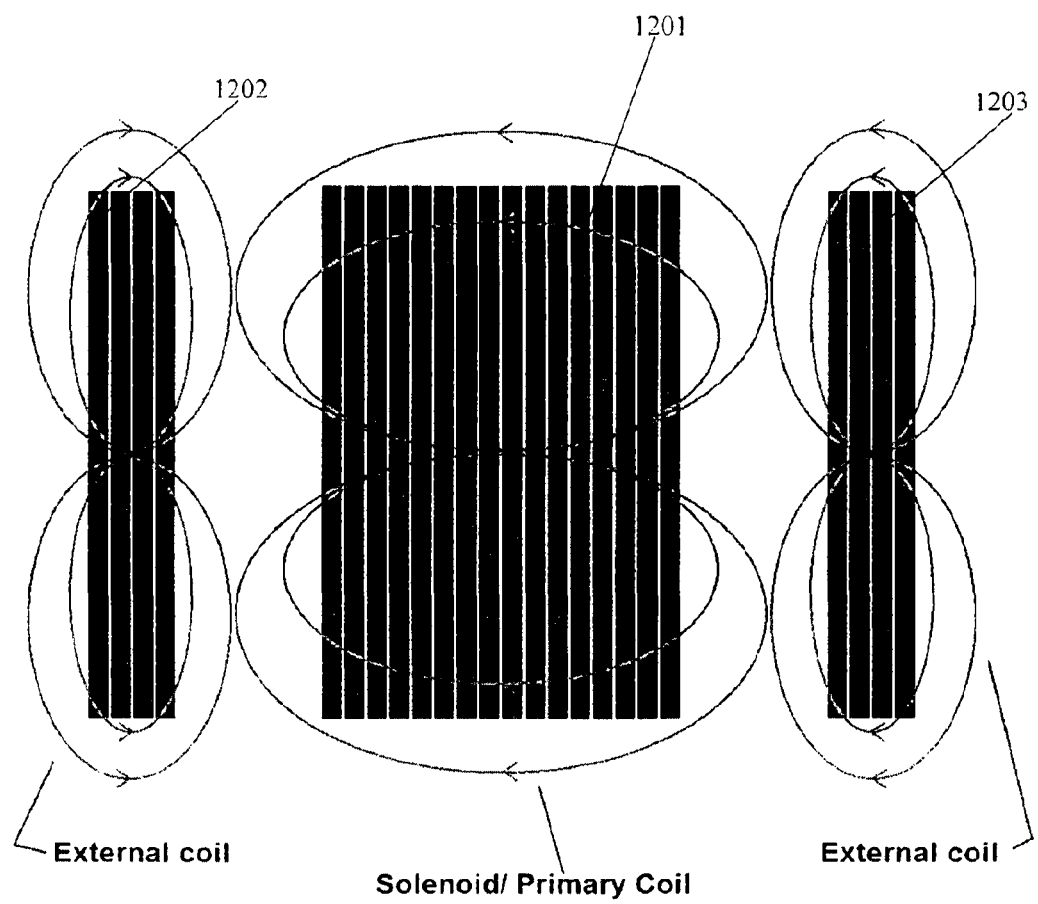
FIG. 41 is a schematic diagram depicting the arrangement of electromagnets to provide active shielding.

Another advantage to utilising MgB2 or other superconductive wires which exhibit little or no variation between the parallel or perpendicular field characteristics is that it permits the use of active flux guides. An example of the use of active flux guides is shown in FIG. 41. Two coils 1202, 1203 with opposing magnetic fields are placed on either side of the primary coil 1201. These external coils compress the field lines and deflect them. Using this method, it is possible to manipulate the primary coil's field to minimise the amount of stray field along the axis of the solenoid. The use of such active shielding is only really possible when using MgB2 wire or an equivalent wire that does not exhibit a large difference between the perpendicular and parallel in-field performance. The additional field concentration at the ends of the driving solenoid due to the presence of the additional shielding coils would result in a significant current capacity de-rating of 1G and 2G HTS wires.

With this in mind the benefits of active shielding are more readily apparent when using MgB2 wire as the need for large flux steel flux guides is removed, reducing weight but also increasing the amount of stray field in the axial direction. The use of active shields may or may not remove the need for further passive shielding using iron or nickel based shielding materials depending on the intended applications and jurisdictional standards for stray magnetic field containment.

Figure 42:
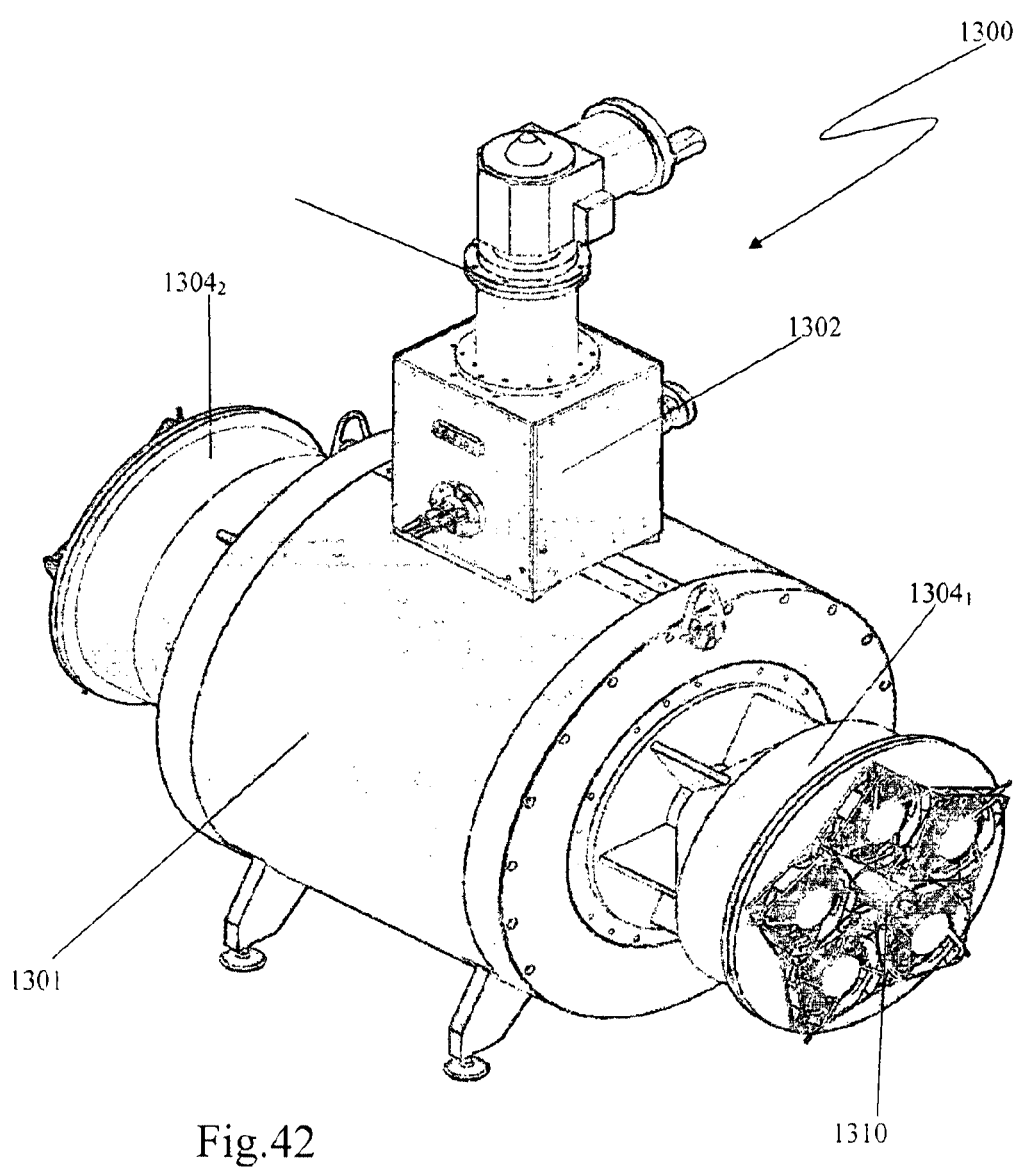
FIG. 42 is a schematic diagram illustrating the construction of an electromagnetic turbine according to one embodiment of the present invention.

FIG. 42 depicts the construction of a motor 1300 according to one embodiment of the present invention. As shown the motor 1300 includes a primary casing 1301 which house a cryogenic unit 1302 and rotor assembly 1303 (see FIG. 43). The motor also includes secondary casings $1304_1$, $1304_2$ disposed at either end of the primary casing 1301. The secondary casings $1304_1$, $1304_2$ in this instance house brush assemblies for the provision of the drive current through the motor. Each of the secondary casings $1304_1$, $1304_2$ may be fitted with a cooling array. In this example the cooling arrays are in the form of a series of fans for drawing air through the rotor assembly.

Figure 43:
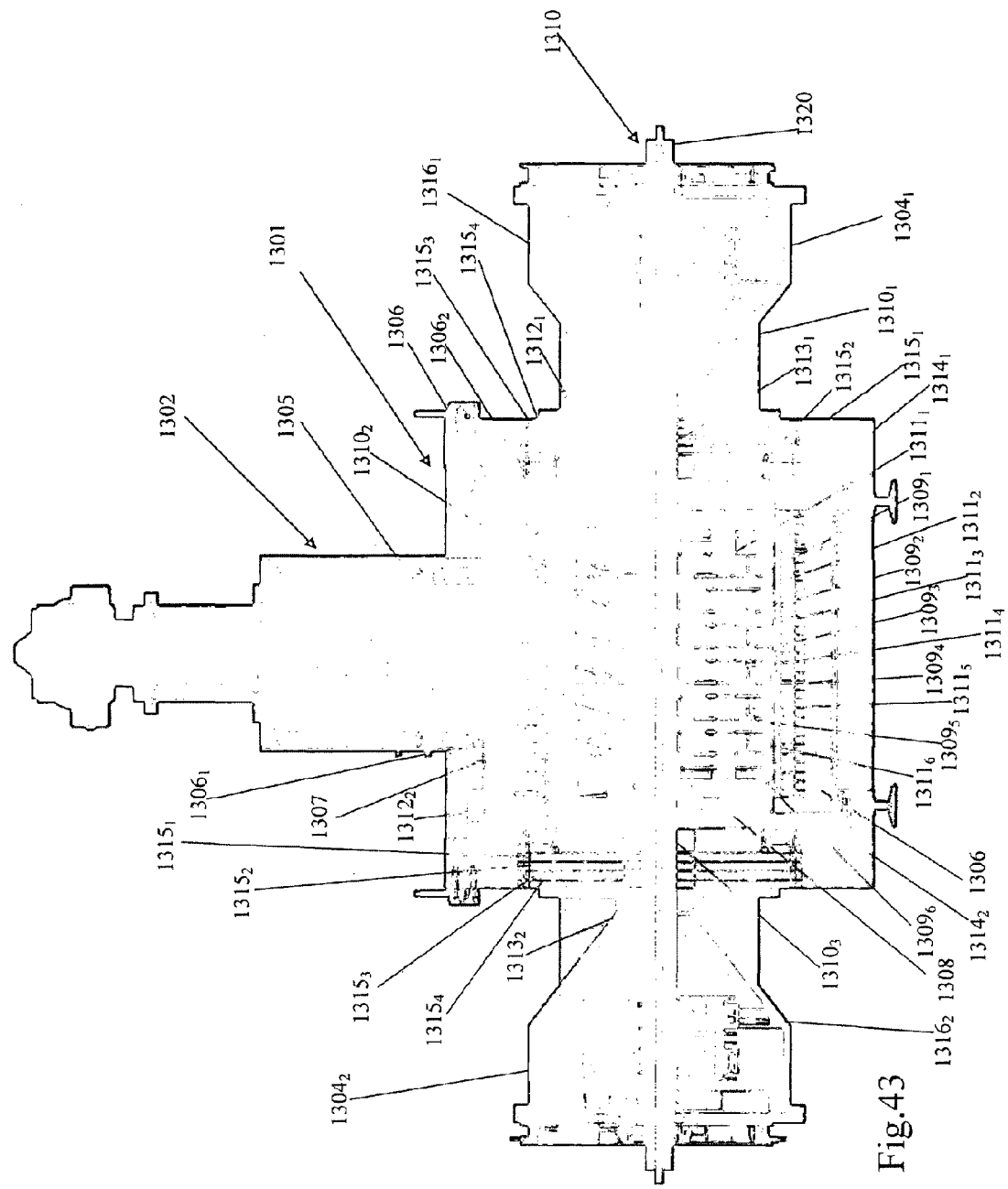
FIG. 43 is a cross-sectional view of the turbine of FIG. 42.

The internal arrangement of the motor is shown in further detail in FIG. 43. As shown the motor 1300 is composed of a plurality of modular components to allow for easy access and interchange of components during maintenance. The primary casing 1301 supports the cryogenic unit 1302 which in this example includes a Pulse Tube cryo-cooler 1305 mounted on the side of the cryogenic body 1306 mounted within the housing. The cryogenic body 1306 encapsulated the primary HTS solenoid 1307 in a cryogenic envelope. The cryo-cooler is sized to allow an operating temperature of the coil assembly of about 20K. The cryo-cooler is attached to the copper cold fingers which form the conductive heat distribution path to each of the coils in the coil assembly.

As in the above examples the HTS solenoid provides the static drive field with which the current in the rotor assembly reacts to produce the drive force. The design points and criteria for the driving coils have been discussed in detail above. In the depicted example the solenoid consists of 60 Sumitomo BSCCO coils, each with an ID of 340 mm and an OD 377.12 mm (64 Turns of 0.29 mm wire). The operating current of the solenoid is 200 A resulting in an average magnetic field strength of 2.5 T across the central bore. The total length of the coil assembly is 308.2 mm.

As can be seen in this example the cryogenic body 1306 is of a generally cylindrical construction and includes a bore for receipt of the rotor assembly. As shown the cryogenic envelope formed between the exterior $1306_1$ and interior walls $1306_2$ of the body 1306 with the rotor assembly being received within the bore 1308 formed between the interior walls of the body 1306.

The rotor assembly 1309 in this instance is of the general construction discussed in relation to FIGS. 33 and 34 above. The assembly in this case consists principally of 6 rotors $1309_1$, $1309_2$, $1309_3$, $1309_4$, $1309_5$ and $1309_6$ which are positioned on the insulated/isolated section $1310_2$ of the shaft 1310. Between each rotor are stator assemblies $1311_1$, $1311_2$, $1311_3$, $1311_4$, $1311_5$ and $1311_6$ of the type discussed in relation to FIGS. 35 and 36. The stator assemblies transferring current across the brush assemblies from the rim of the preceding rotor to the hub of the next rotor in the series. As the current is passed through the rotors the induced force is translated into a torque on the shaft 1310. As shown the shaft 1310 in this case is mounted on a pair of bearings $1312_1$, $1312_2$. The bearings $1312_1$, $1312_2$ are preferably ceramic bearings as the use of a standard metallic bearings may cause greater rotational drag due to their proximity to a large magnetic field. As in the above examples the shaft is a hollow construction for receipt of a reinforcing rod 1320.

As can be seen in this example the shaft extends beyond the bore 1308 and the primary housing 1301 through passageways 1313$_1$, 1313$_2$ disposed in removable end cap assemblies 1314$_1$, 1314$_2$ into the secondary housings 1304$_1$, 1304$_2$. The end caps 1314$_1$, 1314$_2$ in this case seal both the primary housing 1301 and the bore 1308, with the exception of the passageways 1313$_1$, 1313$_2$. The end caps 1314$_1$, 1314$_2$ in this particular example include a plurality of steel plates 1315$_1$, 1315$_2$, 1315$_3$, 1315$_4$ which act as flux guides. The construction of the end caps enables plates to be selectively removed/added to vary the dimensions of the flux guides. It will of course be appreciated by those of skill in the art that where the primary solenoid is constructed from MgB2 that the steel plates could be replaced with active flux guides as discussed above.

The secondary housings 1304$_1$, 1304$_2$ are mounted to each of the end cap assemblies. As will be appreciated by a person of skill in the art the rotor assembly experiences both frictional and resistive heating. The secondary housings 1304$_1$, 1304$_2$ are generally funnel shaped assemblies for directing air flow from the cooling fans through the passageways 1313$_1$, 1313$_2$ and bore 1308 thereby cooling the rotor assembly 1309. In addition the flared shape of the secondary housing also permits them to accommodate the respective input 1316$_1$ and output 1316$_2$ brushes which are positioned such that they contact the input 1310$_1$ and output 1310$_3$ sections of the shaft 1310. In the depicted example the shaft 1310 also extends beyond the secondary housings to permit the shaft to be coupled to various torque transfer arrangements including gearing assemblies, sprocket drives or the like or directly to the drive component such as wheel, propeller, track etc. It will of course be appreciated by those of skill in the art that theses torque transfer arrangements need to be electrically isolated/insulated from the shaft 1310. This could be done by putting an insulating coating on the shaft or on the torque transfer or drive mechanisms.

The solenoid used in the present example has a fairly square aspect ratio. The OD of the solenoid is 377.12 mm and the length of the solenoid is 308.2 mm. Experience and countless models have shown that this square profile produces the maximum field in the desired working region for a given length of HTS tape. The square profile also has the added advantage of being scalable. That is for a given scaling factor (in the above example y=½x) the field distribution in the internal bore of the solenoid remains the same, albeit scaled up or down in dimension (not in the magnitude of the field). Of significance is the fact that the field behaviour in the wire also remains almost the same so that the number of turns required to achieve the target operating field is similar if not identical. This does apply equally to 1G and 2G wire provided that the steel flux guides are scaled in proportion to the coils.

Figure 44:
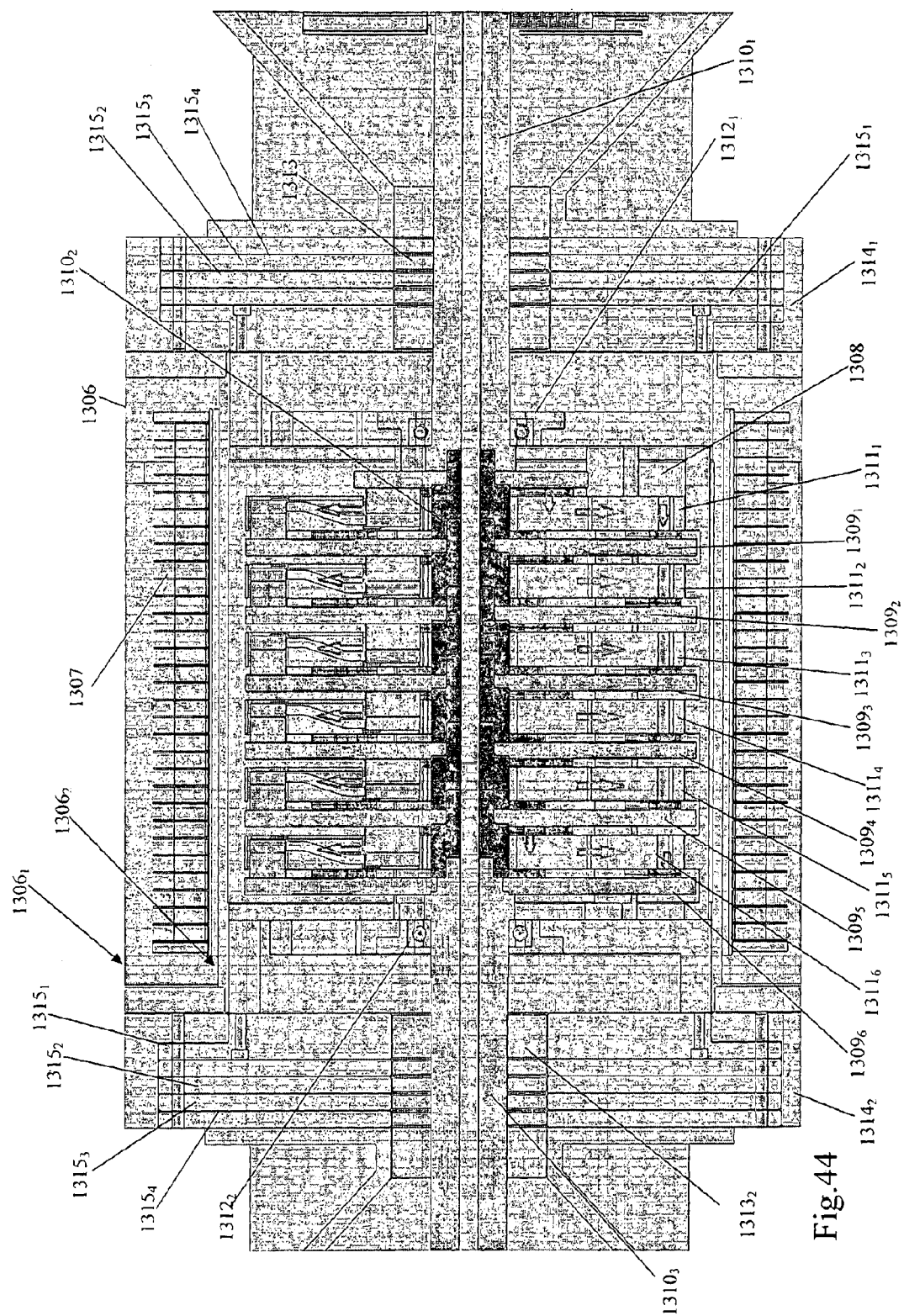
FIG. 44 is a detail view the rotor housing of the turbine of FIGS. 42 and 43.

FIG. 44 showing the current flow through the motor assembly 1300. As can be seen the drive current (denoted by the block arrows) is applied to the input section 1310$_1$ of the shaft 1310 via the input brushes. It is passed from the shaft to the brush assemblies disposed about the rim of the first stator assembly 1311$_1$ the current is then passed to the corresponding brushes disposed adjacent the rim via the wires disposed between the brush pairs. The brush assemblies adjacent the rim of the stator 1311$_1$ are in direct contact with the rim of the first rotor 1309$_1$ this inturn cause current to be passed from the rim of the rotor to the hub. The hub is in direct contact with the hub brush assemblies of stator 1311$_2$. Again the current is passed from the hub brush assemblies to the rim brush assemblies of the stator. The rim brush second stator assembly 1311$_2$ is in direct contact with the rim second rotor 1309$_2$ allowing current to pass from the stator 1311$_2$ through the rotor 1309$_2$ to the hub where it is then transferred to the hub brush assembly of the third stator 1311$_3$ assembly. A similar process of current transfer to that discussed above occurs for the remaining stators 1311$_3$, 1311$_4$, 1311$_5$ and 1311$_6$ and rotors 1309$_3$, 1309$_4$, 1309$_5$, that is, the current is passed from hub to rim and rim to hub of adjacent stator and rotors. Rotor 1309$_6$ being mounted transfers the current from the rotor assembly to the output 1310$_3$ section of the shaft which inturn is connected to the output brushes 1316$_2$ (not shown) completing the series circuit through the motor.

Figure 45:
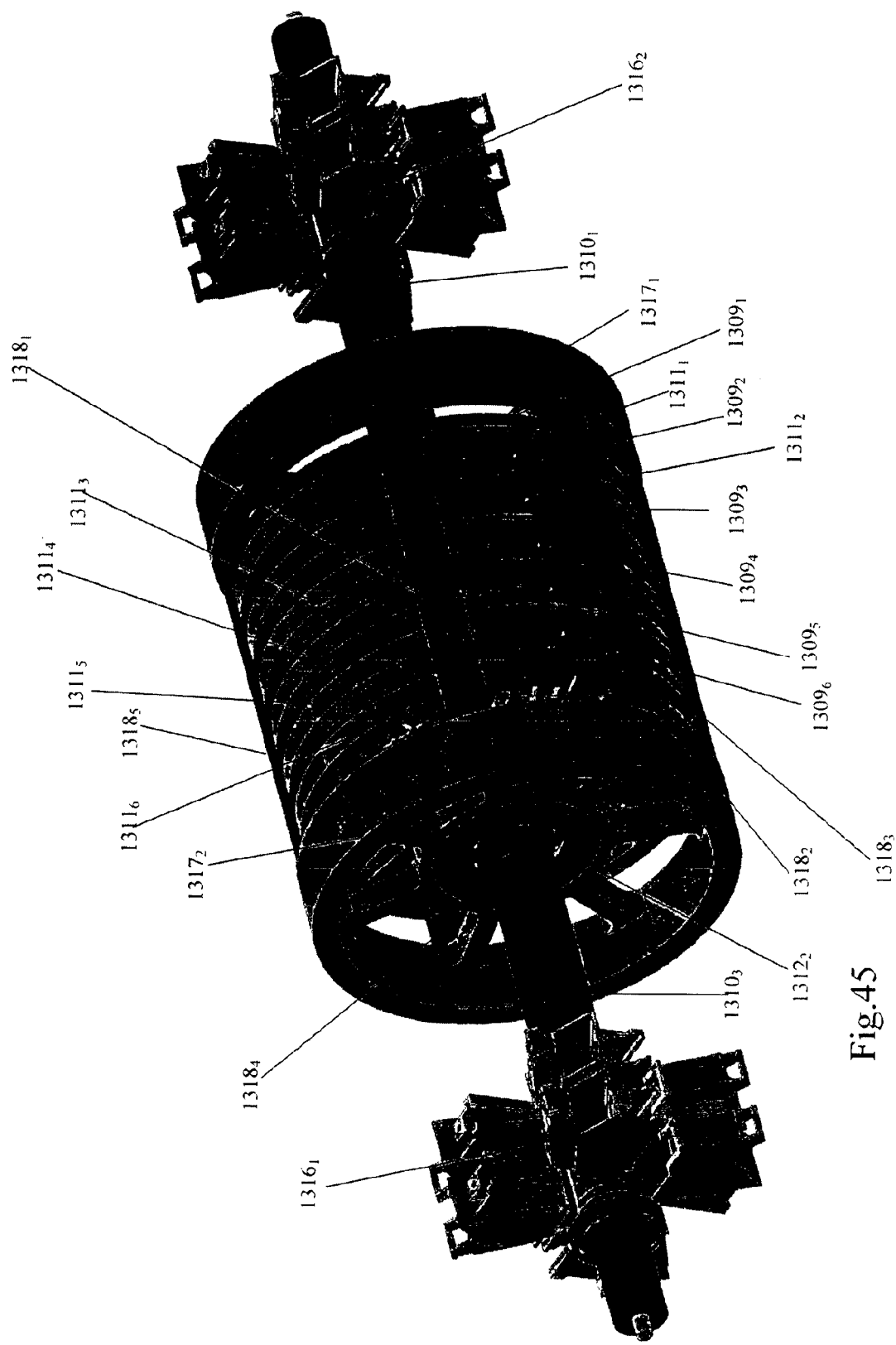
FIG. 45 is schematic diagram depicting the rotor assembly of the turbine of FIG. 43.

FIG. 45 depicts the construction of the rotor assembly for insertion into the central bore 1308 of the cryogenic body 1306. As shown the rotors and stator of the assembly mounted on the mid section of the shaft 1310$_2$ between end plates 1317$_1$, 1317$_2$. The end plates 1317$_1$, 1317$_2$ which carry bearings 1312$_1$, 1312$_2$ permitting the shaft to rotate on application of the drive current through the rotor stator assembly. As can be seen in this instance the end plates 1317$_1$, 1317$_2$ are coupled together by a series of struts 1318$_1$, 1318$_2$, 1318$_3$, 1318$_4$ and 1318$_5$. The struts 1318$_1$, 1318$_2$, 1318$_3$, 1318$_4$ and 1318$_5$ extend between the end plates and over the rotors and stators. The struts in this case are made from a non-conductive material such as suitable fibre composite e.g. Garolite.

Figure 46:
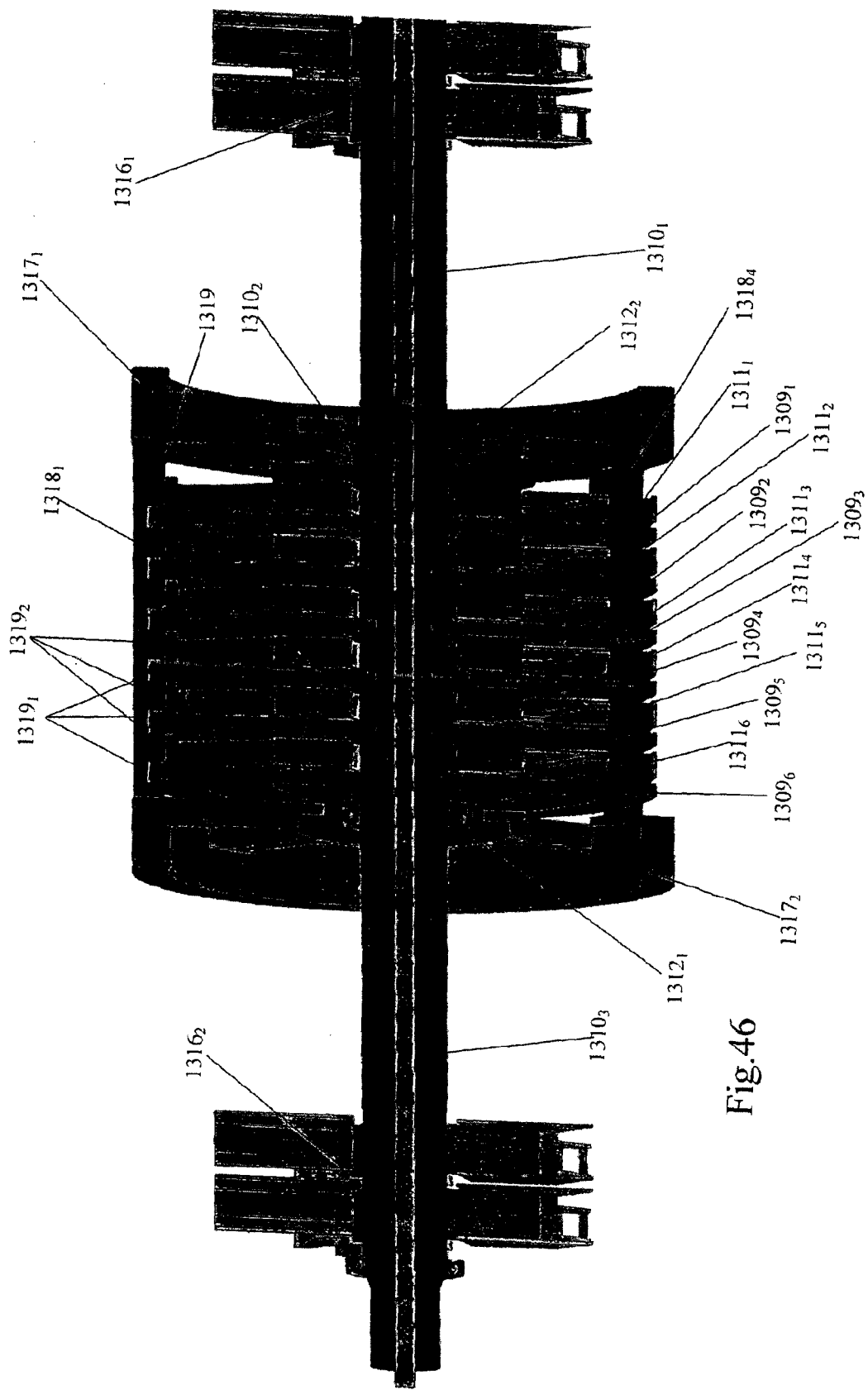
FIG. 46 is a cross sectional view of the rotor assembly of FIG. 45.

FIG. 46 is a cross-sectional view of the rotor assembly and shows the interaction between the struts and the rotors and stators. As can be seen each of the struts 1318$_1$, 1318$_2$, 1318$_3$, 1318$_4$ and 1318$_5$ has a profiled surface 1319. The profile in this case provides recessed section 1319$_1$ for receipt of a section of the rim of the rotors. The raised sections 1319$_2$ of the profiled surface engage the rim stators and more specifically the recessed section provided in the stator's rim. This acts to secure the stators and preventing their rotation.

As can be seen from the above example the motor is provided with a modular construction. This arrangement allows various components to be removed from the motor with relative ease during maintenance etc. Moreover it allows for components to be simply swapped out reducing overall down time.

Figure 47:
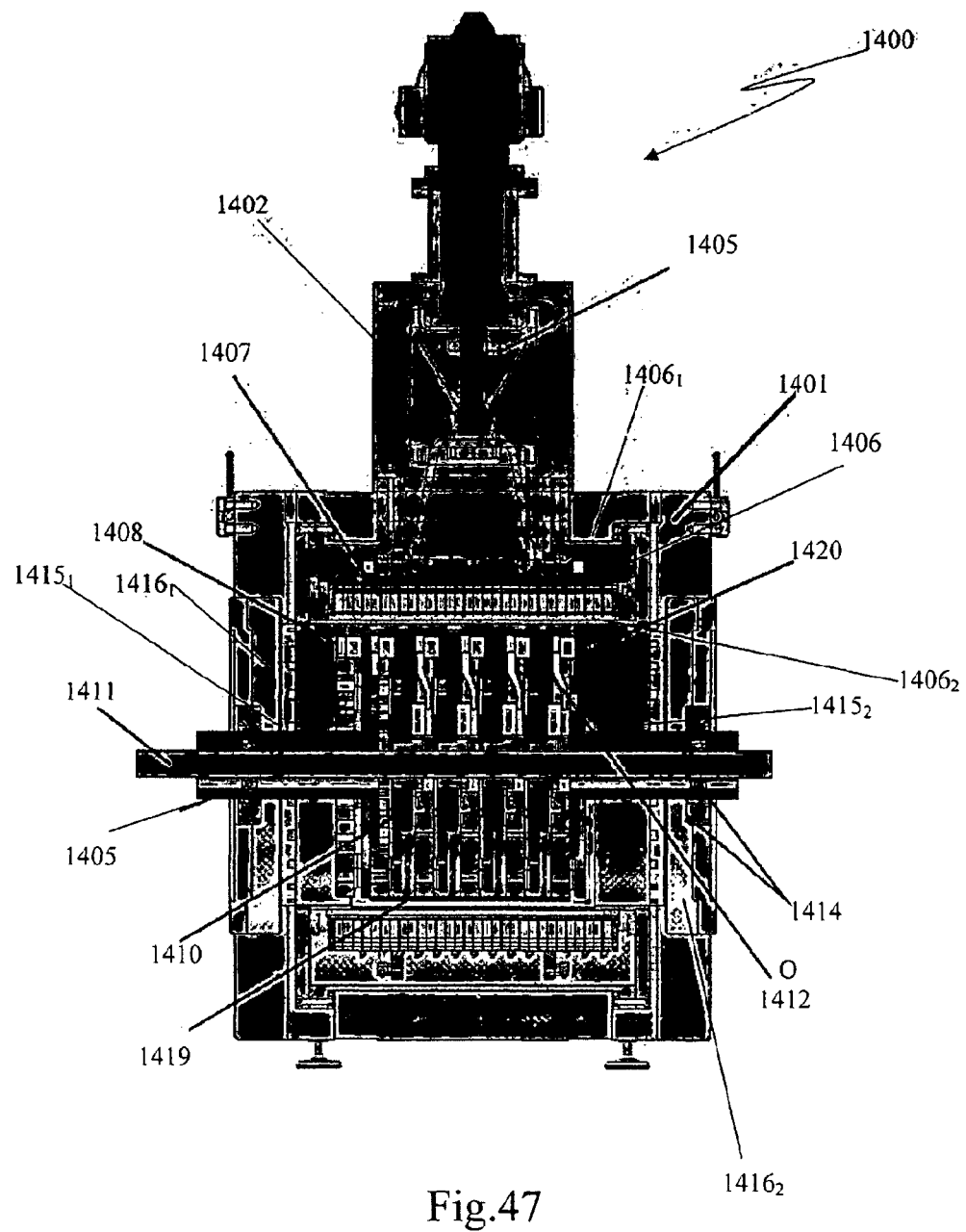
FIG. 47 is a schematic diagram illustrating the construction of an electromagnetic turbine according to one embodiment of the present invention.

FIG. 47 is a cross sectional view of a motor 1400 according to one embodiment of the present invention. As shown the motor 1400 is composed of a plurality of modular components to allow for easy access and interchange of components during maintenance. The primary casing 1401 supports the cryogenic unit 1402 which in this example includes a Pulse Tube cryo-cooler 1405 mounted on the side of the cryogenic body 1406 mounted within the housing. The cryogenic body 1406 encapsulated the primary HTS solenoid 1407 in a cryogenic envelope. The cryo-cooler is sized to allow an operating temperature of the coil assembly of about 20K. The cryo-cooler is attached to the copper cold fingers which form the conductive heat distribution path to each of the coils in the coil assembly.

As in the above examples the HTS solenoid provides the static drive field with which the current in the rotor assembly reacts to produce the drive force. The design points and criteria for the driving coils have been discussed in detail above. The operating current of the solenoid is 200 A resulting in an average magnetic field strength of 2.5 T across the central bore.

As can be seen in this example the cryogenic body 1406 is of a generally cylindrical construction and includes a bore for receipt of the rotor assembly. As shown the cryogenic envelope formed between the exterior 1406$_1$ and interior walls 1406$_2$ of the body 1406 with the rotor assembly being received within the bore 1408 formed between the interior walls of the body 1406.

The rotor assembly 1410 in this instance is differs from the above examples in that it is configured for counter rotation. In this case the rotor assembly 1410 are attached to an inner shaft 1411 and a stator assembly 1412 attached to an outer shaft 1413. The rotors and stators are of a similar construction to that discussed in relation to FIGS. 33 to 35 above. As shown the outer shaft 1413 is of a hollow construction with the inner shaft 1411 passing there through both shafts are mounted on bearings 1414. As the current flow within the stators 1412 is in the opposite direction to that of the rotors there are free to rotate in the opposite direction to that of the rotors. This the outer shaft 1413 rotates in the opposite direction to that of the inner shaft 1411. A more detailed discussion of the rotor and stator assemblies is provided below.

As can be seen in this example the shafts extends beyond the bore 1408 and the housing 1401 through passageways 1415$_1$, 1415$_2$ disposed in removable end cap assemblies 1416$_1$, 1416$_2$. The end caps 1416$_1$, 1416$_2$ in this case seal both the primary housing 1401 and the bore 1408, with the exception of the passageways 1415$_1$, 1415$_2$. The end caps 1416$_1$, 1416$_2$ may include a plurality of steel plates which act as flux guides. The construction of the end caps enables plates to be selectively removed/added to vary the dimensions of the flux guides. It will of course be appreciated by those of skill in the art that where the primary solenoid is constructed from MgB2 or other superconductive wires which exhibit little or no variation between the parallel or perpendicular field characteristics, that the steel plates could be replaced with active flux guides as discussed above.

Figure 48:
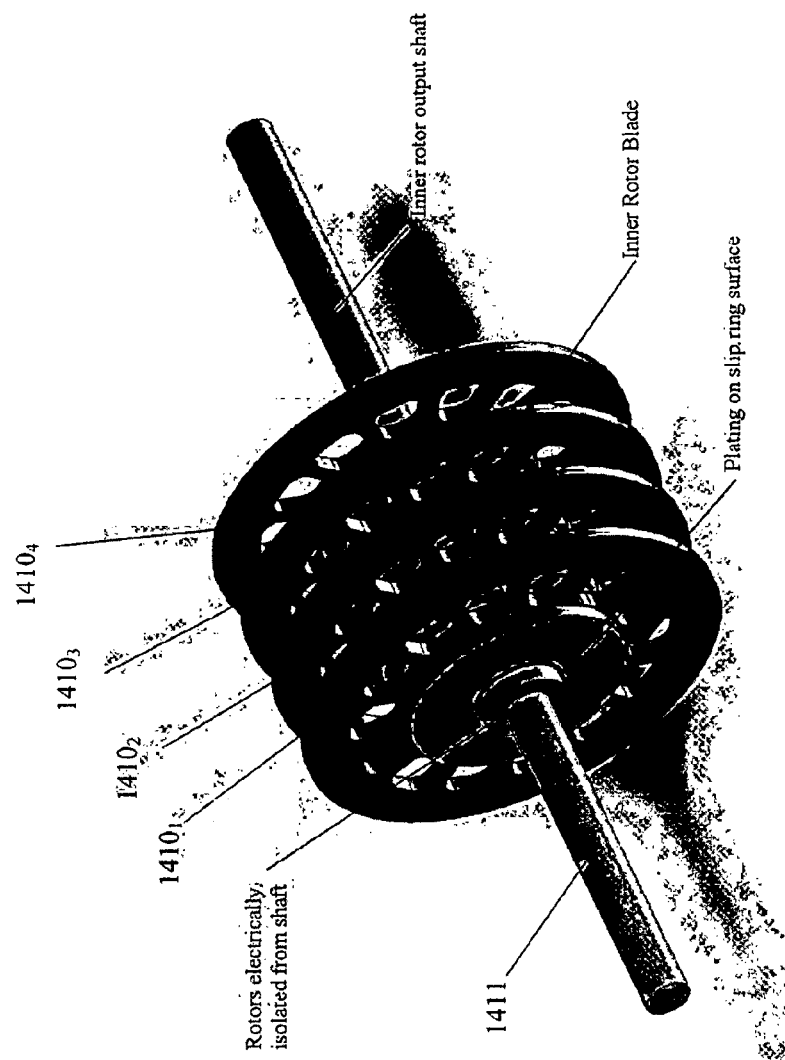
FIG. 48 is a schematic diagram the rotor assembly for use in the turbine of FIG. 47.

FIG. 48 shows the rotor assembly in greater detail, as shown the rotor assembly includes a series of rotors 1410$_1$, 1410$_2$, 1410$_3$, 1410$_4$ mounted on shaft 1411. The shaft 1411 being positioned co-axially with respect to central axis of the rotors 1410$_1$, 1410$_2$, 1410$_3$, 1410$_4$. In this particular example the rotors 1410$_1$, 1410$_2$, 1410$_3$, 1410$_4$ are fixed to the shaft 1411 which is free to rotate. It will of course be appreciated by those of skill in the art that the shaft could be fixed while the rotors 1410$_1$, 1410$_2$, 1410$_3$, 1410$_4$ are free to rotate about the shaft 1411. In such a configuration the rotors 1410$_1$, 1410$_2$, 1410$_3$, 1410$_4$ could be mounted on the shaft 1411 via bearings allowing each rotor to rotate independently of the shaft 1411.

In the present example the rotors are of similar construction to that of the rotors discussed in relation to FIGS. 3 and 33 above and include a rim which is coupled to a hub via a plurality of arms. The rotors 1410$_1$, 1410$_2$, 1410$_3$, 1410$_4$ in this case include contact regions 1417$_1$, 1417$_2$ disposed adjacent the rim and hub. The contact regions are provided for contact with brush assemblies mounted on current transfer mechanisms (stator frames) positioned between each rotor.

Figure 49:
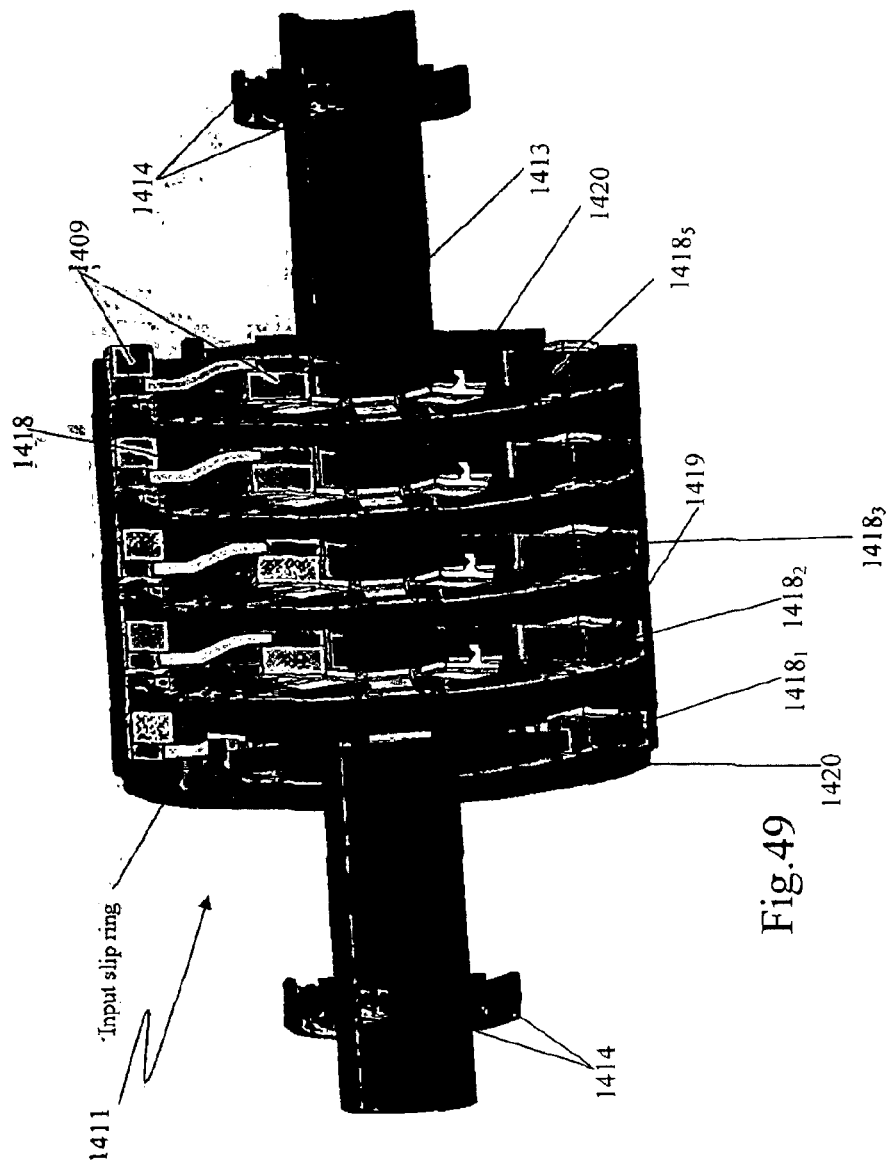
FIG. 49 is a schematic diagram of a stator assembly for use in the turbine of FIG. 47.

A more detailed vie of the stator assembly 1412 is shown in FIG. 49, the stator assembly includes a plurality of stator frames 1418$_1$, 1418$_2$, 1418$_3$, 1418$_4$, 1418$_5$. Each of the stator frames 1418 in this instance is of a similar construction to that discussed in relation to FIGS. 35 and 36 above. More specifically each stator frame 1418 is composed of two sections which are then fused together to form the stator. The stator frame in this particular example is made of aluminium or titanium to reduce the overall weight, to further reduce the stators overall weight it may be relieved of material in areas of minimal load. In addition to reducing the overall weight of the stator the cut outs also allow for more effective forced cooling of the stator assembly.

Each stator frame 1418 includes a plurality of metal fibre brush pairs 1409, for the transfer of current between adjacent rotors. The metal fibre brushes selected have cross section of 23 mm×35 mm and a current rating of 330 A per brush. The stator and brushes are arranged such that current is directed from the outer radius of the preceding rotor to the inner radius of the next rotor. To compensate for progressive brush wear flat springs are provided to allow axial movement of the brush assemblies. In addition the springs provide a light pressure on the brush to ensure continuous engagement between the MFB and the adjacent rotor. The brush assemblies also include shunts which are interconnected by a flexible wire. The wire completes the current return path from the inner to the outer brush.

As shown the stators are fixed to support 1419 which is attached at either end to the outer shaft 1413. A set of stationary input and output slip rings 1420 are provided to allow the current to be fed through the rotor stator assemblies. It will of course be appreciated by those of skill in the art that the support 1419 is constructed from an electrically insulating material to prevent shorting between the shaft and the stators.

Figure 50:
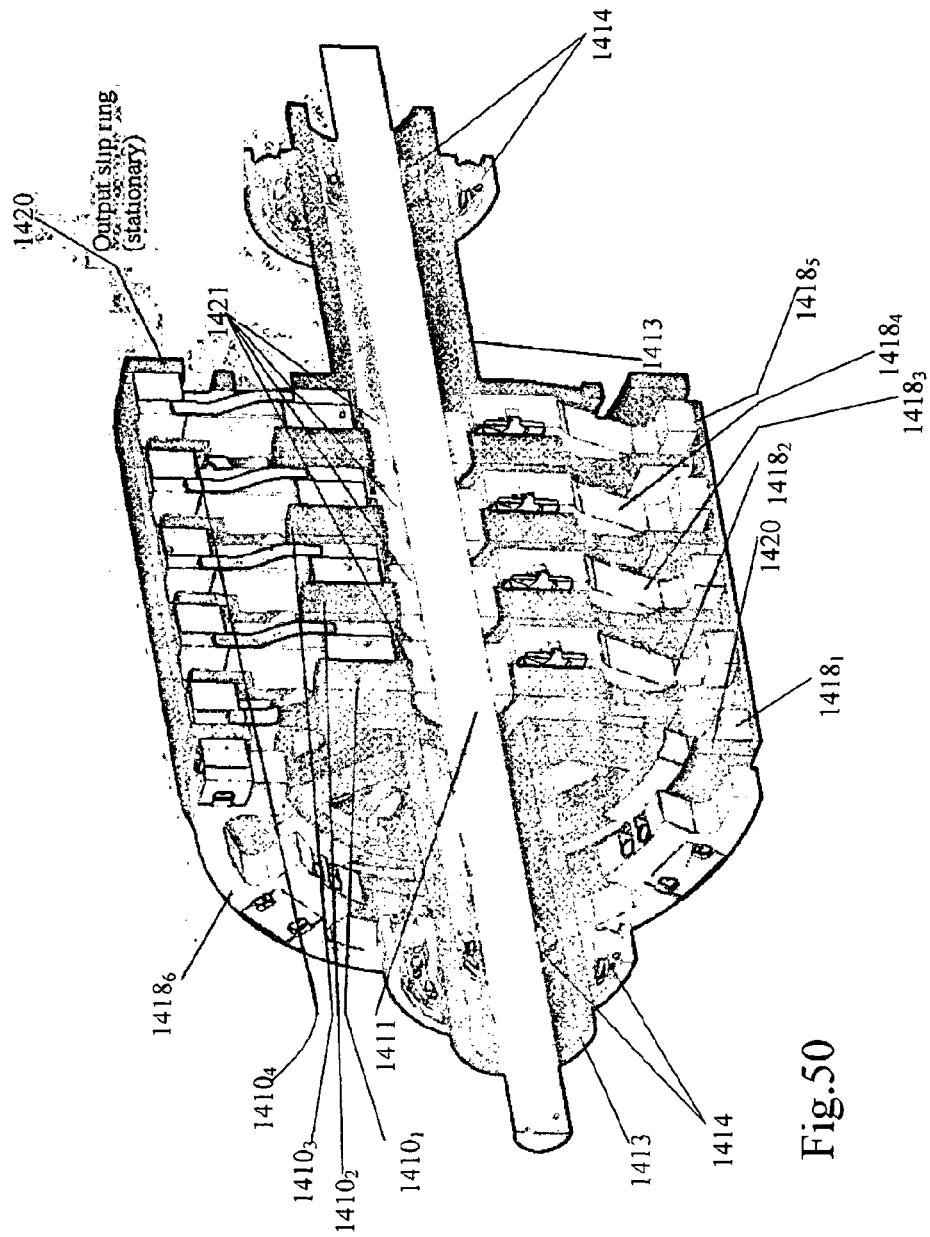
FIG. 50 is a cross-sectional view of the rotor assembly of FIG. 48 mounted in situ within the stator assembly of FIG. 49.

FIG. 50 shows the rotor assembly 1410 mounted in situ with respect to the stator assembly 1412. As shown each of the rotors 1410$_1$, 1410$_2$, 1410$_3$, 1410$_4$ are interlaced between each of the stators 1418$_1$, 1418$_2$, 1418$_3$, 1418$_4$, 1418$_5$. A set of spacer's 1421 are positioned between the inner shaft 1411 and the stators 1418$_1$, 1418$_2$, 1418$_3$, 1418$_4$, 1418$_5$. The spacers 1421 support and centre the inner shaft 1411 within the outer shaft 1413. In addition the spacers 1421 prevent shorting between the rotors and the stators. As can be seen an additional stator 1418$_6$ is utilised in this instance to apply current to the input slip ring 1420.

Figure 51:
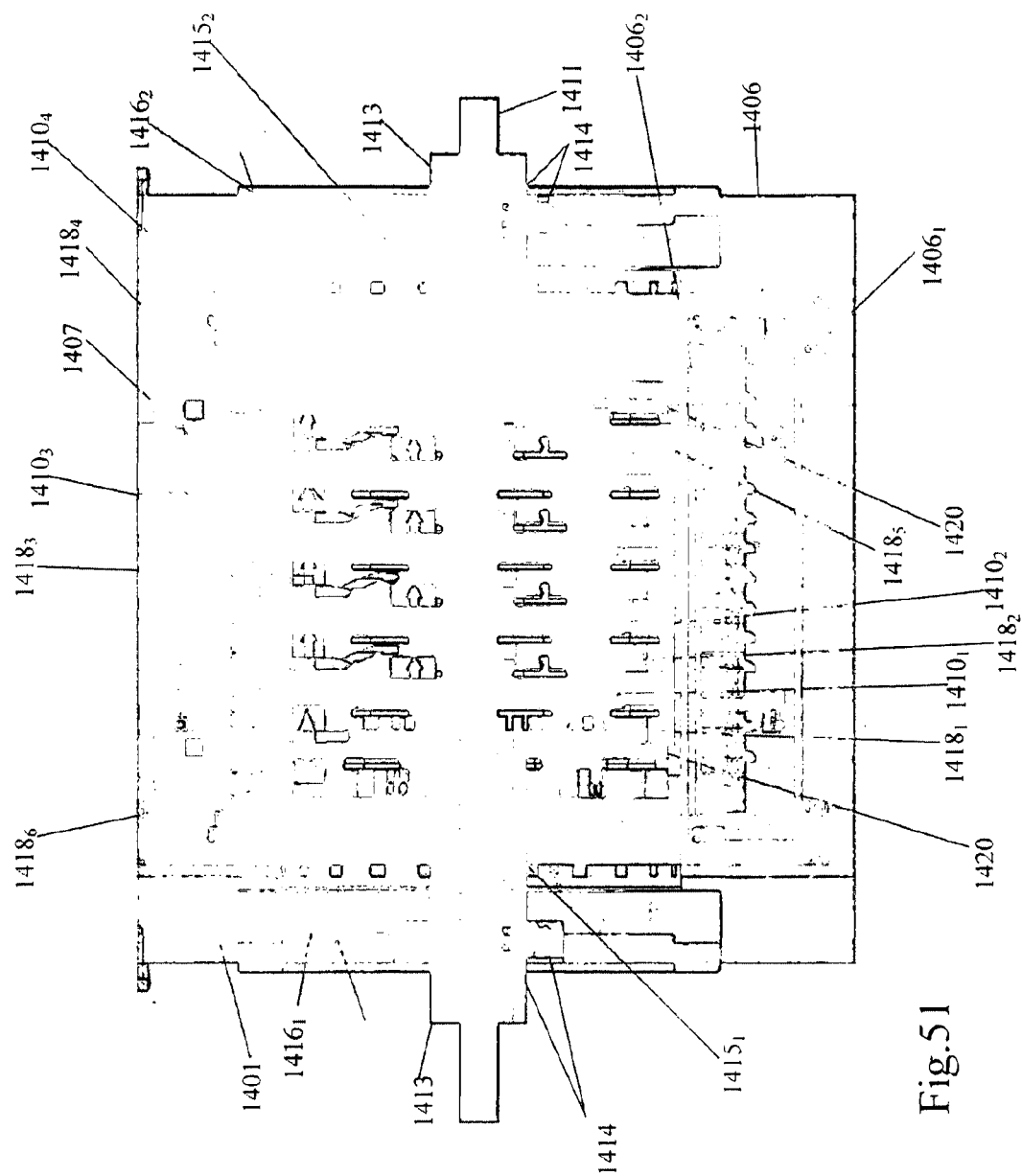
FIG. 51 is a schematic diagram depicting the passage of the drive current through the rotors and stators of the turbine of FIG. 47.

FIG. 51 depicts current flow through the motor as shown current enters the system from the rotor power supply through a number of parallel brushes that separate the stationary cryostat body from the rotating sections of the turbine. The current path continues through the first rotor which is attached via an insulating spacer 1421 to the inner shaft. As shown each of the rotors is attached to the inner shaft by an insulating spacer 1421 which prevents shorting between the rotors and the shaft and the stators. The current then flows serially through the remaining rotor/stator pairs until the final set of brushes which feed a stationary current output ring which is the beginning of the current return to the rotor power supply.

As the current flow in each of the rotors is from the rim to the hub while the current in each of the stators flows from the hub to the rim. As the current flows in opposite directions in the rotors and stators the interaction with the main drive field produces equal and opposite torques causing the inner 1411 and outer 1413 shafts to rotate in opposite directions. The torque generated by the shafts can then be drawn off utilising various gearing arrangements external to the motor 1400.

The turbine/motors discussed above utilise a series current feed. The following configurations discussed below are supplied with current in parallel. The parallel current configuration requires low voltage and high current which is ideal for damp conditions like a marine propulsion environment.

Under the parallel configuration the rotors are mounted directly (or form part of a single piece rotor and shaft) to the output shaft. Thus under the parallel configuration the rotors do not need to be electrical isolated from each other. This dramatically simplifies construction, as the rotor and shaft can have a fixed electrically conductive connection or be constructed as one piece.

Additionally, removing the inner brushes results in a larger effective working radius. The inner brushes take up a reasonable amount of space around the inner diameter and this moves the working blade length further from the rotating axis. In a parallel configuration the requirement for the inner brushes is removed increasing this working length.

Brushes are mounted at the periphery of each rotor and current travels to the centre shaft, along the shaft to the output brushes. The positive polarity is shown on the rotors and negative on output shaft brushes but this could also be reversed.

Figure 52:
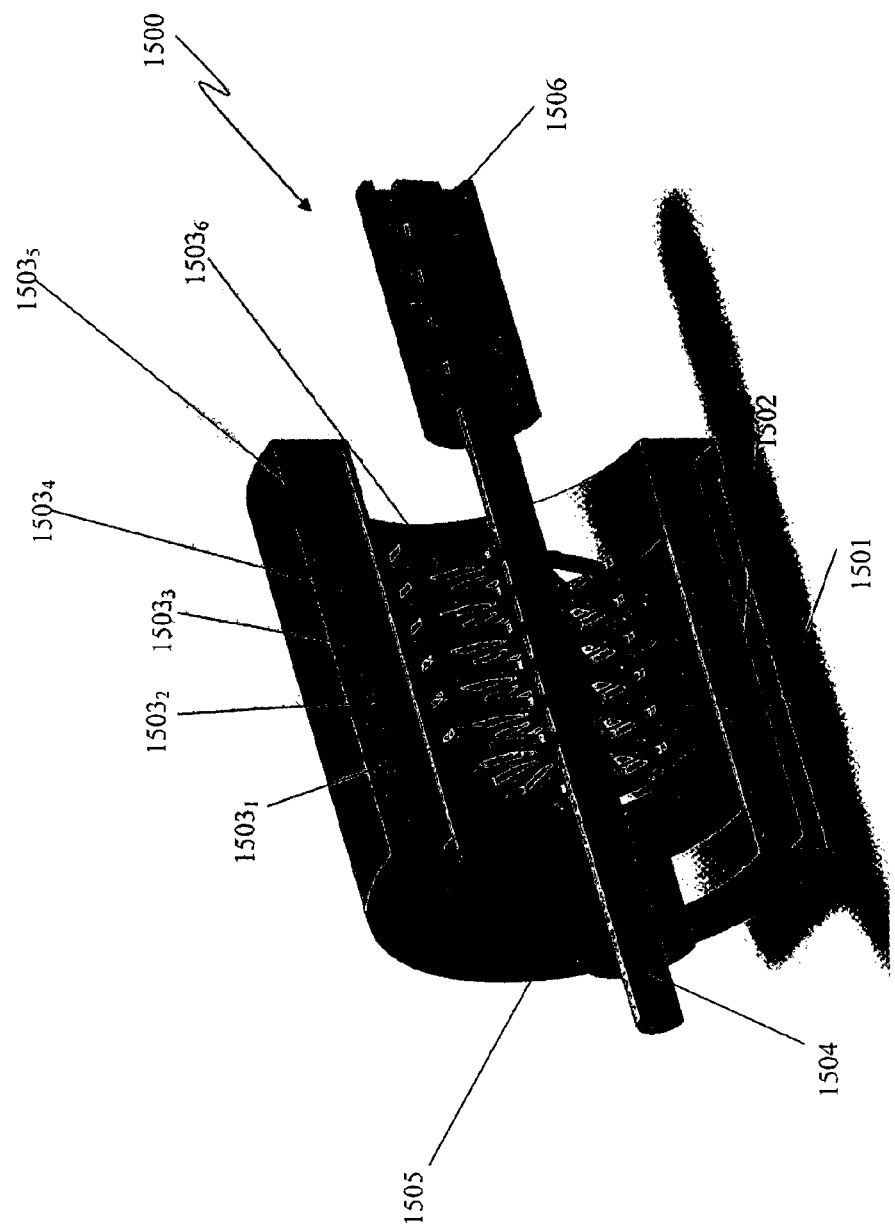
FIG. 52 is a schematic diagram illustrating the construction of an electromagnetic turbine according to one embodiment of the present invention.

FIG. 52 depicts a turbine 1500 configured for a parallel current feed according to one embodiment of the present invention. As shown the turbine 1500 includes a cryostat 1501 encasing a HTS solenoid 1502 which provides the static magnetic drive field. The design points and criteria for the driving coils have been discussed in detail above.

Position within the bore of the cryostat are the rotor assembly 1503 which includes a plurality of rotor discs $1503_1$, $1503_2$, $1503_3$, $1503_4$, $1503_5$, $1503_6$ of a similar construction to the rotors discussed above are coupled directly to the drive shaft 1504. The rotors are coupled to the input current bus bar 1505 which in this case forms the positive terminal. As can be seen the shaft 1504 passes through the input current bus bar. It will of course be appreciated by those of skill in the art that the shaft 1504 is electrically insulated from the input bus bar to prevent shorting.

A set of output brushes 1506 (negative terminal) are disposed at the opposing end of the shaft to that of the input bus bar. The output brushes in this instance are contained within a conductive cylindrical construction. As can be seen the shaft 1504 extends beyond the output brushes. Thus in the present example the torque generated on the shaft 1504 can be drawn off at a number of points on either side of the output brushes 1506.

Figure 53:
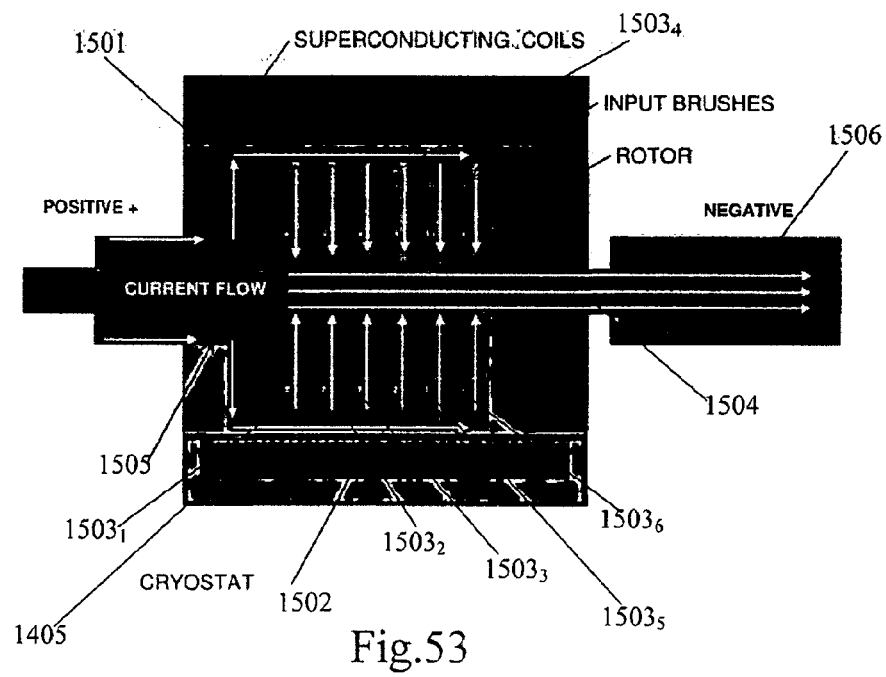
FIG. 53 is a schematic diagram depicting the passage of the drive current through the rotors and stators of the turbine of FIG. 52.

FIG. 53 depicts the current flow through the turbine of FIG. 52, As current is applied to the input bus bar 1505 it is transferred to the rim of each of the rotor discs by a series of conductive brushes 1507. The current then is passed through the rotors to the shaft 1504 and out to the output brushes 1506.

Figure 54:
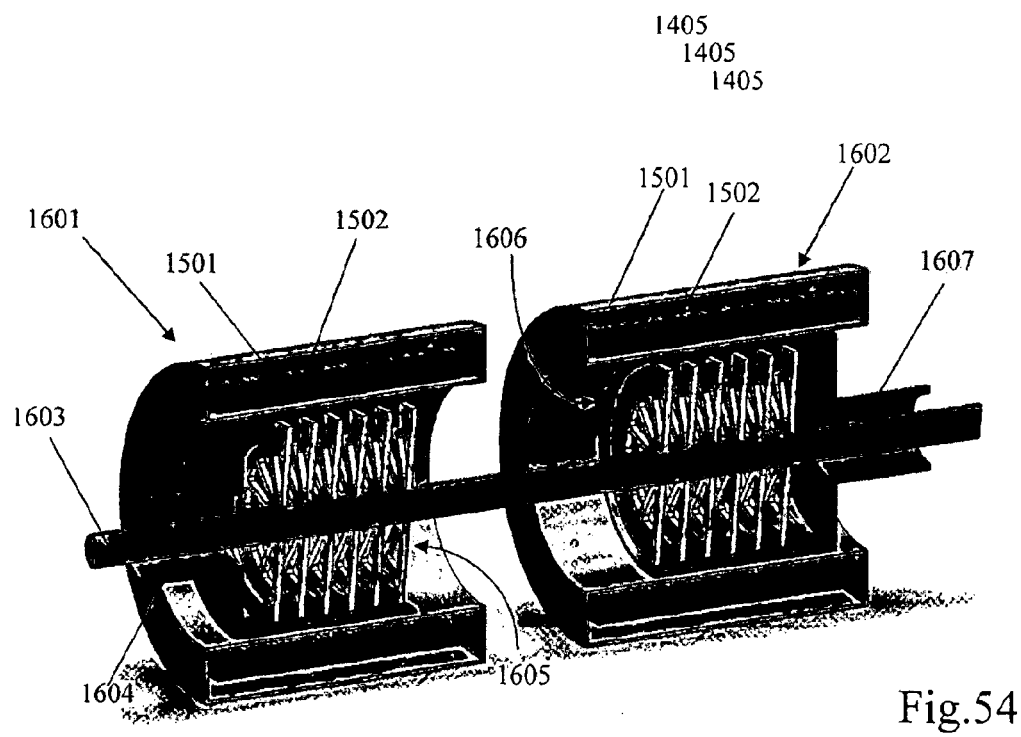
FIG. 54 is a schematic diagram illustrating the construction of an electromagnetic turbine according to one embodiment of the present invention.

With reference to FIG. 54 there is depicted a back to back configuration of the turbines of FIG. 52 above. As shown the configuration includes a primary turbine 1601 and a secondary turbine 1602 which replaces the output brushes 1506 of the above configuration. A single shaft 1603 is utilised to connect the two turbines. The operation of the back to back configuration can be more readily understood with reference to FIG. 55 which illustrates the current flow through the turbine.

Figure 55:
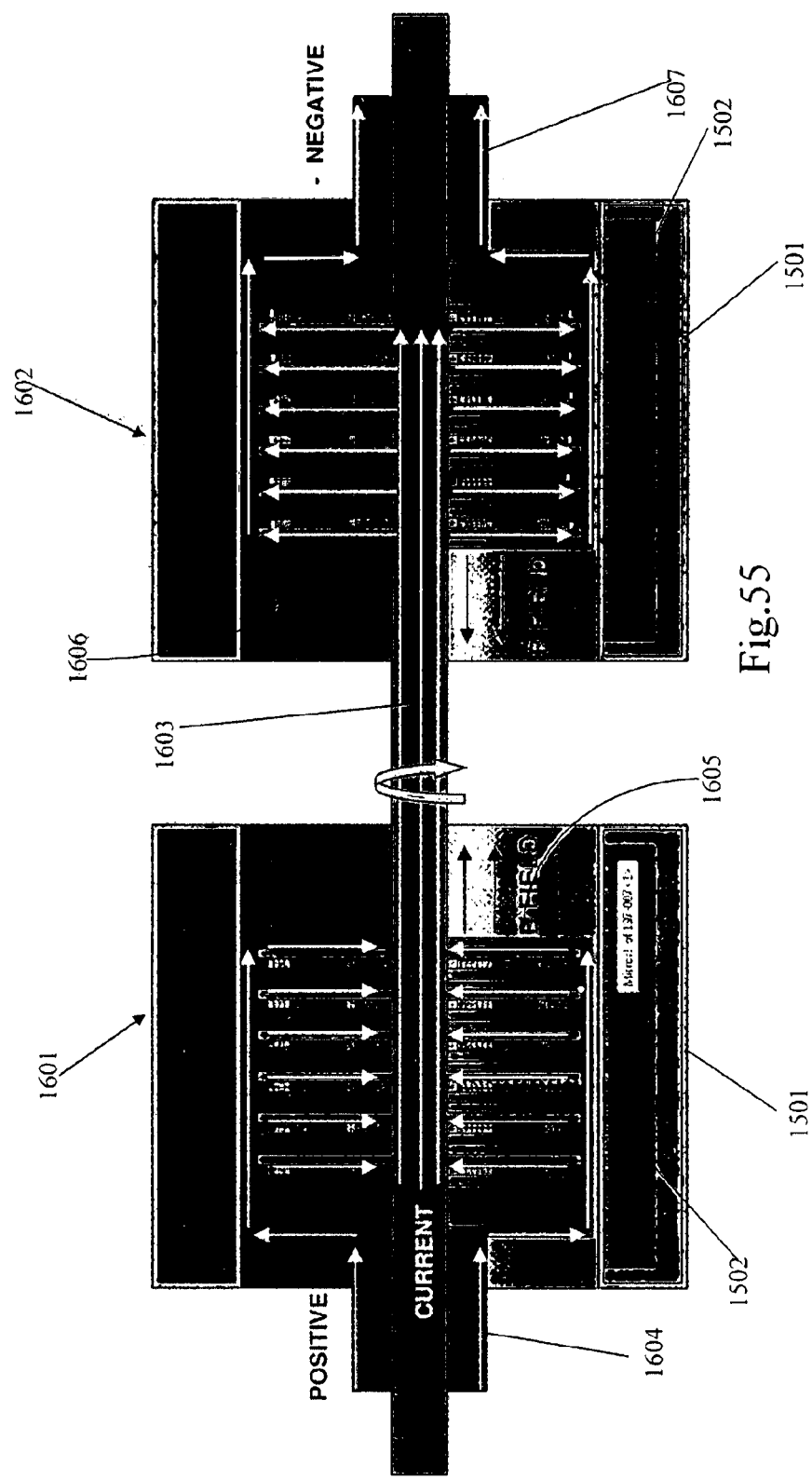
FIG. 55 is a schematic diagram depicting the passage of the drive current through the rotors and stators of the turbine of FIG. 54.

As can be seen from FIG. 55 as current is passed through input bus bar 1604 the current is passed to the rotors 1605 of the primary turbine 1601. The current is transferred from the rotors 1605 to shaft 1603. The current is then passed along the shaft 1603 to the rotors 1606 of the secondary turbine 1602. The current then passes through the rotors 1606 to the output current bus bar 1607. To ensure unitary rotation on the shaft the magnetic field in the secondary turbine 1602 is of opposite polarity to that of the primary turbine 1601.

Figure 56:
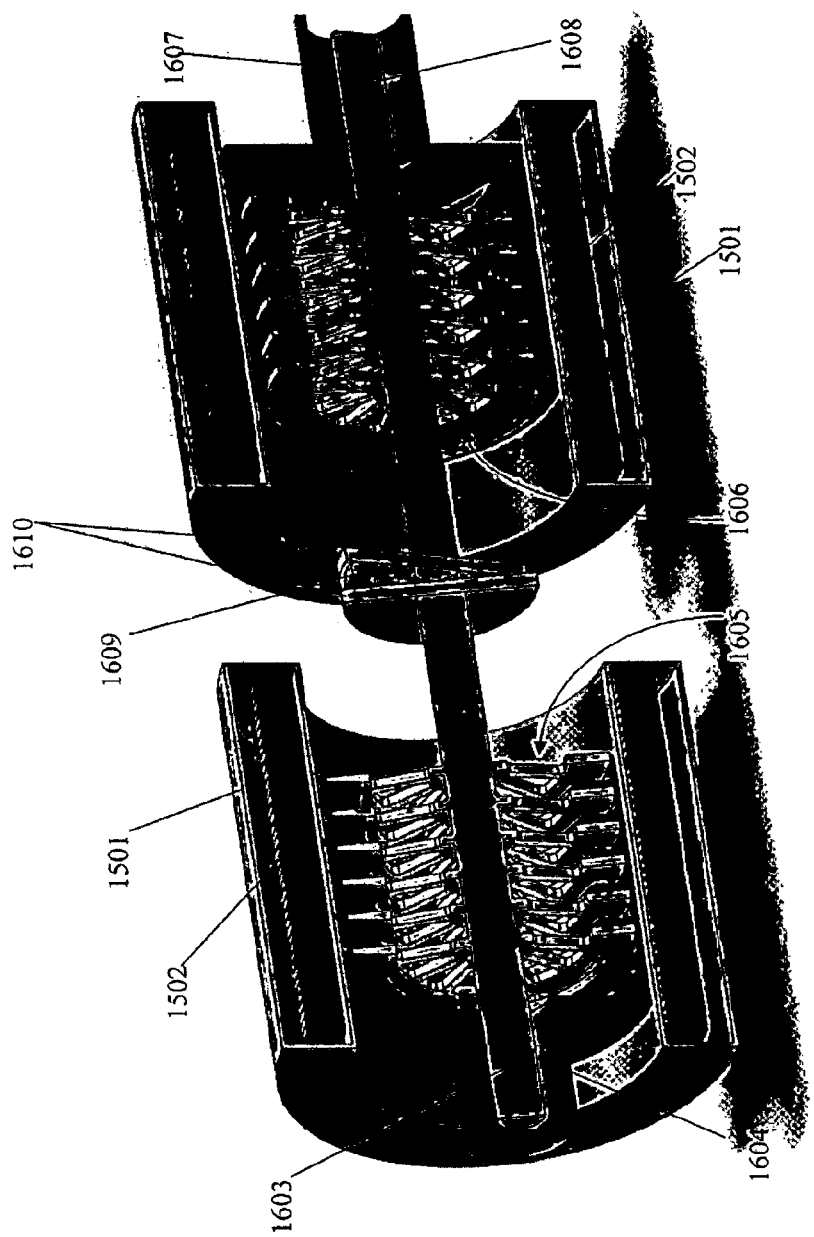
FIG. 56 is a schematic diagram illustrating the construction of an electromagnetic turbine according to one embodiment of the present invention.

FIG. 56 depicted an alternate back to back configuration of the turbines. Again the configuration includes a primary turbine 1601 and a secondary turbine 1602 which replaces the output brushes 1506 of the above configuration. The shaft 1603 of the primary turbine 1601 is connected to the shaft 1608 of the secondary turbine by means of a conductive slip joint 1609.

Figure 57:
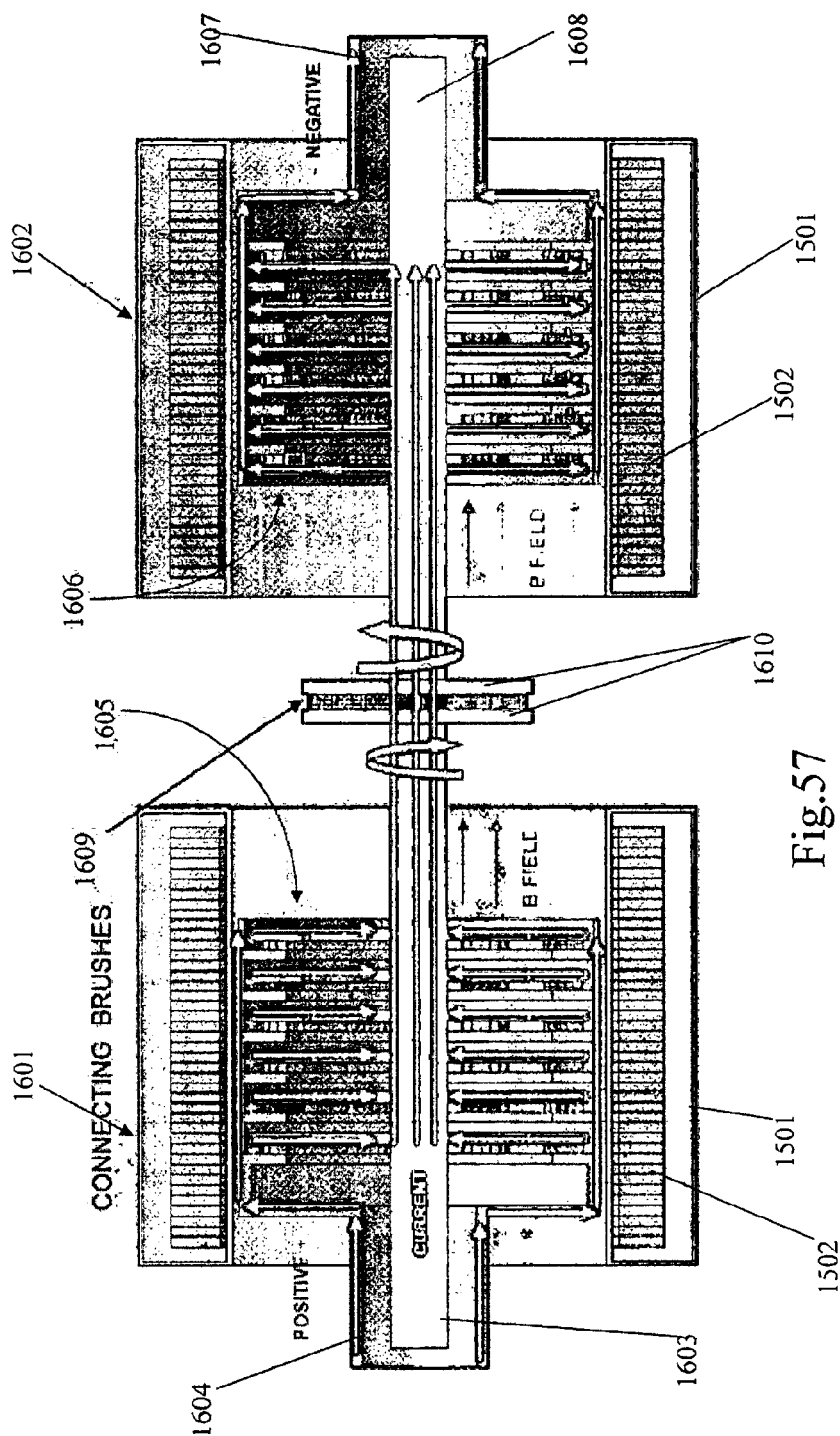
FIG. 57 is a schematic diagram depicting the passage of the drive current through the rotors and stators of the turbine of FIG. 56.

As can be seen from FIG. 57 as current is passed through input bus bar 1604 the current is passed to the rotors 1605 of the primary turbine 1601. The current is transferred from the rotors 1605 to shaft 1603. The current is then passed along the shaft 1603 to the one side of the slip joint 1609 the current is transferred to the opposing side of the slip joint 1609 via a set of brushes is 1610. The current then passes along shaft 1608 to the rotors 1606 of the secondary turbine 1602. The current then transferred through the rotors 1606 to the output current bus bar 1607. Utilising this configuration means that the magnetic field in the secondary turbine 1602 can be the same polarity to that of the primary turbine 1601.

Figure 58:
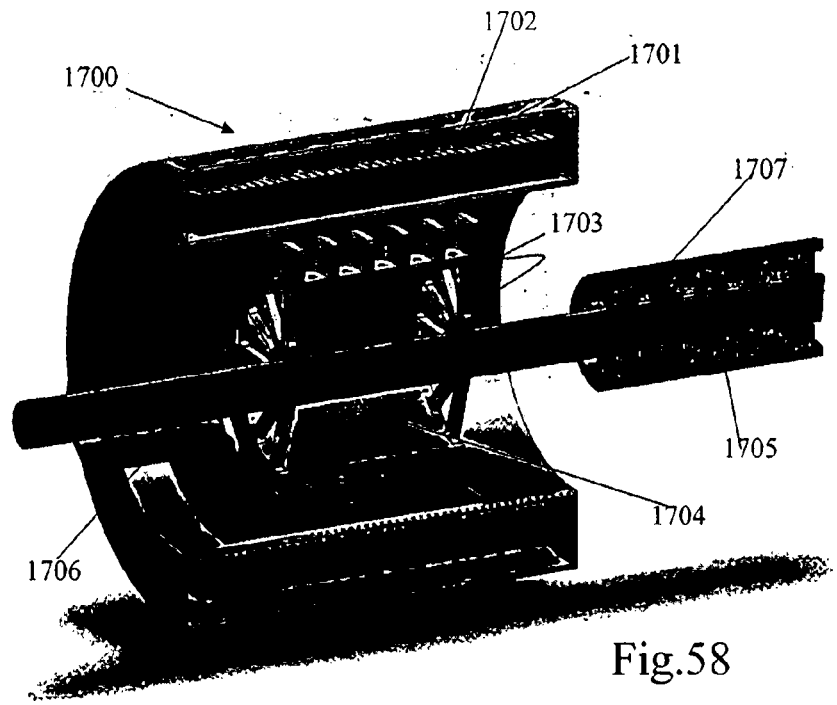
FIG. 58 is a schematic diagram illustrating the construction of an electromagnetic turbine according to one embodiment of the present invention.

FIG. 58 depicts a yet another parallel current feed configuration according to one embodiment of the present invention. The construction is similar to that discussed in relation to FIG. 52 above. Again the turbine 1700 includes a cryostat 1701 encasing a HTS solenoid 1702 which provides the static magnetic drive field. The design points and criteria for the driving coils have been discussed in detail above. Positioned within the bore of the cryostat are the rotor assembly 1703. The rotor assembly in this case is mainly hollow and includes a drum 1704 which is coupled at either end to the drive shaft 1705. The drum is coupled to the input current bus bar 1706 which in this case forms the positive terminal. As can be seen the shaft 1705 passes through the input current bus bar 1706 via a bearing mount. It will of course be appreciated by those of skill in the art that the bearing is electrically insulated from the input bus bar to prevent shorting.

Figure 59:
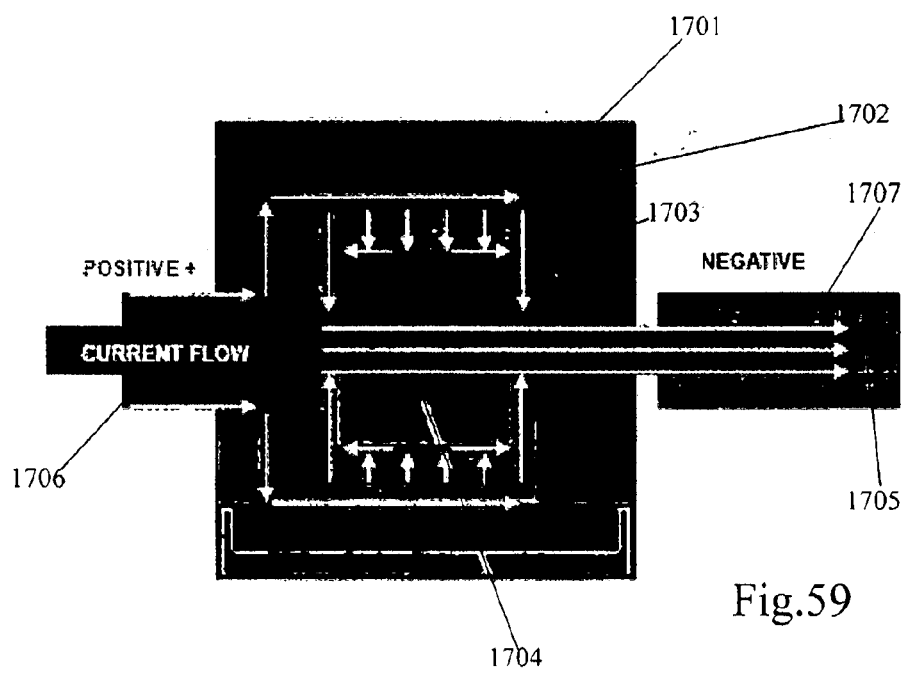
FIG. 59 is a schematic diagram depicting the passage of the drive current through the rotors and stators of the turbine of FIG. 58.

As can be seen from FIG. 59 as current is passed through the input bus bar 1706 it is transferred to the outer surface of the drum 1704 through the end couplings to the shaft 1704 and out to the output brushes 1707.

Figure 60:
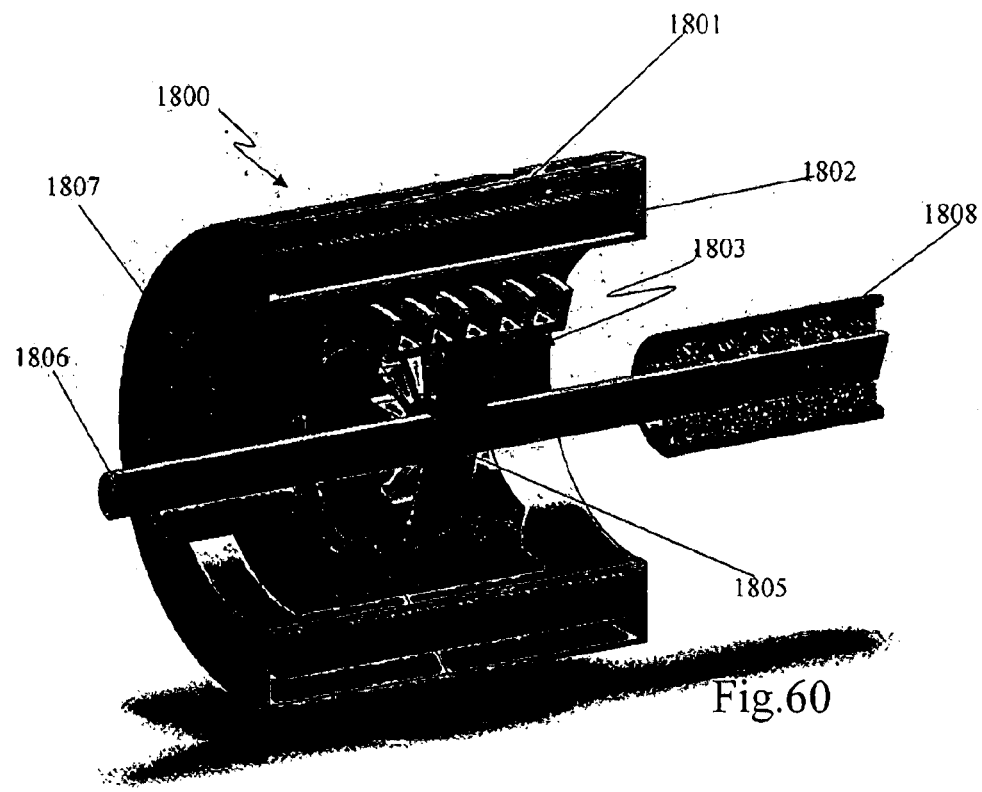
FIG. 60 is a schematic diagram illustrating the construction of an electromagnetic turbine according to one embodiment of the present invention.

FIG. 60 depicts a yet another parallel current feed configuration according to one embodiment of the present invention. The construction is similar to that discussed in relation to FIGS. 52 and 58 above. The turbine 1800 in this instance includes a cryostat 1801 encasing a HTS solenoid 1802 which provides the static magnetic drive field. The design points and criteria for the driving coils have been discussed in detail above. Positioned within the bore of the cryostat is rotor assembly 1803. The rotor assembly in this case is mainly hollow and includes a drum 1804 which is coupled via a central spine 1805 to the drive shaft 1806. The drum 1804 is coupled to the input current bus bar 1807 which in this case forms the positive terminal. As can be seen the shaft 1806 passes through the input current bus bar 1807 via a bearing mount. It will of course be appreciated by those of skill in the art that the bearing is electrically insulated from the input bus bar to prevent shorting.

Figure 61:
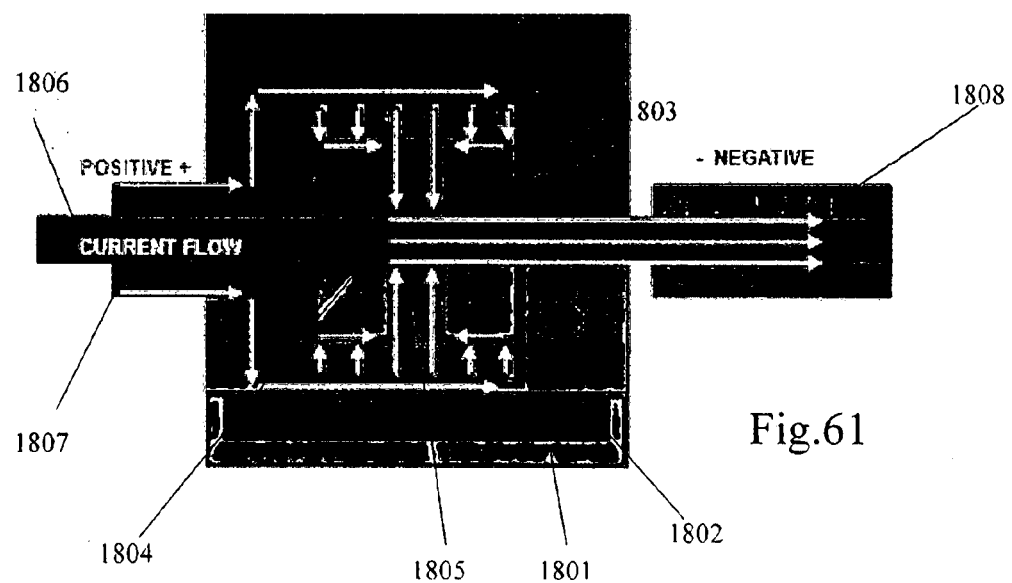
FIG. 61 is a schematic diagram depicting the passage of the drive current through the rotors and stators of the turbine of FIG. 60.

As can be seen from FIG. 61 as current is passed through the input bus bar 1807 it is transferred to the outer surface of the drum 1804 through the spine 1805 to the shaft 1806 and out to the output brushes 1808.

Figure 62:
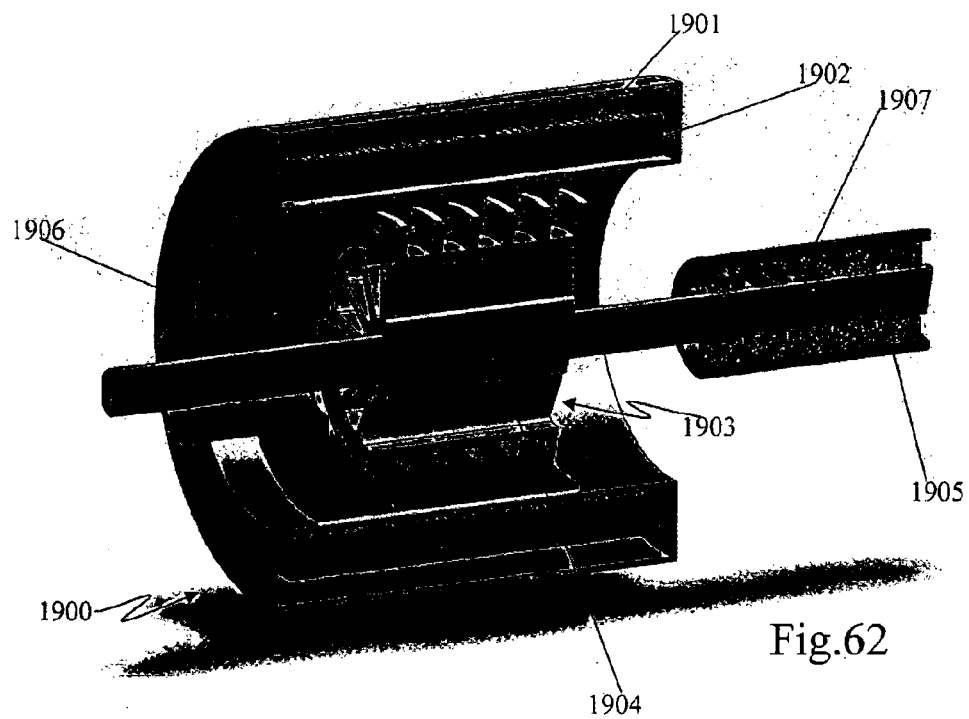
FIG. 62 is a schematic diagram illustrating the construction of an electromagnetic turbine according to one embodiment of the present invention.

A further possible construction of a parallel turbine configuration is shown in FIG. 62. Again the construction is similar to the earlier discussed constructions and includes a cryostat 1901 encasing a HTS solenoid 1902 which provides the static magnetic drive field. The design points and criteria for the driving coils have been discussed in detail above. Positioned within the bore of the cryostat are the rotor assembly 1903. The rotor assembly in this case includes a near solid drum 1904 which is coupled directly to the drive shaft 1905. The drum 1904 is coupled to the input current bus bar 1706 which in this case forms the positive terminal. As can be seen the shaft 1905 passes through the input current bus bar 1906 via a bearing mount. It will of course be appreciated by those of skill in the art that the bearing is electrically insulated from the input bus bar to prevent shorting.

Figure 63:
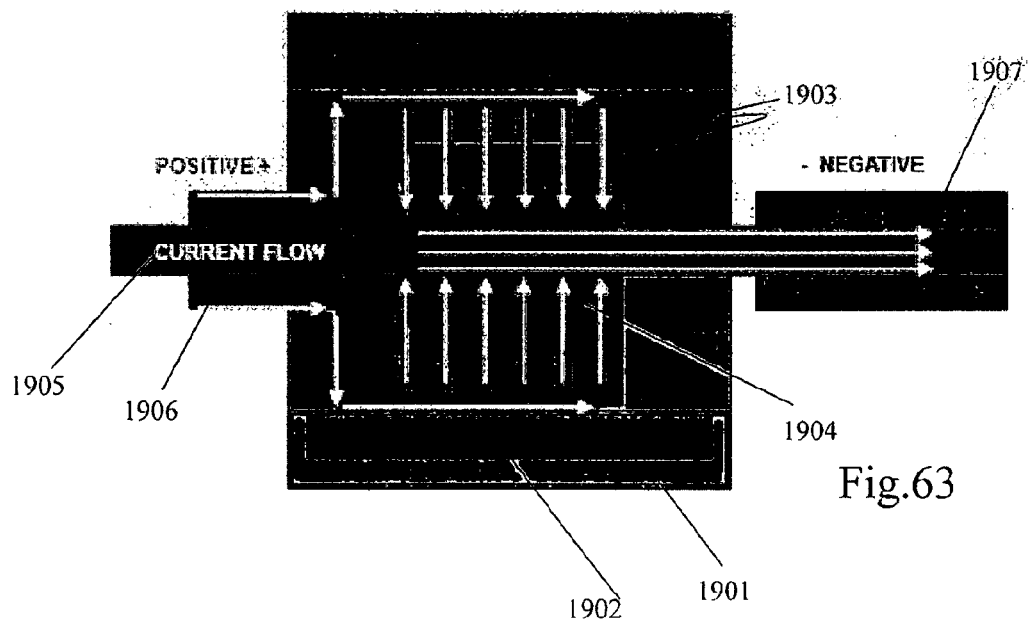
FIG. 63 is a schematic diagram depicting the passage of the drive current through the rotors and stators of the turbine of FIG. 62.

As can be seen from FIG. 63 as current is passed through the input bus bar 1906 it is transferred to the outer surface of the drum 1904 to the shaft 1905 and out to the output brushes 1907.

The conductive liquid/fluid contact brushes described previously can also be extended to use on the parallel configurations. A conductive fluid makes the electrical contact between the rotor and current supply (either stationary or counter rotating).

Figure 64:
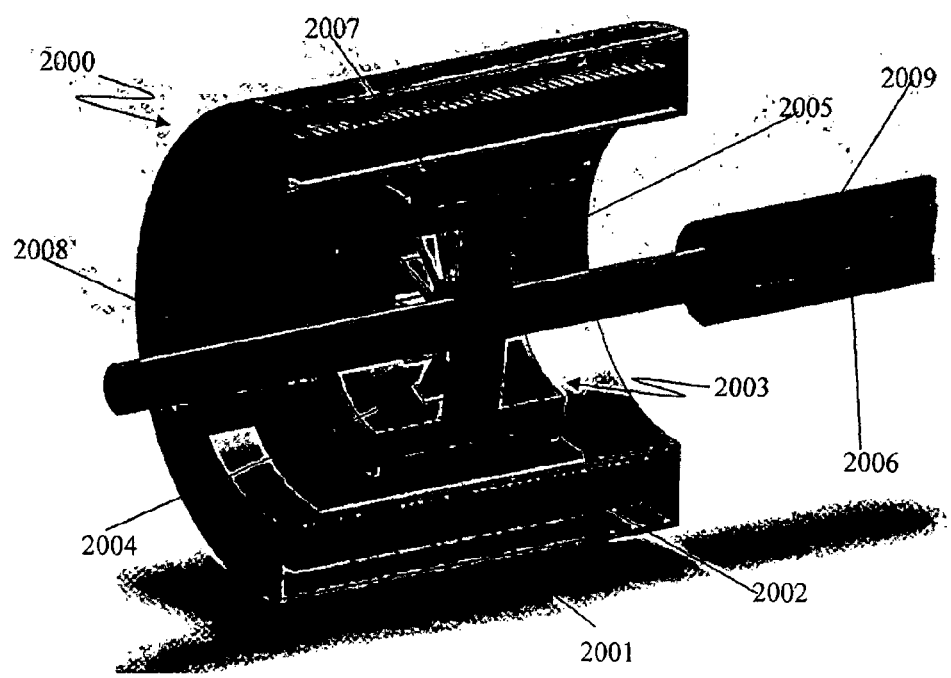
FIG. 64 is a schematic diagram illustrating the construction of an electromagnetic turbine according to one embodiment of the present invention.

The conductive fluid is prevented from leaking with appropriate sealing. FIG. 64 depicts one possible configuration of a parallel configuration utilising a conductive fluid. The turbine 2000 in this case in this instance includes a cryostat 2001 encasing a HTS solenoid 2002 which provides the static magnetic drive field. The design points and criteria for the driving coils have been discussed in detail above. Positioned within the bore of the cryostat are the rotor assembly 2003. The rotor assembly in this case is mainly hollow and includes a drum 2004 which is coupled via a central spine 2005 to the drive shaft 2006.

The outer surface of the drum 2004 includes a recess 2007 which contains the conductive fluid. The input bus bar 2008 is in contact with the fluid to thereby transfer current to the drum 2004 along the spine 2005 to the shaft and to the output brushes 2009.

Figure 65:
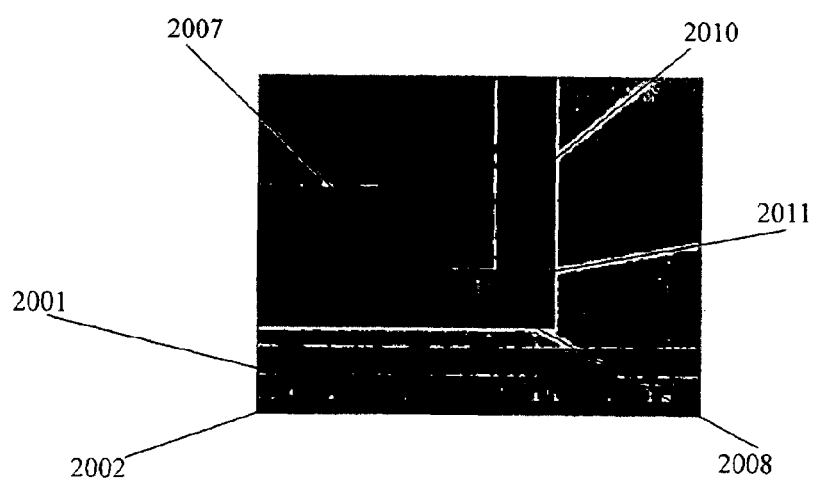
FIG. 65 is a detailed view of the sealing arrangement between for the current transfer mechanism of the turbine of FIG. 54.

FIG. 65 shows the interface between the conductive fluid and the input bus bar 2008. As can be seen seals 2011 are provided at the between the recess 2007 the drum and the outer surface of the bus bar 2008. The seals are held in place by end caps 2010.

Figure 66:
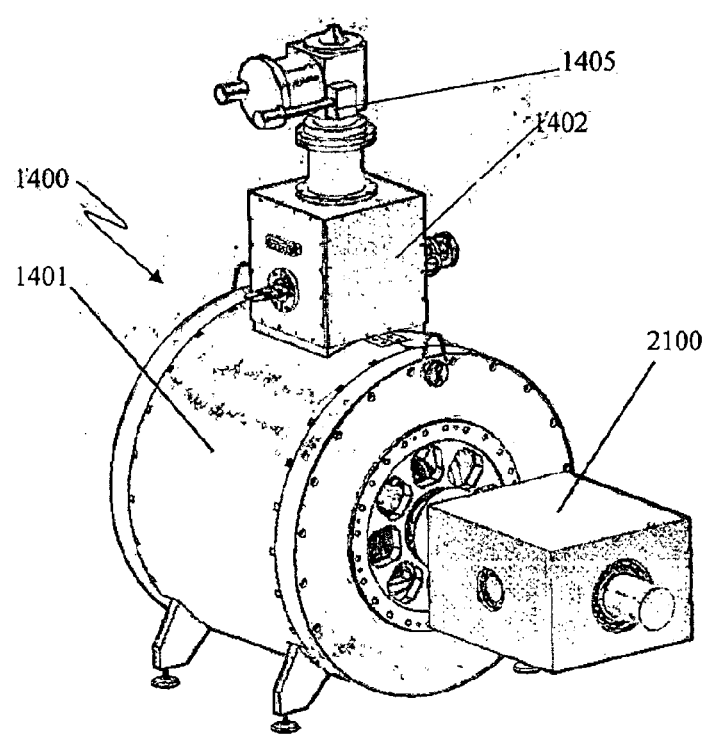
FIG. 66 is a schematic diagram illustrating one possible arrangement for the transfer of torque from an electromagnetic motor according to one embodiment of the present invention.

As noted above the torque generated by each of the turbines/motors can be drawn off utilising various torque transfer arrangements. FIG. 66 depict a turbine of the construction discussed in relation to FIG. 47 above (i.e. dual shaft counter rotating turbine) attached to a torque transfer and RPM equalisation arrangement 2100. As shown the torque transfer and RPM equalisation arrangement 2100 is coupled to the inner 1411 and outer 1413 shafts and provides a single output shaft.

Figure 67A:
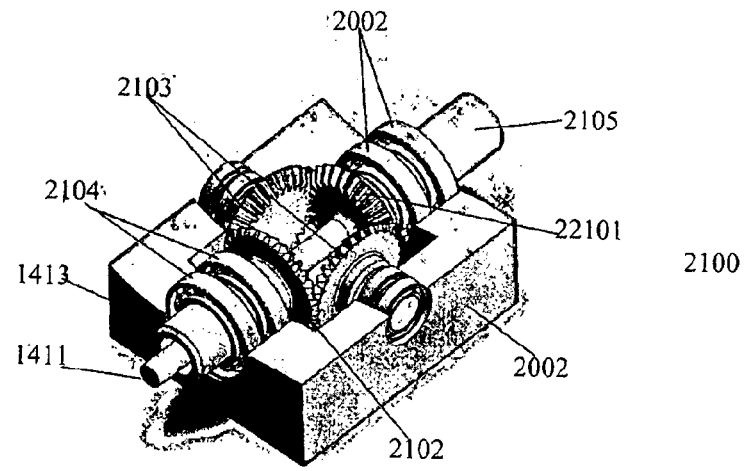
FIG. 67A is a partial cross-sectional view of a torque transfer arrangement for attachment to an electromagnetic motor according to one embodiment of the present invention.
Figure 67B:
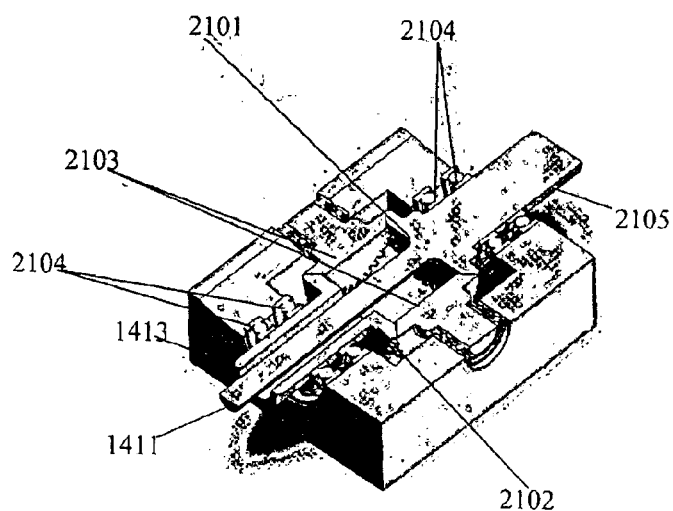
FIG. 67B is a cross-sectional view of a torque transfer arrangement FIG. 66.

The construction of the torque transfer and RPM equalisation arrangement 2100 is shown in FIGS. 67A and 67B which are cross-sectional views of the torque transfer and RPM equalisation arrangement 2100. With reference to FIG. 67A the torque transfer and RPM equalisation arrangement 2100 includes a differential gearbox. The system would ordinarily be within an oil lubricated housing sealed appropriately. As can be seen the both the inner 1411 and outer 1413 shafts are coupled to input gears 2101, 2102 which mesh with a pair of pinion gears 2103. All the gearing arrangements and shafts are rotatably mounted on bearings 2104.

As can be seen from FIG. 67B the inner shaft 1411 extends through the output shaft 2105 and is coupled to input gear 2102 which is directly coupled to the output shaft 2105.

The outer shaft 1413 is coupled to input gear 2102 which is coupled to the out put shafts via the pinion gears 2103 which mesh with input gear 2101.

Figure 68A:
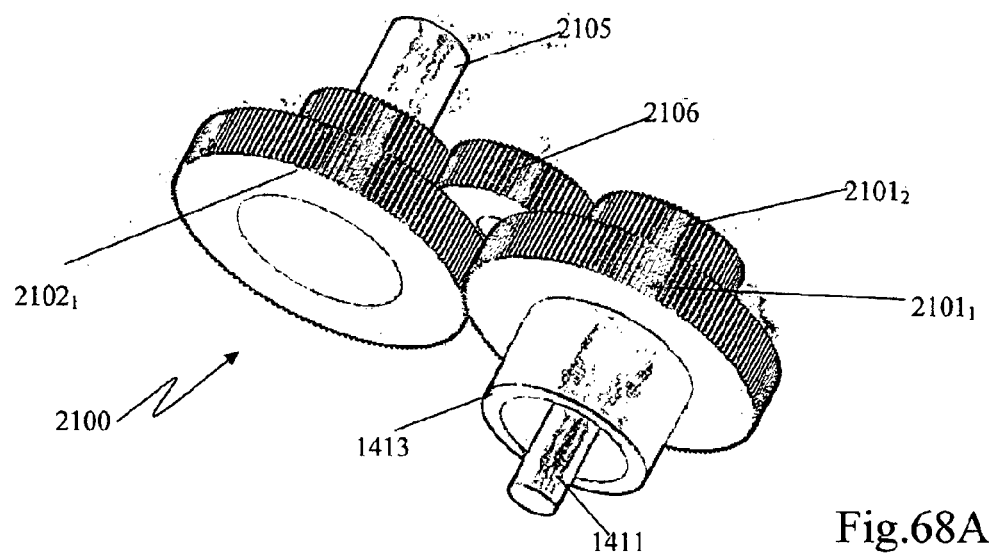
FIG. 68A is a schematic diagram of a torque transfer arrangement for attachment to an electromagnetic motor according to one embodiment of the present invention.
Figure 68B:
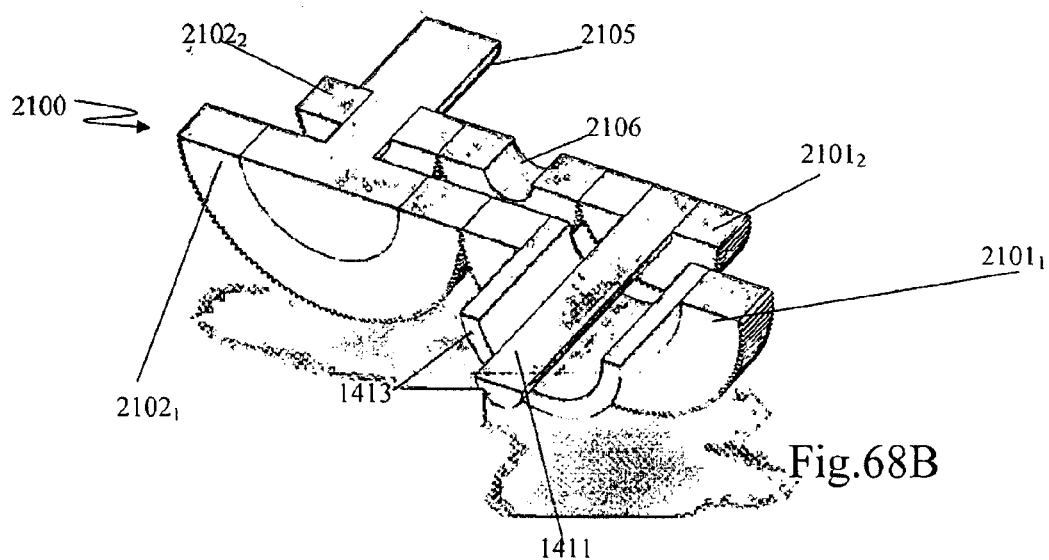
FIG. 68B is a cross-sectional view of a torque transfer arrangement FIG. 68A.

FIGS. 68A and 68B depict an alternate torque transfer and RPM equalisation arrangement 2100 according to one embodiment of the present invention. As shown the system in this case utilises spur or helical gear instead of bevel gears. The output shaft 2105 is no longer co axial with the input shafts 1411, 1413. As can be seen the inner 1411 and outer shaft 1413 are coupled to input gears $2101_1$, $2101_2$ which are coupled to gears $2102_1$, $2102_2$ on the output shaft 2105. As can be seen from FIG. 68B the outer shaft 1413 is coupled directly to gear $2101_1$ which meshes directly with gear $2102_1$ on the output shaft. The inner shaft 1411 passes through the outer shaft and couples with gear $2101_2$. Gear $2101_2$ is coupled to gear $2102_2$ via an intervening pinion gear 2106 to ensure that the rotation imparted on the output shaft 2105 by the inner shaft matches the rotation imparted by the outer shaft 1413.

The basic principle of operation of the Electromagnetic Turbine is the production of a reaction force between a current carrying conductor and a stationary magnetic field. In this manner it is possible to predict the peak power of the device at full speed and to examine the effect of scaling on the power and speed of operation.

The basic equation for the force generated on a current carrying conductor in a uniform perpendicular magnetic field is:

$$F = B \cdot i \cdot l$$

Where B is the perpendicular magnetic field in Tesla, i is the total amount of current in the conductive wire in Amperes, l is the total length of the current path in meters and F is the resulting force in Newtons.

The torque, T, produced by this force about the central axis is:

$$T = \frac{F \cdot r}{2}$$

Where r is the radius of the disc. For a simplified case where the current carrying conductor length l extends from the shaft axis to the outer radius of the disc the following formula results:

$$T = \frac{B \cdot i \cdot r^2}{2}$$

Therefore the torque of the engine can be shown to vary with the square of the radius of the bladed discs except at small scales where space required for the brushes reduces the length of the current carrying conductor.

The peak power of the device at operating current can be described as:

$$P = T \cdot \omega$$

Where ω is the angular velocity in rad/s. In RPM the equation is:

$$P = \frac{T \cdot RPM \cdot \pi}{30}$$

which gives us the power output for a given RPM. In the case of the Electromagnetic Turbines the maximum speed is limited by the maximum speed of the brushes on the outer surface of the rotating bladed disc. The metal fibre brushes used have a fixed surface speed limit (vmax) of 90 m/s. The peak RPM is therefore:

$$RPM = \frac{v_{max}}{2 \cdot \pi \cdot r} \times 60$$

From this it is shown that the maximum RPM of the disc is inversely proportional to the radius of the disc. Substituting the RPM and force equations into the original equation for power:

$$P = \frac{B \cdot i \cdot r^2 \cdot v_{max} \cdot 60 \cdot \pi}{120 \cdot \pi \cdot r}$$

Which simplifies to:

$$P = \frac{B \cdot i \cdot r \cdot v_{max}}{2}$$

Figure 69A:
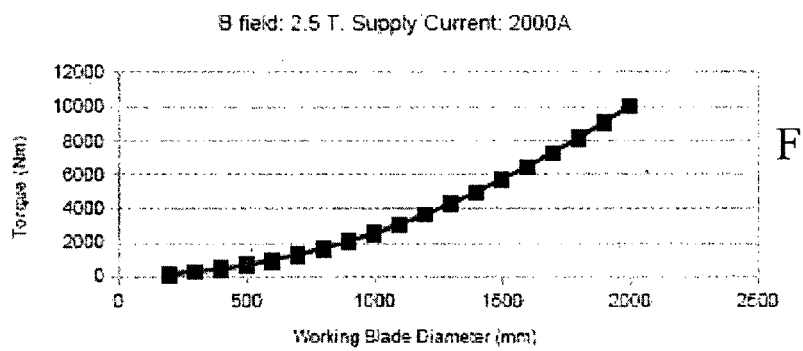
FIGS. 69A to 69C are plots of various characteristics of electromagnetic turbines according to embodiments of the present as a function of rotor diameter.
Figure 69B:
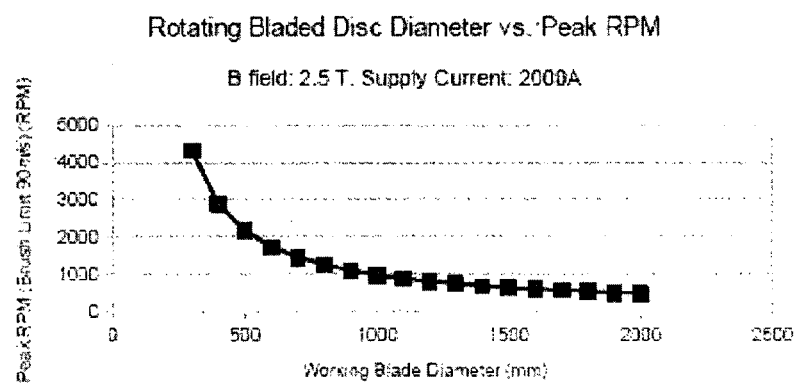
Figure 69C:
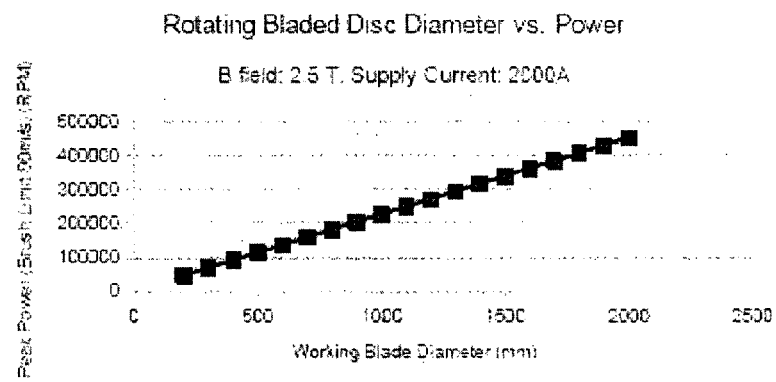

In the simplest case the peak power available for a single rotating blade is proportional to the radius of the blade. As the engine is scaled up in size the torque increases with the square of the radius of the blade while the maximum operating RPM decreases with increasing radius. As can be seen from the plots in FIGS. 69A to 69C. FIG. 69A depicts the rotor diameter verses torque, while FIG. 69B depicts rotor diameter verses RPM and finally FIG. 69C depicts the rotor diameter verses power.

Figure 70:
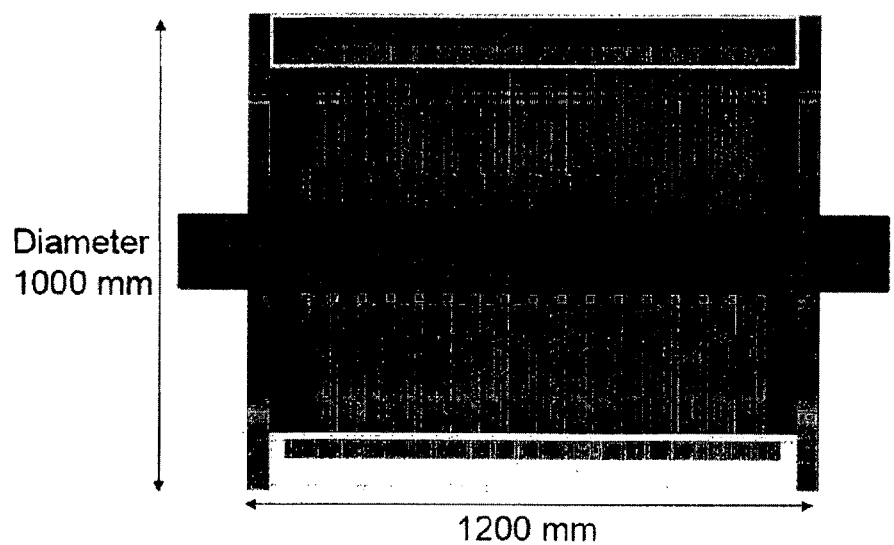
FIG. 70 is a cross-sectional view of a turbine according to one embodiment of the present invention.

From the above it is apparent that the turbines/motors according to the present invention can be readily scaled to reflect the required operating power and speed. FIG. 70 depicts one possible configuration for a 10 MW concept that is a high power density DC Motor with 5 Tesla working magnetic field and 10000 A DC total current. It has a 2500 rpm peak operating speed and 16 working blades. Overall diameter without cancelling coils is approximately 1000 mm. With cancelling coils the outer diameter would increase 1.5-2×. The overall length without cancelling coils is approximately 1200 mm.

Figure 71:
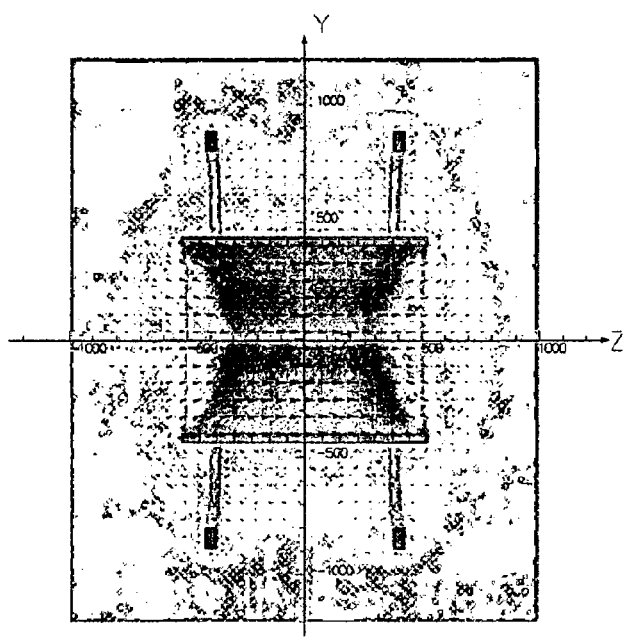
FIG. 71 is a plot of the magnetic field produced by the turbine of FIG. 70' when compensation coils are employed.

FIG. 71 is a plot of the magnetic field produced by the solenoid of the configuration of FIG. 70. In addition to the solenoid cancelling coils are disposed about the solenoid to shape the external field and thereby reduce shielding requirements.

Figure 72:
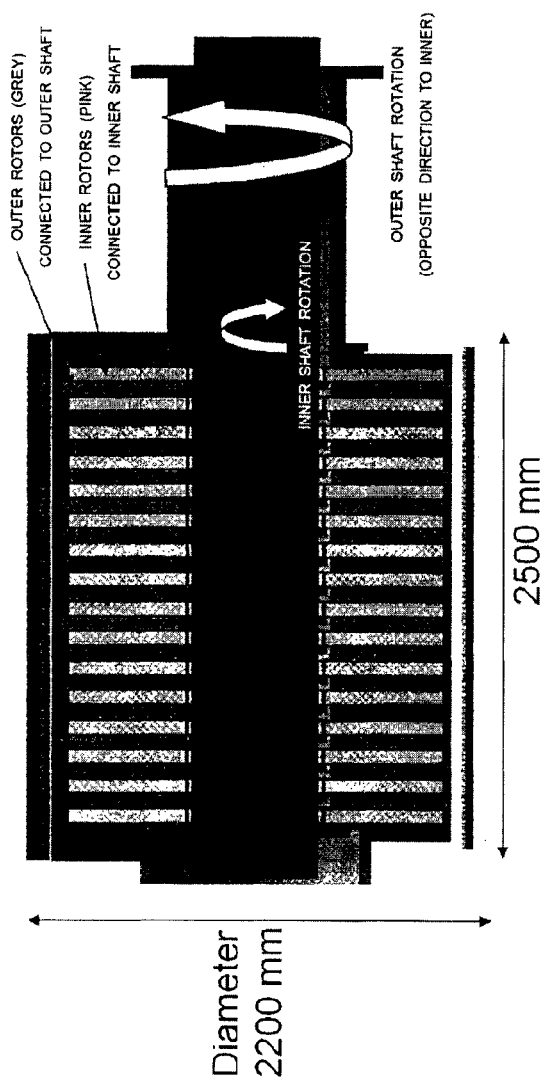
FIG. 72 is a cross-sectional view of a turbine according to one embodiment of the present invention.

FIG. 72 depicts a 40 MW high power density DC Motor with 5 Tesla working magnetic field and 50000 A DC total current. It has a 180 RPM peak operating speed and 32 working blades. It is optimised for marine applications with low RPM and counter rotating shaft outputs to suit counter rotating propellers. The overall diameter without cancelling coils is approximately 2.5 m. With cancelling coils the outer diameter would increase 1.5-2 times. The overall length without cancelling coils is approximately 2.5 m.

FIGS. 73A and 73B depict the arrangement of RPM & Torque equaliser system 2100 which could be fitted to turbine of FIG. 72. As can be seen from FIG. 73A the outer shaft 1413 is coupled to a bevelled gear 2200. The inner shaft 1411 is fitted with a bevelled gear 2201 which is coupled to the bevelled gear 2200 on the outer shaft 1413 by a series of pinion gears 2202 see FIG. 73B.

Figure 74:
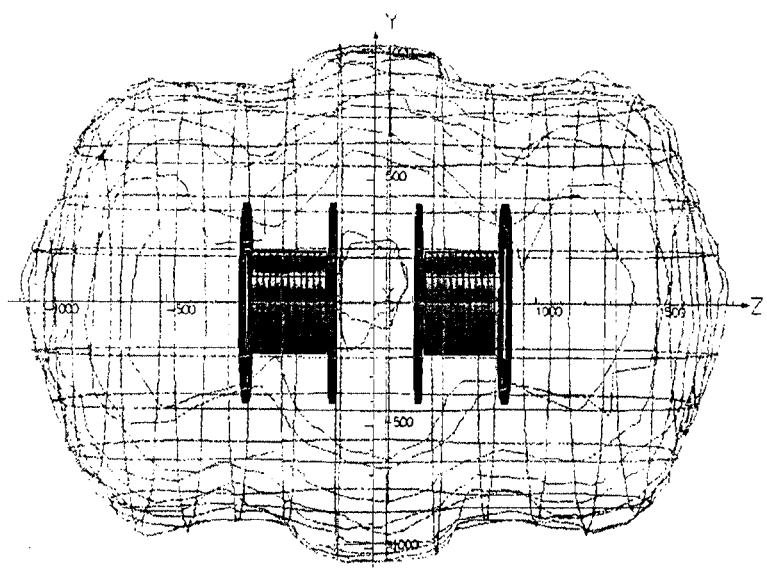
FIG. 74 is a plot of the forces generated between two solenoids in proximity.

One potential issue of construction of the stator body when more than one solenoid is employed (such previously detailed examples that use parallel current paths) is the force developed between the respective solenoids. Failure to account for the magnitude of the forces encountered when designing the coils' support structure would result in the destruction of the stator assembly. FIG. 74 shows a pair of solenoids modelled with Vector Field Opera 3d. The above solenoids employ 4 cancelling coils in order to bring the 5 Gauss surface (shown by a series of blue lines) closer to the body of the coils. The cancelling coils affect the forces of attraction or repulsion between the two solenoids.

The coils modelled are the same size as the solenoids used in the configuration shown in FIG. 42. The inner diameter of the solenoids is 340 mm and the length of the individual solenoids is 308 mm. The average field strength produced in the centre is 2.5 T and the peak field strength is 2.75 T. The distance between the solenoids end-to-end is 400 mm.

In the case where cancelling coils are not employed then the force of attraction or repulsion ($F_z$) between the coils along the central axis of both coils is around 28 kN. When cancelling coils are used the forces on the main solenoids is around 6.5 kN. While the main load between the two solenoids is reduced care still needs to be taken to ensure adequate support of the cancelling coils which experience an axial force of 40 kN in this configuration.

In the case of the majority of the turbines discussed above the adverse effects of the high magnetic field environment on the metal fibre brushes are minimised by ensuring that the orientation of the brush fibres is parallel with the direction of the magnetic field. This technique cannot be used when using liquid metal brushes to transmit the current between the rotating drive elements and the current delivery surfaces. The effect of the Lorentz force on the current path created in the conductive liquid metal medium is to create eddies in the liquid. The creation of these eddies limits the current carrying performance of the brushes in a high field environment. The technique of aligning the fibre elements with the field cannot be employed with liquid metal brushes and it is necessary to create an area of nil or reduced magnetic field in which the brushes can operate.

In order for the liquid metal brushes to function correctly they must be in a region of comparatively low magnetic field. By splitting the single solenoid used in the previous version of the turbine into two components the effective working length and radius of the rotor is extended significantly increasing the torque and power density of the machine as a whole. The second benefit of this gap is that between the coils a region of field cancellation occurs in which the liquid metal brushes can be situated.

Figure 75:
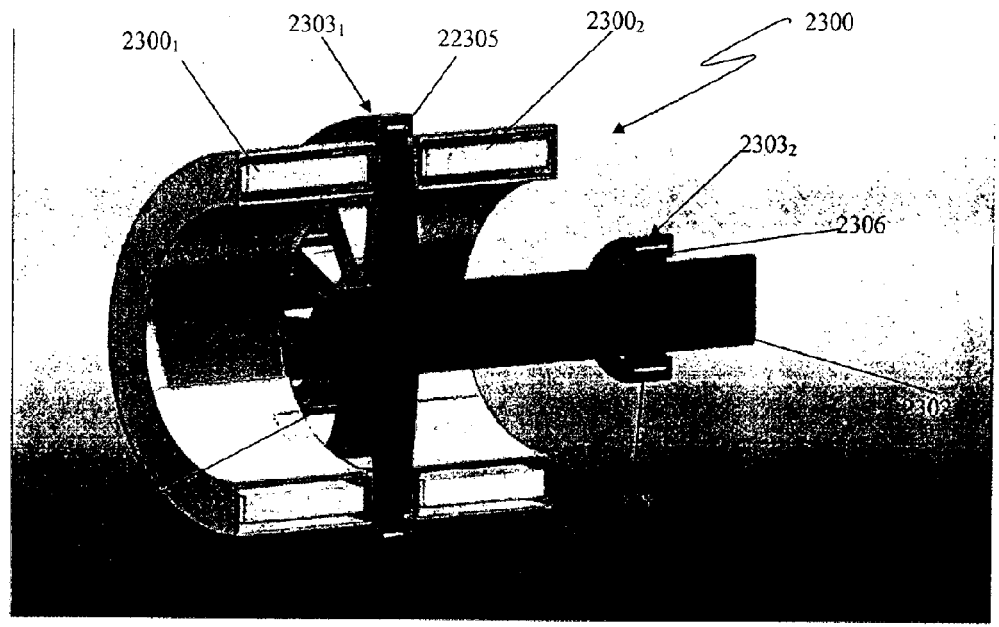
FIG. 75 is a cross-sectional view of a turbine according to one embodiment of the present invention.

One example of a turbine utilising a split solenoid design with a liquid brush arrangement is shown in FIG. 75. As can be seen in this example the solenoid 2300 has been split into two solenoids $2300_1$, $2300_2$ with a gap therebetween. Disposed within the gap is rotor 2301. In this particular example the rotor is formed integral with shaft 2302. Current in this instance is passed through the input current assembly $2303_1$ disposed about the outer hub of the rotor 2301 across the shaft 2302 and out to the output current assembly $2303_2$.

Figure 76:
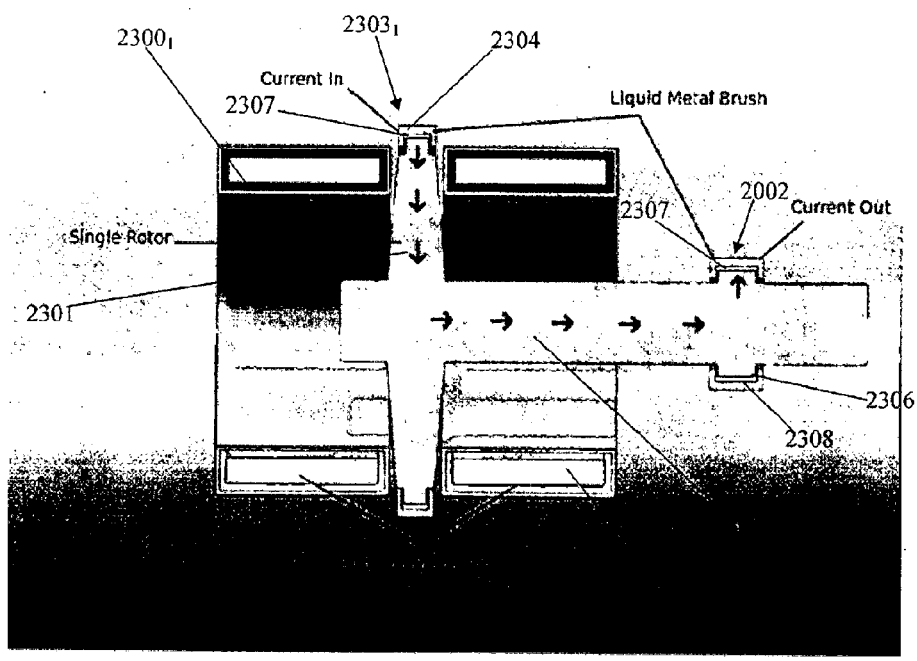
FIG. 76 is a cross-sectional view depicting the current flow through the turbine of FIG. 75.

FIG. 76 depicts the current transfer through the turbine of FIG. 75. As shown the current is applied across the outer conductive disc 2304 across a conductive fluid 2307 to the outer rim of the rotor 2301. The conductive fluid in this case is a liquid metal and is in direct contact with the outer rim of the rotor. It will of course be appreciated by those of skill in the art that the engagement of the rotor and the conductive disc is via a rotary fluid seal. As shown the current is passed from the rim of the rotor to the hub and along shaft 2302 to the output current transfer assembly 2303₂. As can be seen the shaft 2302 in this case includes a projection 2306 which is in communication with conductive fluid 2307 disposed between the projection and the outer disc 2308. The projection 2306 and the conductive disc 2308 are arranged such that a rotor seal is formed therebetween to prevent leakage of the conductive fluid during operation.

Figure 77:
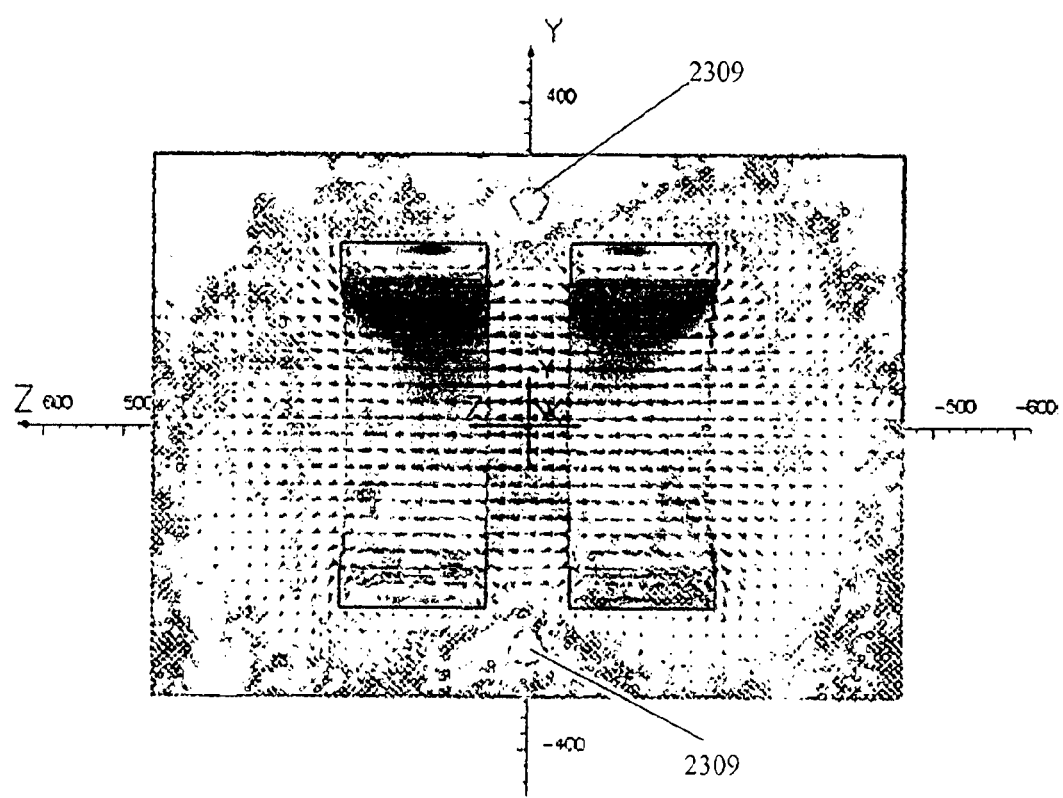
FIG. 77 is a plot of the magnetic field produced by coils the turbine of FIG. 75.

A field plot of the behaviour of the magnetic field produced by the solenoids is shown in FIG. 77. As can be seen the encircled regions 2309 highlight shows the cancellation region where the field is less than 10% of the field strength of the main coil assembly.

One important observation of the turbine construction shown in FIGS. 75 and 76 is that the shape of the solenoid assembly can be optimised to provide power to a single rotor. Modelling of the electromagnetic field behaviour in Vectorfields Opera 3d has shown that a more optimal coil shape for the above turbine reduces the effective solenoid length while increasing the number of turns of the coil assembly. In this manner a small reduction in the amount of superconducting wire can be used and a large reduction in the required volume of the turbine.

A version of the turbine with the revised coil dimensions is shown below in FIG. 78. As with the above example the solenoid 2300 has been split into two solenoids 2300₁, 2300₂ with a gap therebetween. Disposed within the gap is rotor 2301. In this particular example the rotor is formed integral with shaft 2302. Current in this instance is passed through the input current assembly 2303₁ disposed about the outer hub of the rotor 2301 across the shaft 2302 and out to the output current assembly 2303₂. In this case the thickness of the solenoids is significantly reduced.

As in the above example current is applied across the outer conductive disc 2304 across a conductive fluid 2307 to the outer rim of the rotor 2301. Current is then passed from the rim of the rotor to the hub and along shaft 2302 to the output current transfer assembly 2300₂ via the engagement of projection 2306 and the conductive disc 2308.

Figure 78:
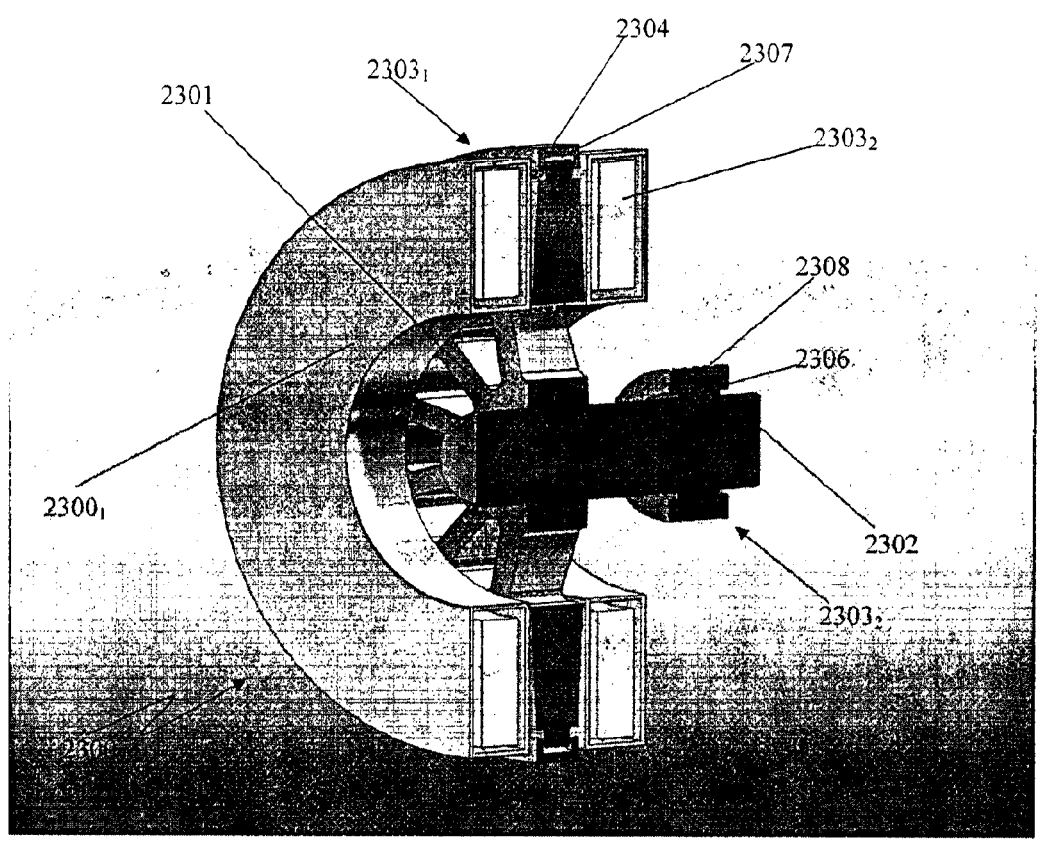
FIG. 78 is a cross-sectional view of a turbine according to one embodiment of the present invention.
Figure 79:
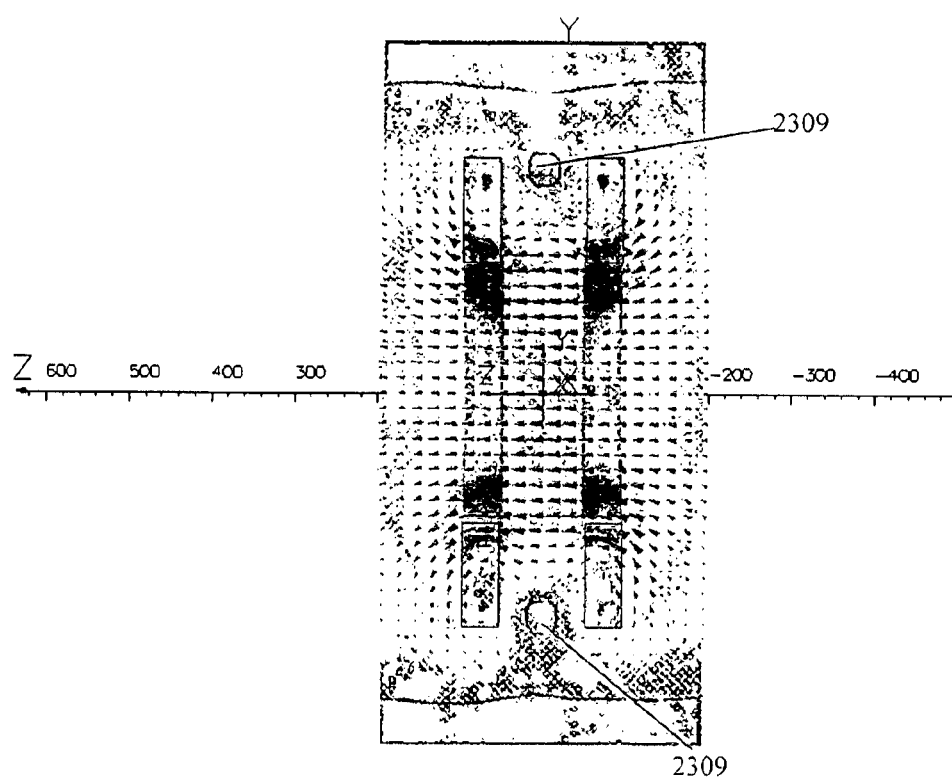
FIG. 79 is a plot of the magnetic field produced by coils the turbine of FIG. 78.

The field plot of the revised coil assembly FIG. 78 is shown in FIG. 79. Again the encircled regions show the cancellation region 2309 where the field is less than 10% of the field strength of the main coil assembly.

Figure 80:
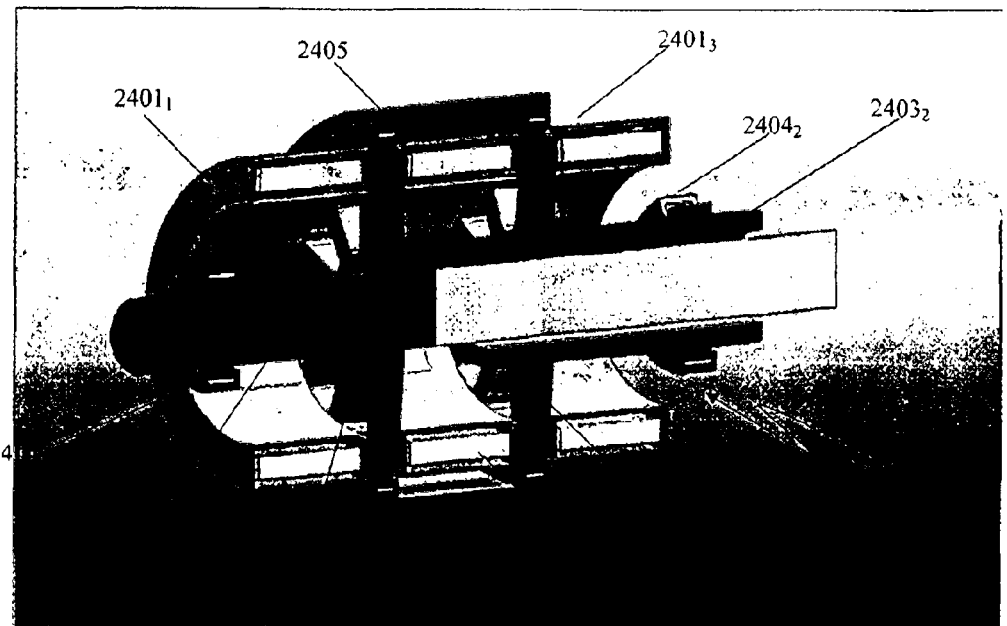
FIG. 80 is a cross-sectional view of a turbine according to one embodiment of the present invention.
Figure 81:
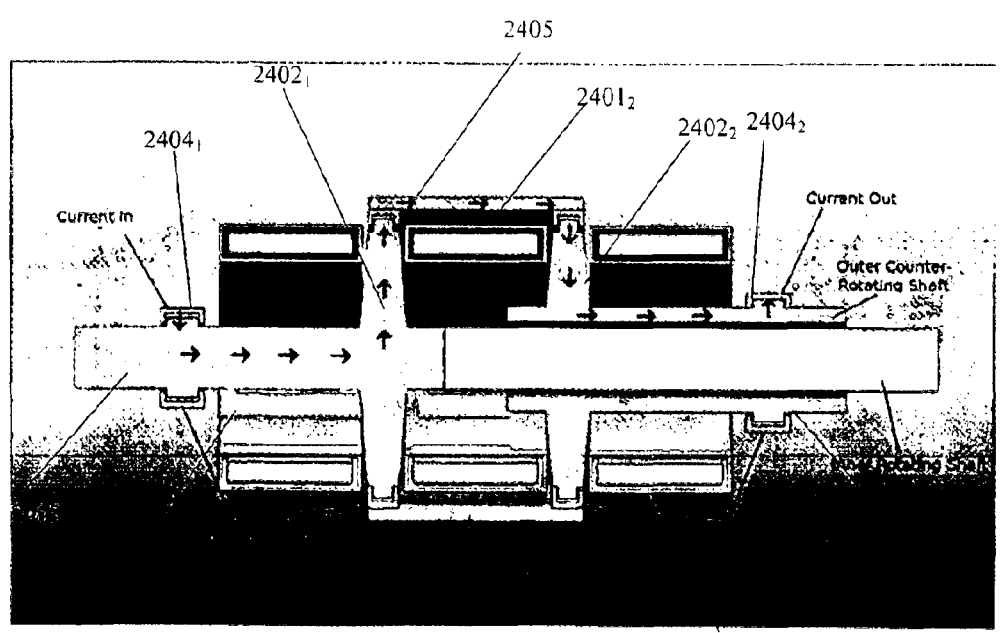
FIG. 81 is a cross-sectional view depicting the current flow through the turbine of FIG. 80.

FIGS. 80 and 81 depict another example of a turbine utilising the solenoid arrangement discussed above. As can be seen the turbine comprises 3 solenoids 2401₁, 2401₂, 2401₃ arranged in attraction. In this configuration the rotors 2402₁ and 2402₂ are coupled to shafts 2403₁, 2403₂. As shown shaft 2403₂ envelops a section of shaft 2403₁ on the output side of the turbine. As can be seen shaft 2403₁ passes through the centre of rotor 2402₂. In this instance the shaft 2403₁ includes a conductive section coupled to the rotor 2402₁ and a non conductive or low conductive section which passes through the second rotor 2402₂.

FIG. 81 depicts the current flow through the turbine of FIG. 80. As shown the current enters from input brushes 2404₁ one side along the shaft 2403₁ into the first rotor 2402₁ and then along the rotor interconnect bus 2405 into the second rotor 2402₂. The current then travels along the outer counter-rotating shaft 2403₂ to the current output brushes 2404₂. The torque equaliser system discussed above can be used to equalise the torque output of the above counter-rotating shafts. This is necessary due to the second rotor having a shorter effective rotor working length than the first.

Figure 82:
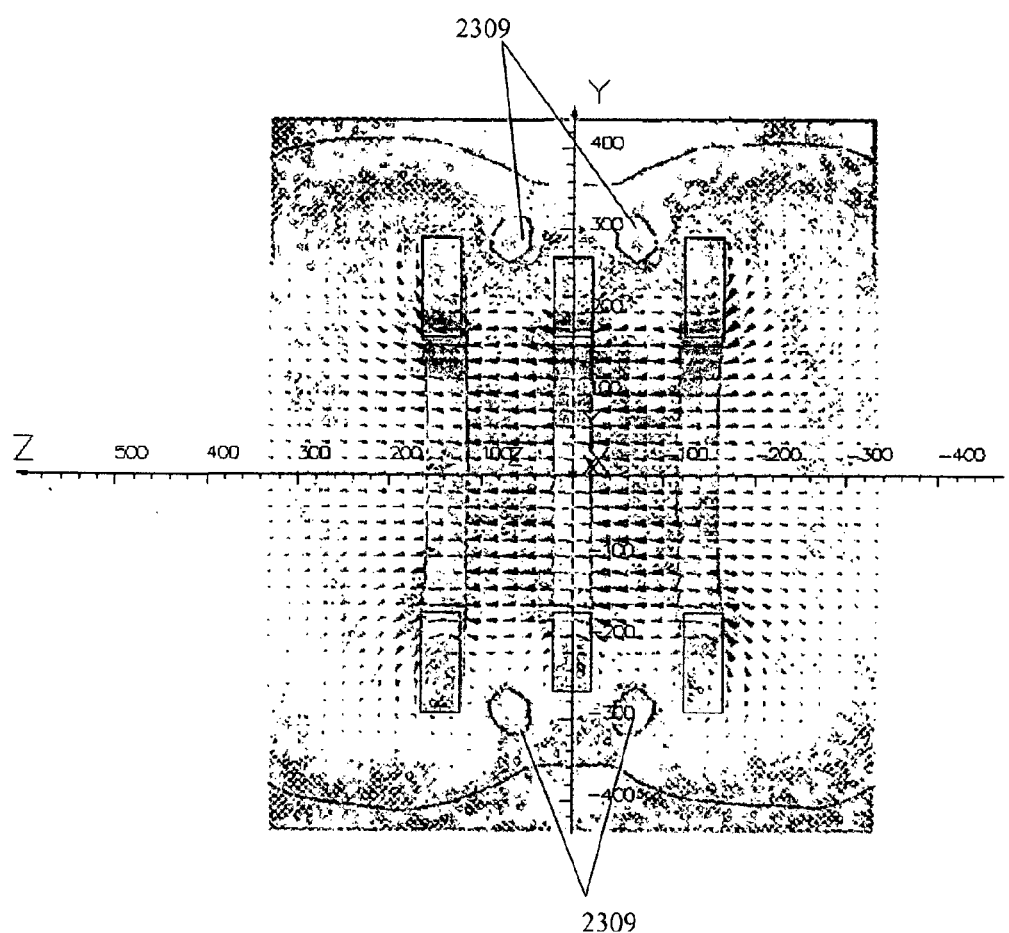
FIG. 82 is a plot of the magnetic field produced by coils for use in the turbine of FIG. 80.

FIG. 82 depicts a field plot for the double gapped solenoid of FIG. 80. As can be seen one of the features of this type of solenoid is the location of the regions of field cancellation or electromagnetic field nulls 2309 in which the liquid metal brushes can operate effectively.

As in the above example the shape of the coil assemblies can be optimised in order to reduce wire length and decrease the amount of volume that the turbine occupies. As shown in FIG. 82 the coils at either end of the solenoid require additional turns in order to shift the region of field cancellation 2600 into the centre of the inter coil gap.

While the designs presented so far have focussed the reduction of the total number of rotors it is still possible to design multiple gaps into the solenoid coil assembly in order to provide for a plurality of rotor and brush assemblies. One possible design allowing for a number of rotors is show below. The coil dimensions are based on the solenoid used in the examples discussed in relation to FIG. 42 above with a inner diameter of 340 mm in the coils. The coils are split into a series of pancake assemblies. These splits have two effects, firstly the region in between the split pancakes includes an area of field cancellation. This region could provide a suitable operating environment for liquid metal brushes. Secondly the entire solenoid assembly behaves more like a Helmholtz coil resulting in an increase in the field uniformity in the working region of the solenoid.

Figure 83:
FIG. 83 is a plot of the magnetic field produced by coils for use in a turbine according to one embodiment of the present invention.

As can be seen in FIG. 83 the regions of field cancellation at the ends of the coils are pushed out from the centreline of the inter-coil gap. This means that this coil configuration would not provide the null regions required to use liquid brushes. As a consequence the number of turns or pancakes has to be adjusted in order to ensure that null regions can actually be use for brushes.

Figure 84:
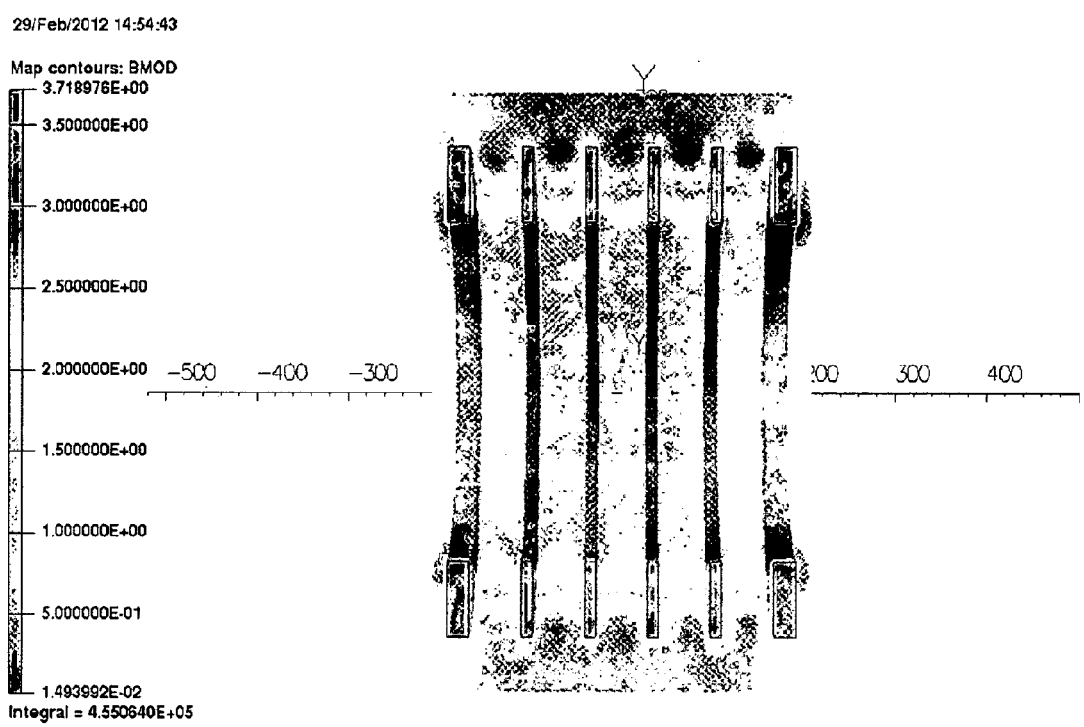
FIG. 84 is a plot of the magnetic field produced by coils for use in a turbine according to one embodiment of the present invention.

A field plot of the 5 Region Helmholtz coil assembly with the end coils adjusted to centre the field nulls is presented in FIG. 84. As the field plot shows the region of field cancellation in the darkening shades of blue. This particular configuration uses a collection of 4 inner double pancake coils with the outer two assemblies consisting of quad pancakes. The doubling of the outer pancake assembly shifts the field nulls at the ends of the coils closer to the centre of the outer gaps between the coil assemblies.

Figure 85:
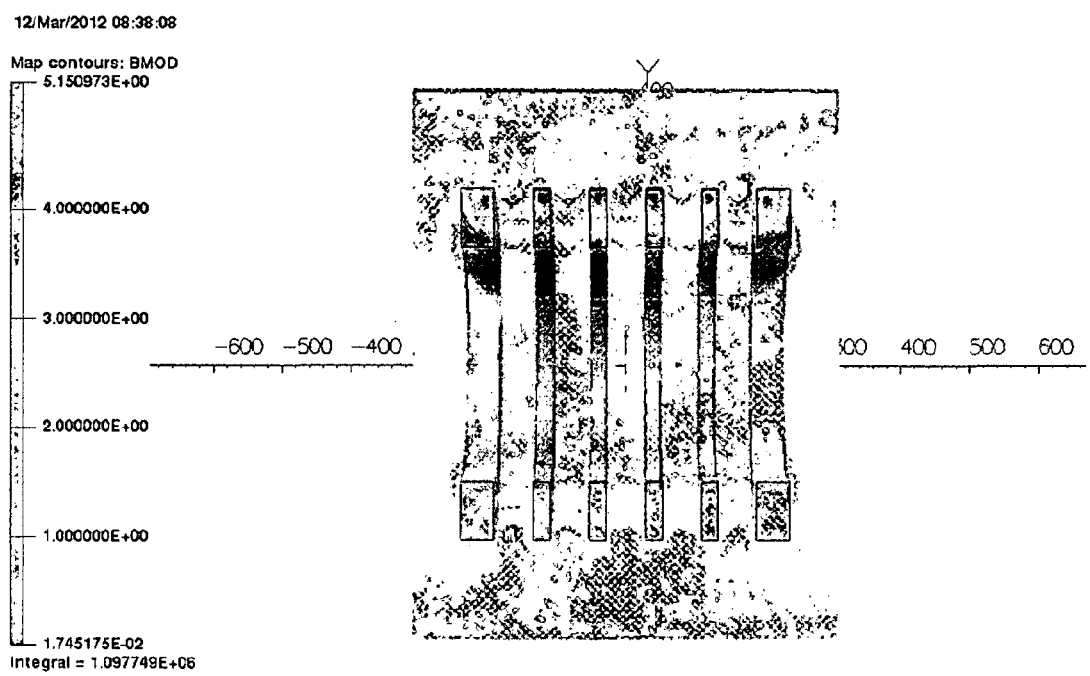
FIG. 85 is a plot of the magnetic field produced by coils for use in a turbine according to one embodiment of the present invention.
Figure 86:
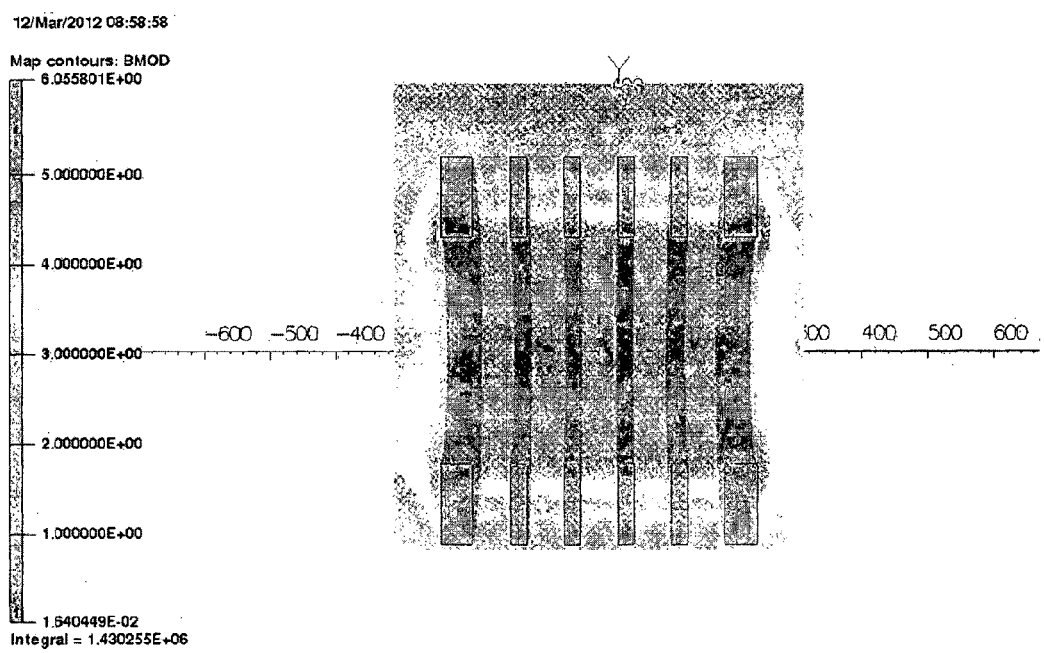
FIG. 86 is a plot of the magnetic field produced by coils for use in a turbine according to one embodiment of the present invention.

The field plots of FIGS. 83 and 84 assume operation at 20K on a 340 mm inner coil diameter with the average field through the centre of the coil is 2.5 T. FIGS. 85 and 86 are plots were prepared showing the coil designs with doubles ends at an average internal field of 4 T and 5 T. The plots of FIGS. 85 and 86 demonstrate the scalability of the system. FIG. 85 depicts a 4 T assembly where the 4 inner assemblies consist of 2 double pancake while the outer two consist of 4 double pancake assemblies. FIG. 86 shows the same assembly of FIG. 85 scaled for operation at 5 T.

As an alternative to doubling up the number of pancakes the number of turns on the end coils can be increased in order to control and direct the location of the null regions between the coils. An example field plot where the outer coils have been increased relative to the number of turns in the middle coils can be seen in FIG. 87.

Figure 87:
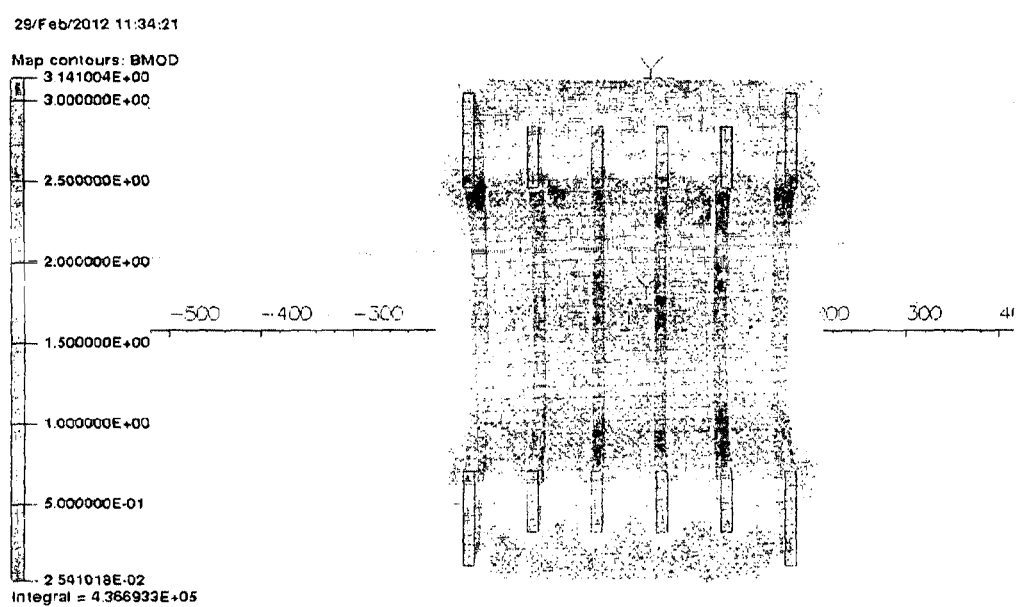
FIG. 87 is a plot of the magnetic field produced by coils for use in a turbine according to one embodiment of the present invention.

The field plot FIG. 87 shows a series of six double pancake coils with a target operating field average of 2.5 T in the bore. By increasing the number of turns in the end coils the null regions can be shifted to suit the required operating region on the brush. In the above example the outer coils have an additional 130 Turns/pancake of Fujikura 2G wire relative to the 246 Turns/pancake that the inner 4 double pancake assemblies have. Increasing the number of turns beyond this point resulted in limited positive change in the field cancellation regions for a significant increase in the total amount of wire used.

Figure 88:
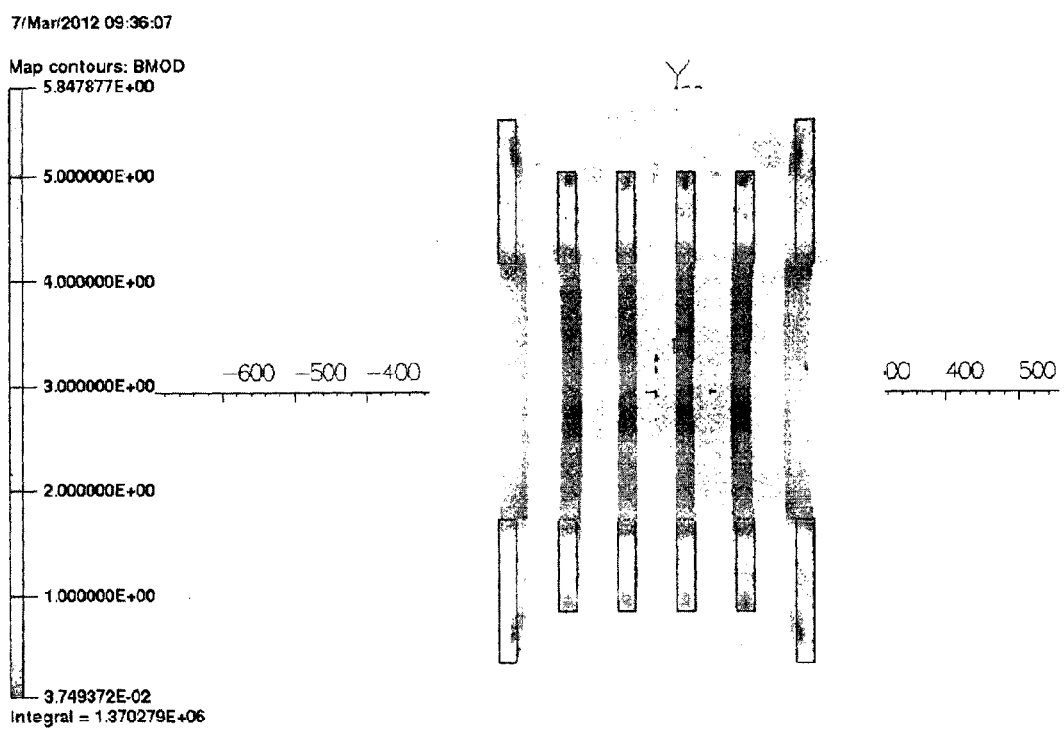
FIG. 88 is a plot of the magnetic field produced by coils for use in a turbine according to one embodiment of the present invention.

A similar plot is shown in FIG. 88 with an additional 230 Turns and designed for an operating field average of 5 T in the bore.

Figure 89:
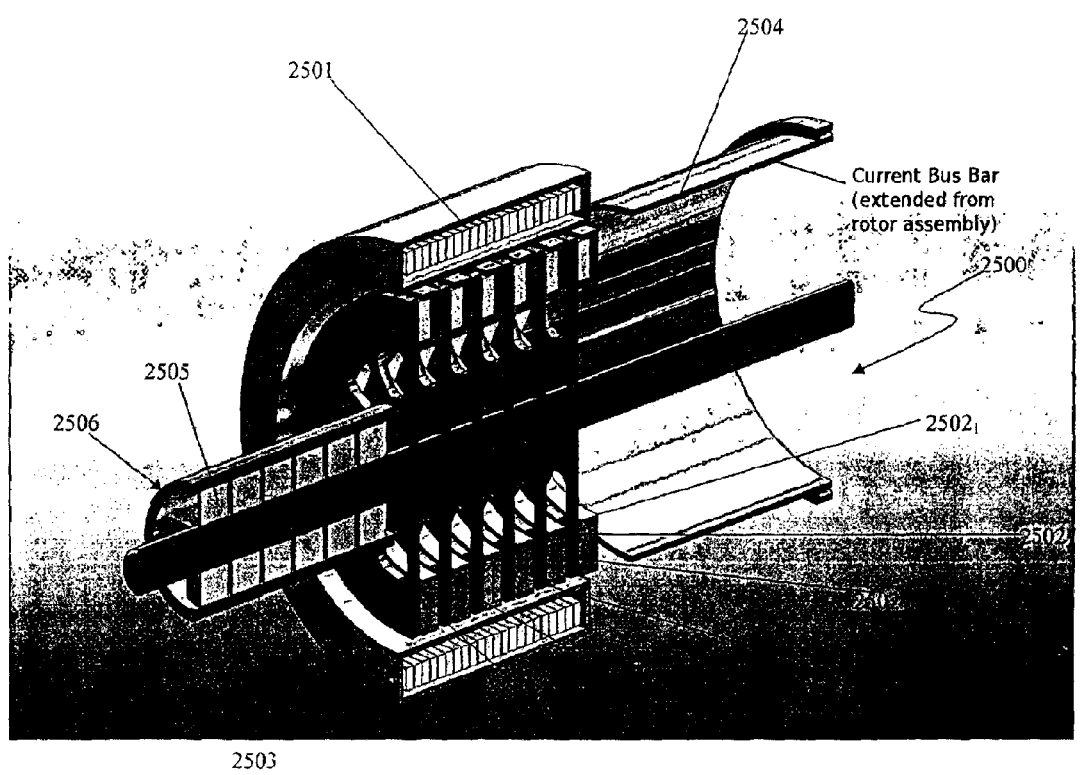
FIG. 89 is a cross-sectional exploded view of a turbine according to one embodiment of the present invention.

While the above discussions focus on turbine arrangements utilising a series connection between the conductive elements, it will of course be appreciated by those of skill in that a parallel connection between the conductive elements could be utilised. FIG. 89 depicts one possible arrangement of turbine 2500 utilising a parallel connection. As shown the turbine 2500 in this case includes a solenoid 2501 housing a plurality of rotors $2502_1$, $2502_2$, $2502_3$, $2502_4$, $2502_5$, $2502_6$ which are mounted on shaft 2503. A bus bar 2504 is provided to couple the rotors $2502_1$, $2502_2$, $2502_3$, $2502_4$, $2502_5$, $2502_6$ in parallel.

Figure 90:
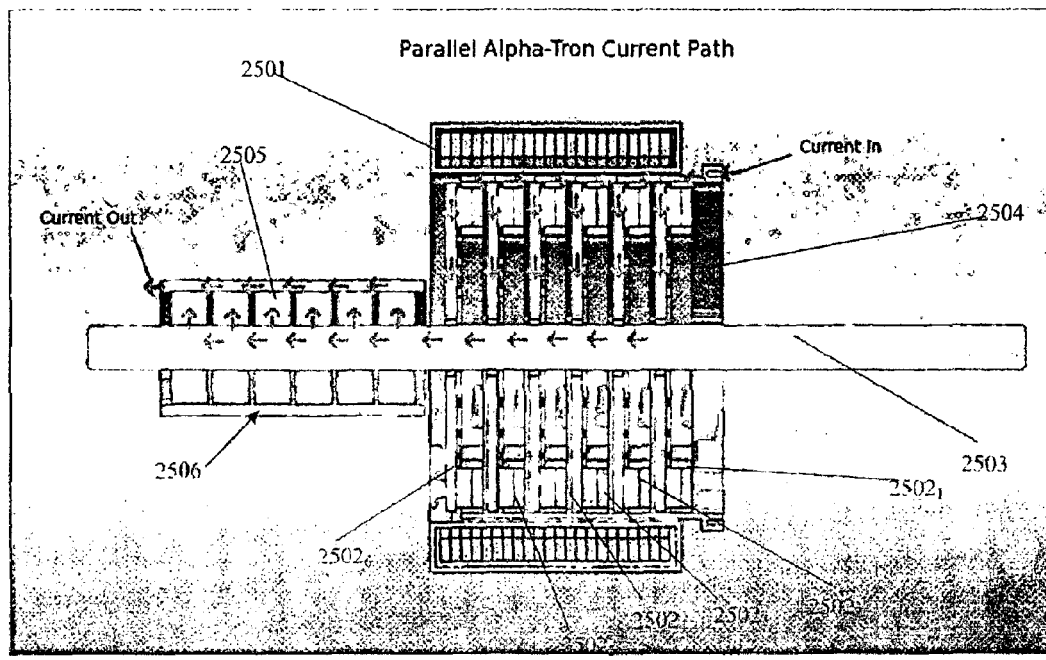
FIG. 90 is a cross-sectional view depicting the current flow through the turbine of FIG. 88.

FIG. 90 illustrates the current flow through the turbine 2500 of FIG. 89. As shown the bus bar 2504 fits over the outer diameter of the rotors $2502_1$, $2502_2$, $2502_3$, $2502_4$, $2502_5$, $2502_6$ in the rotor assembly. The bus bar 2504 is stationary and contains metal fibre or liquid metal brush assemblies. Current is passed through the bus bar 2504 the total parallel delivery is split between the 6 rotors. The current then flows through the shaft 2503 and out to the collector brushes 2505 of the current output assembly 2506. To minimise the resistive material losses of this design the current bus bar and output shaft are of sufficient size.

The homogeneity of the magnetic field along the axis of rotation is important, firstly because a lack of homogeneity of the axial B field results in a drop off of the torque developed in the outer rotor and secondly because the deviations that occur in the field direction near the ends of the solenoid will have an effect of the longevity of the brushes. There are several design factors that influence the homogeneity of the field and these include maintaining a favourable coil aspect ratio for a given working diameter. In general square or over-square full solenoid designs lead to higher homogeneity. That is, the length of the solenoid assembly is the same or greater that the diameter of the individual coil. Helmholtz style coil assemblies or coil assemblies that contain a series of gaps can produce a higher level of field homogeneity in the central bore of the solenoid assembly than a single simple solenoid. The price for this increase in homogeneity is increased wire length for the same working field.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein.

The invention claimed is:

1. A turbine comprising:
   at least one superconducting coil;
   at least one rotor mounted on a drive shaft positioned within the superconducting coil and the at least one rotor adapted to allow current to flow in a radial direction;
   wherein the at least one superconducting coil generates:
      a substantially axial magnetic field across the at least one rotor for interaction with the radial current flow, and
      one or more regions of null magnetic field; and
   at least one current transfer means electrically coupled to the at least one rotor and at least a portion of the current transfer means positioned in the one or more null magnetic field regions.

2. The turbine of claim 1, further including:
   a first and a second flux guide disposed at opposing ends of the at least one superconducting coil for redirecting the magnetic field exiting and entering the at least one superconducting coil.

3. The turbine of claim 2, wherein the first and second flux guides direct the field substantially parallel to the ends of the at least one superconducting coil.

4. The turbine of claim 1, wherein the at least one rotor is in the form of a disc.

5. The turbine of claim 1, wherein the at least one current transfer means comprises a first current transfer mechanism electrically coupled to an outer radius of the at least one rotor.

6. The turbine of claim 1, wherein the at least one current transfer means comprises a second current transfer mechanism electrically coupled to the drive shaft.

7. The turbine of claim 1, further comprising a cryogenic envelope for retaining the at least one superconducting coil.

8. The turbine of claim 1, wherein the at least one rotor comprises a plurality of rotors disposed on the drive shaft and arranged to form a series circuit.

9. The turbine of claim 8, wherein the at least one current transfer means further comprises at least one third current transfer mechanism electrically coupling adjacent rotors to facilitate the series circuit.

10. The turbine of claim 1, wherein the at least one rotor comprises a plurality of rotors disposed on the drive shaft and arranged to form a parallel circuit.

11. The turbine of claim 10, wherein the at least one current transfer means further comprises at least one third current transfer mechanism electrically coupling the plurality of rotors together to facilitate the parallel circuit.

12. The turbine of claim 11, wherein at least a portion of the third current transfer mechanism is in the one or more null magnetic field regions.

13. The turbine of claim 1, wherein the at least one rotor includes a hub connected to a rim via a set of arms spaced radially about the hub.

14. The turbine of claim 1, wherein the at least one current transfer means includes liquid metal brushes.

15. The turbine of claim 1, wherein the turbine is for use in a motor or a generator.

* * * * *